(12) United States Patent
Takahashi et al.

(10) Patent No.: US 10,425,827 B2
(45) Date of Patent: *Sep. 24, 2019

(54) IMAGE COMMUNICATION SYSTEM, IMAGE TRANSMISSION APPARATUS, IMAGE TRANSMISSION METHOD, AND RECORDING MEDIUM

(71) Applicant: OLYMPUS CORPORATION, Hachioji-shi, Tokyo (JP)

(72) Inventors: Tetsuyuki Takahashi, Tokyo (JP); Shinya Kawasaki, Tokyo (JP); Takahisa Endo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,611

(22) Filed: Oct. 3, 2017

(65) Prior Publication Data

US 2018/0027420 A1    Jan. 25, 2018

Related U.S. Application Data

(63) Continuation of application No. PCT/JP2015/061141, filed on Apr. 9, 2015.

(51) Int. Cl.
*H04W 16/14* (2009.01)
*H04W 4/18* (2009.01)
(Continued)

(52) U.S. Cl.
CPC ............ *H04W 16/14* (2013.01); *H04W 4/18* (2013.01); *H04W 72/0453* (2013.01); *H04W 76/14* (2018.02); *H04N 7/20* (2013.01)

(58) Field of Classification Search
CPC ............ H04N 5/00; H04N 5/04; H04N 5/232; H04N 5/234; H04N 5/2343; H04N 7/00;
(Continued)

(56) References Cited

U.S. PATENT DOCUMENTS 6,553,073 B1 * 4/2003 Ogata .................. H04N 7/0806
348/E7.039
9,366,750 B2 * 6/2016 Nallapureddy ......... G01S 7/023
(Continued)

FOREIGN PATENT DOCUMENTS

JP    2005-210616 A    8/2005
JP    2006-148974 A    6/2006
(Continued)

OTHER PUBLICATIONS

International Search Report dated Jul. 14, 2015, issued in counterpart application No. PCT/JP2015/061141, w/English translation. (4 pages).

(Continued)

*Primary Examiner* — Mohamed A Kamara
(74) *Attorney, Agent, or Firm* — Westerman, Hattori, Daniels & Adrian, LLP

(57) ABSTRACT

An image communication system includes an image transmission apparatus and an image reception apparatus. The image transmission apparatus includes a transmission-side wireless communication unit configured to transmit image data by radio waves. The image reception apparatus includes a reception-side wireless communication unit configured to receive the image data transmitted by the transmission-side wireless communication unit by radio waves. At least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit.

7 Claims, 54 Drawing Sheets

(51) Int. Cl.
*H04W 72/04* (2009.01)
*H04W 76/14* (2018.01)
*H04N 7/20* (2006.01)

(58) Field of Classification Search
CPC .......... H04N 7/20; H04N 19/00; H04N 19/48; H04N 21/00; H04N 21/44; H04N 21/234; H04L 41/00; H04L 41/0896; H04L 29/00; H04L 29/0604; H04L 29/08792; G01S 7/00; G01S 7/021
See application file for complete search history.

(56) References Cited

U.S. PATENT DOCUMENTS

| | | | |
|---|---|---|---|
| 2005/0162304 A1 | 7/2005 | Mitsugi | |
| 2009/0146866 A1 | 6/2009 | Matsumoto et al. | |
| 2010/0297958 A1 | 11/2010 | Murakami et al. | |
| 2010/0302966 A1 | 12/2010 | Matsuura | |
| 2010/0303001 A1 | 12/2010 | Tamura et al. | |
| 2012/0213086 A1 | 8/2012 | Matsuura | |
| 2013/0217340 A1 | 8/2013 | Nakatake | |
| 2014/0090003 A1 | 3/2014 | Eguchi et al. | |
| 2014/0286249 A1 | 9/2014 | Yamada et al. | |
| 2014/0287790 A1* | 9/2014 | Ichikawa | H04W 72/04 455/509 |
| 2014/0313992 A1 | 10/2014 | Yamaguchi | |
| 2014/0355532 A1 | 12/2014 | Shapira | |
| 2018/0020362 A1* | 1/2018 | Kawasaki | H04W 16/14 |
| 2018/0020427 A1* | 1/2018 | Endo | H04N 21/2662 |

FOREIGN PATENT DOCUMENTS

| | | |
|---|---|---|
| JP | 2010-141625 A | 6/2010 |
| JP | 2010-272900 A | 12/2010 |
| JP | 2010-278825 A | 12/2010 |
| JP | 2013-168904 A | 8/2013 |
| WO | 2012/153581 A1 | 11/2012 |
| WO | 2015/033763 A1 | 3/2015 |

OTHER PUBLICATIONS

Notice of Allowance dated Dec. 4, 2018, issued in counterpart JP Application No. 2017-511411, with English translation (6 pages).
International Search Report dated Jul. 7, 2015, issued in counterpart International Application No. PCT/JP2015/061063 (2 pages).
International Search Report dated Jul. 7, 2015, issued in counterpart Application No. PCT/JP2015/060962, with English translation (4 pages).
Non Final Office Action dated Apr. 29, 2019, issued in U.S. Appl. No. 15/715,866 (13 pages).
Non Final Office Action dated Mar. 22, 2019, issued in U.S. Appl. No. 15/718,168 (15 pages).

* cited by examiner

FIG. 5

| CHANNEL NUMBER (A1) | CLASSIFICATION (A2) | COMMUNICATION CHANNEL (A3) | CHANNEL USAGE RATE [%] (A4) | RADAR DETECTION HISTORY (A5) |
|---|---|---|---|---|
| 1 | W52 | 36 | 55 | 0 |
| 2 | W52 | 40 | 37 | 0 |
| 3 | W52 | 44 | 45 | 0 |
| 4 | W52 | 48 | 74 | 0 |
| 5 | W53 | 52 | 22 | 0 |
| 6 | W53 | 56 | 0 | 1 |
| 7 | W53 | 60 | 12 | 0 |
| 8 | W53 | 64 | 20 | 0 |
| 9 | W56 | 100 | 0 | 0 |
| 10 | W56 | 104 | 16 | 0 |
| 11 | W56 | 108 | 30 | 0 |
| 12 | W56 | 112 | 20 | 0 |
| 13 | W56 | 116 | 0 | 0 |
| 14 | W56 | 120 | 20 | 0 |
| 15 | W56 | 124 | 63 | 0 |
| 16 | W56 | 128 | 10 | 0 |
| 17 | W56 | 132 | 3 | 0 |
| 18 | W56 | 136 | 11 | 0 |
| 19 | W56 | 140 | 32 | 0 |

IMAGE COMMUNICATION SYSTEM, IMAGE TRANSMISSION APPARATUS, IMAGE TRANSMISSION METHOD, AND RECORDING MEDIUM

The present application is a continuation application based on International Patent Application No. PCT/JP2015/061141 filed Apr. 9, 2015, the content of which is incorporated herein by reference.

BACKGROUND OF THE INVENTION

Field of the Invention

The present invention relates to an image communication system, an image transmission apparatus, an image transmission method, and a recording medium.

Description of Related Art

In a wireless local area network (LAN) of a 5 GHz band, the number of usable communication channels is larger than that of a wireless LAN of a 2.4 GHz band. Thus, the wireless LAN of the 5 GHz band is advantageous for image transmission. However, W53 and W56 which are parts of the 5 GHz band are frequency bands to be used by weather radar and the like. In these frequency bands, interference avoidance technology called dynamic frequency selection (DFS) is required to avoid interference with the radar.

An operation by DFS includes channel availability check (CAC) and in service monitoring (ISM). In CAC, the communication channel is continuously monitored for a predetermined time before use of the communication channel. When it is confirmed that radio waves of radar are not detected by CAC, it is possible to use the monitored communication channel. The radio waves of the radar need to be detected not only before the use of the communication channel but also during use of the communication channel. In ISM, the communication channel in use is continuously monitored.

If the radio waves of the radar are detected in the communication channel in use, the communication channel in use is changed by DFS. Also, transmission is stopped on the communication channel in use by DFS. In a case where real-time image transmission is performed using W53 and W56 in the 5 GHz band, image transmission stops when the radio waves of the radar are detected and DFS operates.

Technology for avoiding the stop of image transmission by DFS is disclosed in Japanese Unexamined Patent Application, First Publication No. 2010-278825. The technology disclosed in Japanese Unexamined Patent Application, First Publication No. 2010-278825 will be described. A monitoring system b independent from a communication system a is provided in an access point. The access point monitors a communication channel on which communication is possible in the system b. When the access point detects radio waves of radar, the access point changes a communication channel of the system a to a communication channel monitored up to that point in time. A terminal detects a change in the communication channel according to a beacon output by the access point. If the change in the communication channel is detected, the terminal similarly changes the communication channel. If radio waves of the radar are not detected in the monitored communication channel within a predetermined time, CAC is completed. The access point can immediately resume wireless communication using a communication channel on which CAC is completed.

A similar process can also be applied to communication between access points. For example, the communication between the access points is a communication in a wireless distribution system (WDS) mode.

FIG. 55 shows a configuration of an image communication system 20 to which the technology disclosed in Japanese Unexamined Patent Application, First Publication No. 2010-278825 is applied. As shown in FIG. 55, the image communication system 20 includes an image transmission apparatus 400 and an image reception apparatus 500. Radar 600 for generating radio waves is arranged in the image communication system 20.

The image transmission apparatus 400 and the image reception apparatus 500 perform large-capacity image transmission using a communication system. A communication channel belonging to W53 or W56 (a non-W52 channel) in the 5 GHz band is used for the image transmission. A communication channel of a system different from the communication system is monitored. If radio waves of the radar 600 are detected by the image reception apparatus 500, switching of the communication channel used for the image transmission is performed.

If radio waves of the radar are detected in the monitoring system, the communication channel set for the communication system is changed. For example, a period during which the communication channel is changed is 10 seconds in DFS. For example, image data communication is defined to be performed for up to 260 milliseconds in a period of 10 seconds in DFS.

Before the communication channel is changed, CAC of the communication channel to be used is executed. The communication channel on which CAC is executed is a communication channel belonging to W53 or W56 (a non-W52 channel) in the 5 GHz band. After CAC is completed, the image transmission apparatus 400 and the image reception apparatus 500 perform large-capacity image transmission using a communication system in which a communication channel on which CAC is completed is set.

SUMMARY OF THE INVENTION

According to a first aspect of the present invention, an image communication system includes an image transmission apparatus and an image reception apparatus. The image transmission apparatus includes a transmission-side wireless communication unit configured to transmit image data by radio waves. The image data is generated in synchronization with an imaging clock. The image data is transmitted in the order in which the image data is generated. The image reception apparatus includes a reception-side wireless communication unit configured to receive the image data transmitted by the transmission-side wireless communication unit by radio waves. At least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit. At least one of the image transmission apparatus and the image reception apparatus includes a data amount reduction unit configured to reduce the amount of image data. The transmission-side wireless communication unit and the reception-side wireless communication unit stop image data communication using a first communication channel within a first time from a first point in time at which the radar detection unit detects the radio waves of the radar in the first communication channel while the image data communication using the first communication channel is performed. The first communication channel is a communication channel in which detection of the radar is necessary. The transmission-side wireless communication unit and the reception-side wireless communication unit start image data communication using a second communication channel within the first time from the first point in time. The second communication channel is a communication channel in which detection of the radar is not necessary. The data amount reduction unit reduces the amount of image data so that a total communication time of the image data to be communicated by the transmission-side wireless communication unit and the reception-side wireless communication unit from the first point in time to a second point in time at which the image data communication using the first communication channel is stopped falls within a second time. The transmission-side wireless communication unit and the reception-side wireless communication unit perform the image data communication in which the amount of data is reduced by the data amount reduction unit using the first communication channel from the first point in time to the second point in time.

According to a second aspect of the present invention, in the first aspect, the image transmission apparatus may further include a storage unit configured to store the first time, the second time, and a frame rate. The data amount reduction unit may determine the reduced amount of data on the basis of the first time, the second time, and the frame rate stored in the storage unit.

According to a third aspect of the present invention, in the first aspect, at least one of the image transmission apparatus and the image reception apparatus may further include a channel quality confirmation unit configured to confirm qualities of a plurality of communication channels different from the first communication channel when the image data communication using the first communication channel is being performed. A communication channel with relatively high quality among a plurality of communication channels whose qualities have been confirmed by the channel quality confirmation unit may be set as the second communication channel.

According to a fourth aspect of the present invention, in the first aspect, at least one of the image transmission apparatus and the image reception apparatus may further include a channel use confirmation unit configured to execute channel use confirmation for confirming that the communication channel is usable by continuously monitoring the detection process by the radar detection unit for a predetermined time. The channel use confirmation unit may execute the channel use confirmation of a third communication channel. The third communication channel is a communication channel in which detection of the radar is necessary. The third communication channel is different from the first communication channel. If the channel use confirmation of the third communication channel is not completed at the first point in time, the transmission-side wireless communication unit and the reception-side wireless communication unit may start the image data communication using the second communication channel within the first time from the first point in time. If the channel use confirmation of the third communication channel is completed at the first point in time, the transmission-side wireless communication unit and the reception-side wireless communication unit may start the image data communication using the third communication channel within the first time from the first point in time.

According to a fifth aspect of the present invention, an image transmission apparatus includes a transmission-side wireless communication unit, a radar detection unit, and a data amount reduction unit. The transmission-side wireless communication unit transmits image data by radio waves. The image data is generated in synchronization with an imaging clock. The image data is transmitted in the order in which the image data is generated. The radar detection unit executes a detection process on radio waves of radar in a communication channel that has a possibility of being used for image data communication by the transmission-side wireless communication unit. The data amount reduction unit reduces the amount of image data. The transmission-side wireless communication unit stops image data communication using a first communication channel within a first time from a first point in time at which the radar detection unit detects the radio waves of the radar in the first communication channel while the image data communication using the first communication channel is performed. The first communication channel is a communication channel in which detection of the radar is necessary. The transmission-side wireless communication unit starts image data communication using a second communication channel within the first time from the first point in time. The second communication channel is a communication channel in which detection of the radar is not necessary. The data amount reduction unit reduces the amount of image data so that a total communication time of the image data to be communicated by the transmission-side wireless communication unit from the first point in time to a second point in time at which the image data communication using the first communication channel is stopped falls within a second time. The transmission-side wireless communication unit performs the image data communication in which the amount of data is reduced by the data amount reduction unit using the first communication channel from the first point in time to the second point in time.

According to a sixth aspect of the present invention, an image transmission method includes a first step, a second step, a third step, a fourth step, a fifth step, and a sixth step. In the first step, image data is transmitted by radio waves. The image data is generated in synchronization with an imaging clock. The image data is transmitted in the order in which the image data is generated. In the second step, a detection process on radio waves of radar is executed in a communication channel that has a possibility of being used for image data communication in the first step. In the third step, image data communication using a first communication channel is stopped within a first time from a first point in time at which the radio waves of the radar are detected in the first communication channel in the second step while the image data communication using the first communication channel is performed. The first communication channel is a communication channel in which detection of the radar is necessary. In the fourth step, image data communication using a second communication channel is started within the first time from the first point in time. The second communication channel is a communication channel in which detection of the radar is not necessary. In the fifth step, the amount of image data is reduced so that a total communication time of the image data to be communicated from the first point in time to a second point in time at which the image data communication using the first communication channel is stopped falls within a second time. In the sixth step, the image data communication in which the amount of data is reduced in the fifth step is performed using the first communication channel from the first point in time to the second point in time.

According to a seventh aspect of the present invention, a non-transitory recording medium saves a program for causing a computer of an image transmission apparatus to execute a first step, a second step, a third step, a fourth step, a fifth step, and a sixth step. In the first step, image data is transmitted by radio waves. The image data is generated in synchronization with an imaging clock. The image data is transmitted in the order in which the image data is generated. In the second step, a detection process on radio waves of radar is executed in a communication channel that has a possibility of being used for image data communication in the first step. In the third step, image data communication using a first communication channel is stopped within a first time from a first point in time at which the radio waves of the radar are detected in the first communication channel in the second step while the image data communication using the first communication channel is performed. The first communication channel is a communication channel in which detection of the radar is necessary. In the fourth step, image data communication using a second communication channel is started within the first time from the first point in time. The second communication channel is a communication channel in which detection of the radar is not necessary. In the fifth step, the amount of image data is reduced so that a total communication time of the image data to be communicated from the first point in time to a second point in time at which the image data communication using the first communication channel is stopped falls within a second time. In the sixth step, the image data communication in which the amount of data is reduced in the fifth step is performed using the first communication channel from the first point in time to the second point in time.

BRIEF DESCRIPTION OF THE DRAWINGS

FIG. 5 is a reference diagram showing a channel state table in the first embodiment of the present invention.

DETAILED DESCRIPTION OF THE INVENTION

Embodiments of the present invention will be described with reference to the drawings.

First Embodiment

Figure 1:
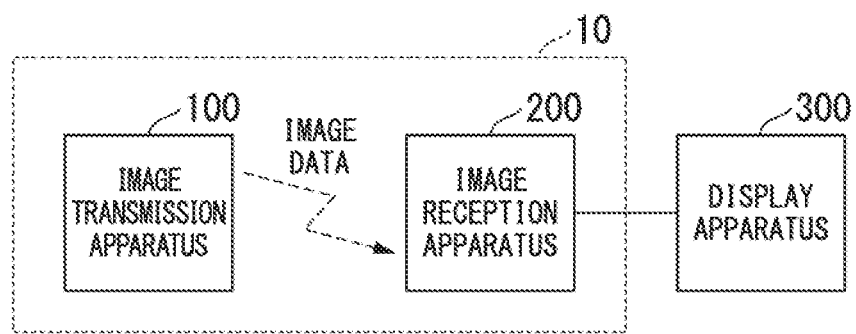
FIG. 1 is a block diagram showing a configuration of an image communication system according to a first embodiment of the present invention.

FIG. 1 shows a configuration of an image communication system 10 according to the first embodiment of the present invention. As shown in FIG. 1, the image communication system 10 includes an image transmission apparatus 100 and an image reception apparatus 200. The image transmission apparatus 100 and the image reception apparatus 200 perform wireless communication. The image reception apparatus 200 is connected to a display apparatus 300 by a cable or the like.

Figure 2:
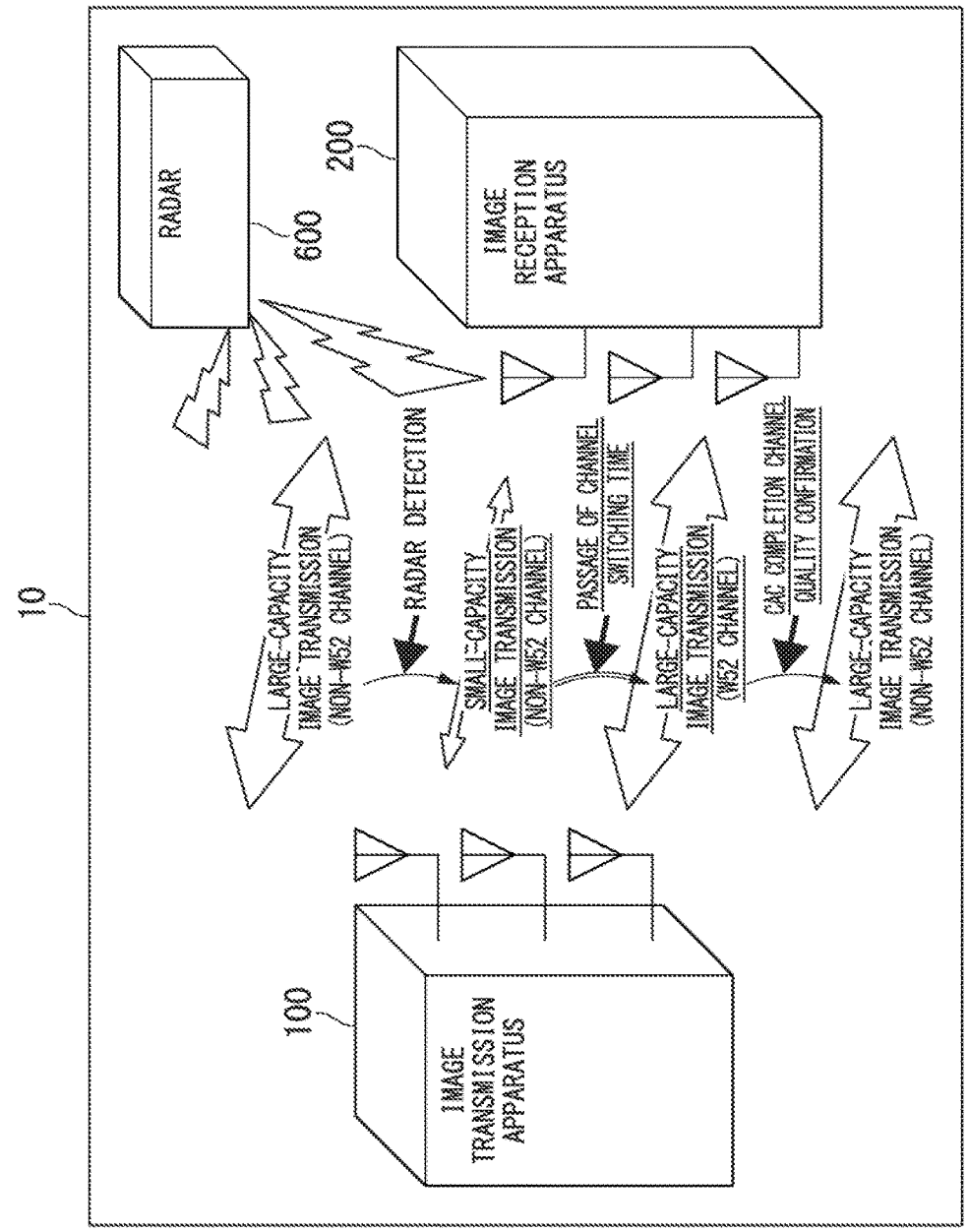
FIG. 2 is a schematic diagram showing a state of communication by the image communication system according to the first embodiment of the present invention.

FIG. 2 shows a state of communication by the image communication system 10. The image transmission apparatus 100 and the image reception apparatus 200 include three wireless circuits. The three wireless circuits are a first wireless circuit, a second wireless circuit, and a third wireless circuit. The three wireless circuits can perform communication using a communication channel belonging to W53 or W56 (a non-W52 channel). Also, the three wireless circuits can perform communication using a communication channel belonging to W52 (a W52 channel). W52 which is a part of the 5 GHz band is a frequency band that is not used by weather radar and the like.

After the image transmission apparatus 100 and the image reception apparatus 200 are activated, the non-W52 channel is set in any two of the three wireless circuits. CAC is executed in the two wireless circuits in which the non-W52 channel is set. After CAC is completed, the wireless circuit on which CAC is executed is in a communication standby state. In any one of the three wireless circuits, channel quality confirmation (scanning) is executed on a communication channel other than a communication channel in use. In the channel quality confirmation, the quality of the communication channel is confirmed.

In the non-W52 channel on which CAC has been completed, the first wireless circuit of the image transmission apparatus 100 and the first wireless circuit of the image reception apparatus 200 start image data communication in which the amount of data is not reduced (large-capacity image transmission). When image data communication is being performed, radio waves (radar pulses) of the radar 600 are detected in one of the first wireless circuit of the image transmission apparatus 100 and the first wireless circuit of the image reception apparatus 200. After the radio waves of the radar 600 are detected, the communication channel is switched to a W52 channel with high quality. Until the switching of the communication channel is completed, the first wireless circuit of the image transmission apparatus 100 and the first wireless circuit of the image reception apparatus 200 perform image data communication in which the amount of data is reduced (small-capacity image transmission).

Switching of the communication channel is completed at a point in time at which a predetermined time has elapsed from a point in time at which the radio waves of the radar 600 were detected. The predetermined time is the channel switching time to be described below. The second wireless circuit or the third wireless circuit of the image transmission apparatus 100 and the image reception apparatus 200 starts image data communication in which the amount of data is not reduced (large-capacity image transmission). In this image data communication, a W52 channel with high quality is used. The first wireless circuit of the image transmission apparatus 100 and the first wireless circuit of the image reception apparatus 200 stop the image data communication.

In the image transmission apparatus 100 or the image reception apparatus 200, CAC using a usable non-W52 channel is executed in one of the two wireless circuits that do not perform image data communication. At a point in time at which this CAC is completed, the second wireless circuit or the third wireless circuit of the image transmission apparatus 100 and the image reception apparatus 200 stops the image data communication. In synchronization with a timing at which the second wireless circuit or the third wireless circuit stops the image data communication, the wireless circuit in which CAC is completed performs image data communication in which the amount of data is not reduced (large-capacity image transmission) using a non-W52 channel on which CAC is completed. Also, in synchronization with a timing at which the second wireless circuit or the third wireless circuit stops the image data communication, one of the two wireless circuits other than the second wireless circuit or the third wireless circuit performs CAC using another usable non-W52 channel. After CAC is completed, the wireless circuit in which CAC is executed is in a communication standby state. Also, in synchronization with a timing at which the second wireless circuit or the third wireless circuit stops the image data communication, one of the two wireless circuits other than the second wireless circuit or the third wireless circuit executes channel quality confirmation using another usable channel.

Figure 3:
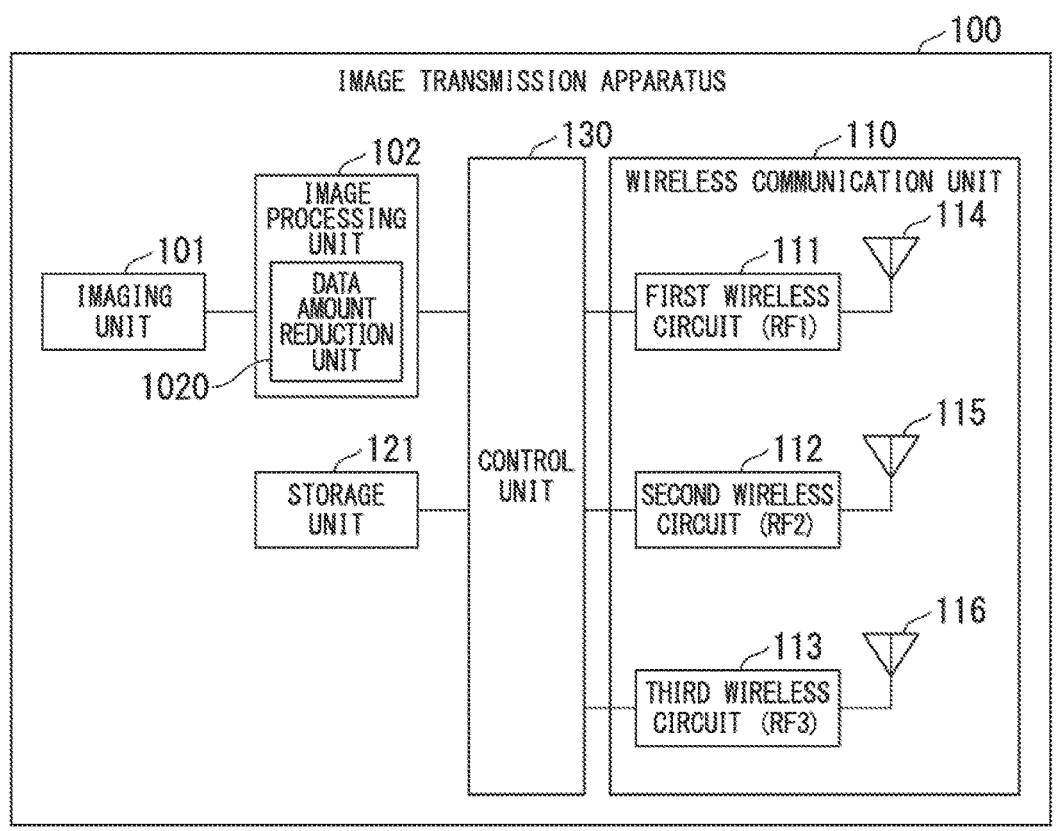
FIG. 3 is a block diagram showing a configuration of an image transmission apparatus according to the first embodiment of the present invention.

FIG. 3 shows a configuration of the image transmission apparatus 100. As shown in FIG. 3, the image transmission apparatus 100 includes an imaging unit 101, an image processing unit 102, a wireless communication unit 110 (a transmission-side wireless communication unit), a storage unit 121, and a control unit 130.

The imaging unit 101 is an imaging module. The imaging unit 101 includes a lens, an imaging element (a CCD or CMOS sensor or the like), an AD converter (an analog to digital converter), and the like. The lens forms an image of light incident on the imaging unit 101. The imaging element converts the light whose image is formed into an electric signal. The AD converter converts an analog electric signal output from the imaging element into a digital electric signal. According to this configuration, the imaging unit 101 images a subject and outputs image data.

The image processing unit 102 is an image processing circuit. The image processing unit 102 performs image processing on the image data output from the imaging unit 101. For example, the image processing unit 102 generates moving-image data by converting the image data output from the imaging unit 101 into data suitable for a predetermined moving-image format. Also, the image processing unit 102 generates frame rate information. The frame rate information indicates a frame rate of a moving image. The image processing unit 102 outputs the generated frame rate information to the control unit 130.

The image processing unit 102 includes a data amount reduction unit 1020 that reduces the amount of image data. For example, the data amount reduction unit 1020 reduces the amount of image data by performing a compression process on the image data output from the imaging unit 101.

The wireless communication unit 110 includes a plurality of wireless circuits. That is, the wireless communication unit 110 includes a first wireless circuit 111 (RF1), a second wireless circuit 112 (RF2), and a third wireless circuit 113 (RF3). Also, the wireless communication unit 110 includes a plurality of antennas. That is, the wireless communication unit 110 includes a first antenna 114, a second antenna 115, and a third antenna 116.

The first wireless circuit 111, the second wireless circuit 112, and the third wireless circuit 113 are wireless communication circuits. The first wireless circuit 111, the second wireless circuit 112, and the third wireless circuit 113 include a high-frequency circuit unit necessary for wireless communication, a circuit unit for encoding and decoding, and a buffer memory. The first antenna 114 is connected to the first wireless circuit 111. The second antenna 115 is connected to the second wireless circuit 112. The third antenna 116 is connected to the third wireless circuit 113. For example, a wireless IAN protocol (IEEE 802.11) is used as a wireless communication scheme.

The first wireless circuit 111 performs wireless communication with the image reception apparatus 200 via the first antenna 114. The second wireless circuit 112 performs wireless communication with the image reception apparatus 200 via the second antenna 115. The third wireless circuit 113 performs wireless communication with the image reception apparatus 200 via the third antenna 116. The first wireless circuit 111, the second wireless circuit 112, and the third wireless circuit 113 transmit image data or necessary information to the image reception apparatus 200 by wireless communication. The first wireless circuit 111, the second wireless circuit 112, and the third wireless circuit 113 receive necessary information from the image reception apparatus 200 by wireless communication.

The first wireless circuit 111, the second wireless circuit 112, and the third wireless circuit 113 can simultaneously perform wireless communication using different communication channels. Therefore, the wireless communication unit 110 can simultaneously perform wireless communication using a plurality of different communication channels.

The storage unit 121 is a memory. Program data for controlling the image transmission apparatus 100 and various setting information including communication setting parameters are stored in the storage unit 121. Also, the storage unit 121 is used as a buffer, a work area, and a temporary area. The buffer is used for temporarily storing the image data output from the imaging unit 101. The work area is used for calculation by the control unit 130 and the like. The temporary area is used for temporarily storing various setting information and the like.

The control unit 130 is a processor such as a central processing unit (CPU). The control unit 130 operates in accordance with a program stored in the storage unit 121.

Thereby, the control unit 130 controls the operation of the image transmission apparatus 100.

For example, a function of the control unit 130 can be implemented as a function of software by a computer of the image transmission apparatus 100 reading and executing a program including a command for defining the operation of the control unit 130. This program may be provided by, for example, a "computer-readable recording medium" such as a flash memory. Also, the above-described program may be transmitted from a computer having a storage apparatus or the like storing the program to the image transmission apparatus 100 via a transmission medium or by transmission waves in a transmission medium. The "transmission medium" for transmitting the program is a medium having a function of transmitting information, such as a network (communication network) like the Internet or a communication circuit (communication line) like a telephone circuit. Also, the above-described program may be a program for implementing some of the above-described functions. Further, the above-described program may be a program capable of implementing the above-described function in combination with a program already recorded on the computer, i.e., a so-called differential file (differential program).

The image transmission apparatus 100 may not include at least one of the imaging unit 101 and the image processing unit 102. If the image transmission apparatus 100 does not include at least one of the imaging unit 101 and the image processing unit 102, image data may be input from the other apparatus to the image transmission apparatus 100.

Figure 4:
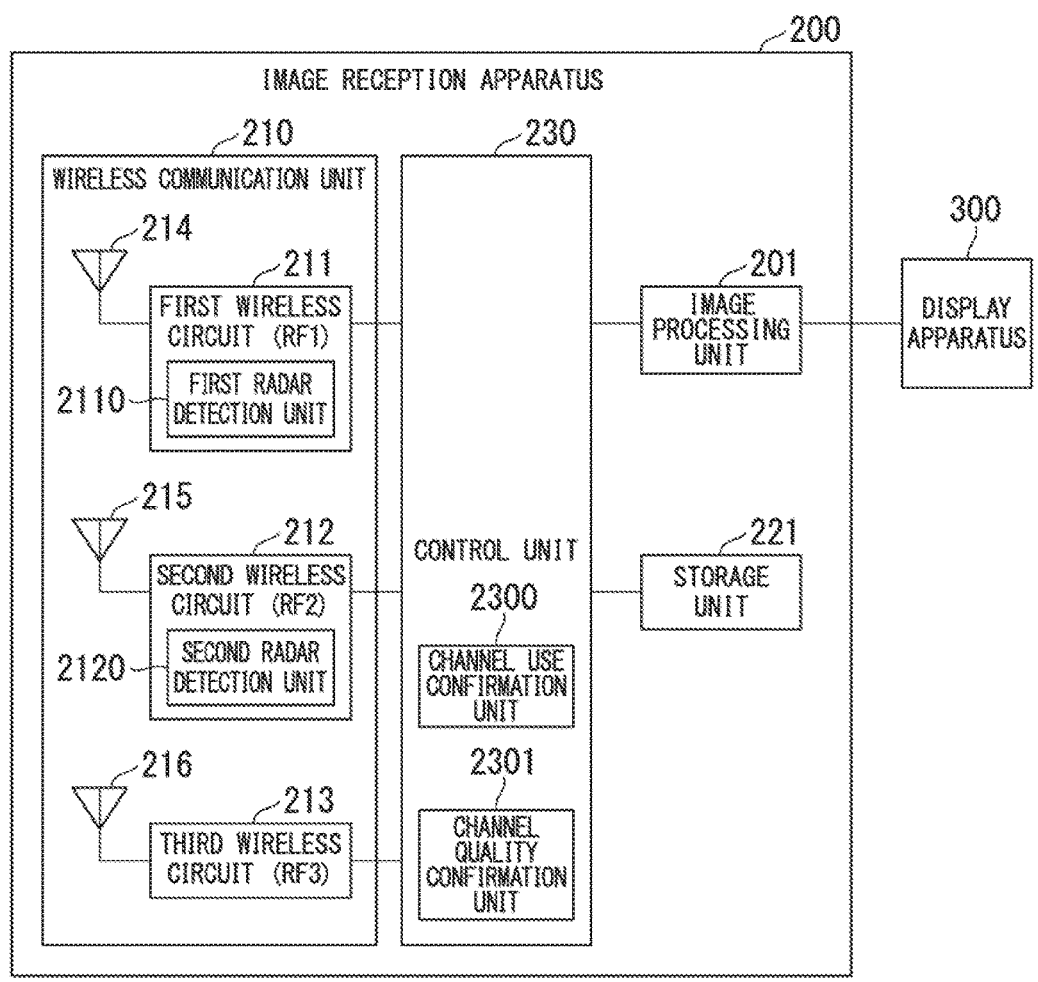
FIG. 4 is a block diagram showing a configuration of an image reception apparatus according to the first embodiment of the present invention.

FIG. 4 shows a configuration of the image reception apparatus 200. As shown in FIG. 4, the image reception apparatus 200 includes an image processing unit 201, a wireless communication unit 210 (a reception-side wireless communication unit), a storage unit 221, and a control unit 230.

The image processing unit 201 is an image processing circuit. The image processing unit 201 performs image processing on received image data. For example, the image processing unit 201 converts the image data into display data of a format used for displaying an image. If the image data is compressed, the image processing unit 201 may decompress the image data. The image processing unit 201 outputs the display data to the display apparatus 300. The display apparatus 300 displays an image on the basis of display data.

The wireless communication unit 210 includes a plurality of wireless circuits. That is, the wireless communication unit 210 includes a first wireless circuit 211 (RF1), a second wireless circuit 212 (RF2), and a third wireless circuit 213 (RF3). Also, the wireless communication unit 210 includes a plurality of antennas. That is, the wireless communication unit 210 includes a first antenna 214, a second antenna 215, and a third antenna 216.

The first wireless circuit 211, the second wireless circuit 212, and the third wireless circuit 213 are wireless communication circuits. The first wireless circuit 211, the second wireless circuit 212, and the third wireless circuit 213 include a high-frequency circuit unit necessary for wireless communication, a circuit unit for encoding and decoding, and a buffer memory. The first antenna 214 is connected to the first wireless circuit 211. The second antenna 215 is connected to the second wireless circuit 212. The third antenna 216 is connected to the third wireless circuit 213. For example, a wireless LAN protocol (IEEE 802.11) is used as a wireless communication scheme.

The first wireless circuit 211 performs wireless communication with the image transmission apparatus 100 via the first antenna 214. The first wireless circuit 111 and the first wireless circuit 211 perform wireless communication using one communication channel. The second wireless circuit 212 wirelessly communicates with the image transmission apparatus 100 via the second antenna 215. The second wireless circuit 112 and the second wireless circuit 212 perform wireless communication using one communication channel. The third wireless circuit 213 performs wireless communication with the image transmission apparatus 100 via the third antenna 216. The third wireless circuit 113 and the third wireless circuit 213 perform wireless communication using one communication channel. The first wireless circuit 211, the second wireless circuit 212, and the third wireless circuit 213 transmit necessary information to the image transmission apparatus 100 by wireless communication. The first wireless circuit 211, the second wireless circuit 212, and the third wireless circuit 213 receive image data or necessary information from the image transmission apparatus 100 by wireless communication.

The first wireless circuit 211, the second wireless circuit 212, and the third wireless circuit 213 can simultaneously perform wireless communication by using different communication channels. Therefore, the wireless communication unit 210 can perform wireless communication by simultaneously using a plurality of different communication channels.

The first wireless circuit 211 includes a first radar detection unit 2110. The second wireless circuit 212 includes a second radar detection unit 2120. The first radar detection unit 2110 and the second radar detection unit 2120 execute a detection process on radio waves of radar (radar pulses) in a communication channel that has a possibility of being used for image transmission. The first radar detection unit 2110 executes a detection process on radio waves of the radar in the communication channel set in the first wireless circuit 211. The second radar detection unit 2120 executes a detection process on radio waves of the radar in the communication channel set in the second wireless circuit 212. The first radar detection unit 2110 and the second radar detection unit 2120 can execute the detection process on the radio waves of the radar at the same time.

The storage unit 221 is a memory. Program data for controlling the image reception apparatus 200 and various setting information including communication setting parameters are stored in the storage unit 221. The storage unit 221 is used as a buffer, a work area, and a temporary area. The buffer is used for temporary storage of the received image data. The work area is used for calculation and the like by the control unit 230. The temporary area is used for temporarily storing various setting information and the like.

The control unit 230 is a processor such as a CPU. The control unit 230 operates in accordance with a program stored in the storage unit 221. Thereby, the control unit 230 controls the operation of the image reception apparatus 200. The control unit 230 includes a channel use confirmation unit 2300 and a channel quality confirmation unit 2301. The channel use confirmation unit 2300 executes channel use confirmation, that is, CAC. The channel quality confirmation unit 2301 executes channel quality confirmation (scanning) for confirming the quality of the communication channel.

For example, the channel quality confirmation unit 2301 confirms the quality of the communication channel by passive scanning. The image reception apparatus 200 may be connected to the image transmission apparatus 100 and the image reception apparatus 200 may perform active scanning for monitoring the connected communication channel. In the active scanning, the image reception apparatus 200 transmits a beacon signal for inquiry, and the image reception apparatus 200 confirms received signal strength of a response from the image transmission apparatus 100 in response to the beacon signal. Thereby, a more detailed search of peripheral devices using communication channels is possible. If active scanning using a communication channel belonging to W53 or W56 is performed, CAC is executed after the communication channel is changed. Thereafter, the channel quality confirmation unit 2301 uses the wireless communication unit 210 to transmit the beacon signal for inquiry.

For example, a function of the control unit 230 can be implemented as a function of software by a computer of the image reception apparatus 200 reading and executing a program including a command for defining the operation of the control unit 230. An implementation form of this program is similar to an implementation form of a program implementing the function of the control unit 130.

The image reception apparatus 200 may not include the image processing unit 201. The image reception apparatus 200 may include a recording medium for recording image data.

The state of each communication channel is managed by a channel state table. The channel state table is stored in the storage unit 221. FIG. 5 shows the channel state table. The channel state table has a channel number A1, classification A2, a communication channel A3, a channel usage rate A4, and a radar detection history A5.

The channel state table includes information on a communication channel of a 5 GHz band. The channel number A1 is a number given for convenience. The classification A2 indicates a band to which each communication channel belongs. Each communication channel belongs to one band of W52, W53, and W56. W52 is a band in which DFS is unnecessary. Bands other than W52, i.e., W53 and W56, are bands in which DFS is necessary. The communication channel A3 is a communication channel belonging to each band. In FIG. 5, there are 19 communication channels. Channel 36, channel 40, channel 44, and channel 48 belong to W52. Channel 52, channel 56, channel 60, and channel 64 belong to W53. Channel 100, channel 104, channel 108, channel 112, channel 116, channel 120, channel 124, channel 128, channel 132, channel 136, and channel 140 belong to W56. Details of FIG. 5 merely show one example at the time of filing of the present application. Details of FIG. 5 can be changed according to the Radio Law, the revision of the standards, or the like.

Because there are few communication channels in W52, the communication channels are estimated to be congested. Thus, there is much interference at W52. Therefore, if communication using a communication channel belonging to W52 is performed, switching to a communication channel belonging to a band other than W52 is performed so that a communication time is shortened.

CAC is executed before communication using a band other than W52, that is, a communication channel belonging to W53 or W56, is performed. In CAC, the communication channel is continuously monitored for a predetermined time. In this monitoring, detecting radio waves of the radar is performed. If it is confirmed that radio waves of the radar are not detected for a predetermined time according to this monitoring, CAC is completed. After CAC is completed, it is possible to use the monitored communication channel. While CAC is executed, the channel use confirmation unit 2300 stops outputting radio waves in the communication channel from the wireless communication unit using the communication channel on which CAC is executed. For example, the execution time of CAC is at least 60 seconds. The execution time of CAC is a time set by the Radio Law at the time of filing of the present application. The execution time of CAC can be changed according to the revision of the Radio Law or the like.

While the communication channel belonging to W53 or W56 is used, ISM is executed. That is, after the connection is completed on the communication channel belonging to W53 or W56, ISM is executed until the connection is stopped. In ISM, the communication channel in use is continuously monitored. In this monitoring, detecting radio waves of the radar is performed. If radio waves of the radar are detected by ISM during the image transmission, switching of the communication channel is performed.

The channel usage rate A4 indicates the quality of the communication channel. The channel quality confirmation unit 2301 updates the channel usage rate A4 on the basis of a result of channel quality confirmation. The quality of the communication channel with a relatively high channel usage rate A4 is relatively low. The quality of the communication channel with a relatively low channel usage rate A4 is relatively high.

The radar detection history A5 indicates whether or not radio waves of the radar have been detected in the communication channel. If radio waves of the radar have been detected, 1 is recorded in the radar detection history A5. If radio waves of the radar have not been detected, 0 is recorded in the radar detection history A5.

The following description supplements the description of the configuration of the image transmission apparatus 100. Any one of the three wireless circuits of the image transmission apparatus 100 is connected to the wireless circuit operating in the image transmission mode of the image reception apparatus 200. The one wireless circuit receives communication information from the image reception apparatus 200. The communication information includes information on an operation mode of any one of the first wireless circuit 211, the second wireless circuit 212, and the third wireless circuit 213 and information on a communication channel to be used for image data communication. The communication information is transmitted and received during a period in which image transmission is not performed. The wireless circuit that has received the communication information outputs the received communication information to the control unit 130.

The above-described one wireless circuit receives a radar detection notification from the image reception apparatus 200. The radar detection notification indicates that radio waves of the radar have been detected by one of the first radar detection unit 2110 and the second radar detection unit 2120. Also, the above-described one wireless circuit receives communication rate information indicating a communication rate $R_1$ from the image reception apparatus 200. The radar detection notification and the communication rate information are transmitted and received during a period in which image transmission is not performed. The wireless circuit that has received the radar detection notification and the communication rate information outputs the received radar detection notification and communication rate information to the control unit 130.

The data amount reduction unit 1020 will be described. The data amount reduction unit 1020 reduces the amount of image data if the amount of data communicated exceeds a predetermined amount when image data communication is performed for a predetermined time at a predetermined frame rate. If the data reduction instruction is received from the control unit 130, the data amount reduction unit 1020 acquires a channel switching time $T_1$, an image transmission switching time $T_2$, a frame rate $S_1$, the communication rate $R_1$, and the amount of data $D_1$ from the storage unit 121.

The channel switching time $T_1$ indicates a time from a point in time at which the radio waves of the radar are detected in the communication channel on which image data communication is performed to a point in time at which the switching of the communication channel is completed. The channel switching time $T_1$ indicates a sum of a time in which it is possible to perform wireless image data communication and a time in which the wireless image data communication must be stopped. The image transmission switching time $T_2$ indicates a time during which it is possible to perform the wireless image data communication in the channel switching time $T_1$. The image transmission switching time $T_2$ is a total time during which communication using the communication channel in which the radio waves are detected may be performed after the radio waves of the radar are detected. The image transmission switching time $T_2$ is shorter than the channel switching time $T_1$. For example, the channel switching time $T_1$ is 10 seconds. For example, the image transmission switching time $T_2$ is 260 milliseconds. The amount of data $D_1$ indicates the amount of data of one frame of image data whose amount is not reduced.

The data amount reduction unit 1020 calculates a data reduction rate C according to Formulas (1) to (4). In each of the following formulas, the symbol * indicates multiplication. Formula (1) represents the number of frames F within the channel switching time $T_1$.
[Math. 1]

Formula (2) represents the total amount of data capable of being transmitted within the image transmission switching time $T_2$.
[Math. 2]

Formula (3) represents the amount of data Bpf capable of being transmitted in one frame.
[Math. 3]

Formula (4) represents a data reduction rate C.
[Math. 4]

The total amount of data capable of being transmitted or data whose transmission is stopped which is prepared in the channel switching time $T_1$ is defined as E. The total amount E includes a total amount of image data B capable of being transmitted within the image transmission switching time $T_2$. Thus, Formulas (5) to (8) are established.
[Math. 5]

Therefore, the data reduction rate C is smaller than 1 at all times according to Formula (8).

After the data reduction rate C is calculated, the data amount reduction unit 1020 reduces the amount of image data on the basis of the data reduction rate C. The amount of image data whose amount is reduced by the data amount reduction unit 1020 is the amount obtained by multiplying the amount of image data before the amount of data is reduced by the data reduction rate C.

After the amount of image data is reduced on the basis of the calculated data reduction rate C, the data amount reduction unit 1020 further reduces the amount of image data if the data reduction instruction is further received from the control unit 130. For this, the data amount reduction unit 1020 calculates a data reduction rate C' that is smaller than the data reduction rate C. A frame rate $S_2$ smaller than the frame rate $S_1$ and the amount of data $D_2$ smaller than the amount of data $D_1$ are used. The amount of data $D_2$ indicates the amount of image data of one frame in which the amount of data is reduced at the data reduction rate C.

The data amount reduction unit 1020 calculates the data reduction rate C' according to Formulas (9) and (10). Formula (9) represents the number of frames F' within the channel switching time $T_1$.
[Math. 6]

Formula (10) represents the data reduction rate C'.
[Math. 7]

As shown in Formula (11), the frame rate $S_1$ is larger than the frame rate $S_2$. As shown in Formula (12), the amount of data $D_1$ is larger than the amount of data $D_2$. Therefore, Formula (15) is established from Formula (13) on the basis of Formulas (4) and (10) for the data reduction rate C and the data reduction rate C'.
[Math. 8]

Therefore, according to Formula (15), the data reduction rate C' is smaller than the data reduction rate C.

The image transmission apparatus 100 may include an operation unit that receives an input from the user. The user may change the frame rate $S_1$ and the amount of data $D_1$ via the operation unit. The user may select a case in which priority is given to the image quality and a case in which priority is given to real-time communication via the operation unit. If the priority is given to the image quality, the data reduction rate C is calculated on the basis of a frame rate $S_1'$ smaller than the frame rate $S_1$ and the amount of data $D_1'$ larger than the amount of data $D_1$. If the priority is given to the real-time communication, the data reduction rate C is calculated on the basis of a frame rate $S_1''$ larger than the frame rate $S_1$ and the amount of data $D_1''$ smaller than the amount of data $D_1$.

The storage unit 121 stores fixed information. The fixed information includes the channel switching time $T_1$ and the image transmission switching time $T_2$. Further, the storage unit 121 stores the frame rate $S_1$, the communication rate $R_1$, and the amount of data $D_1$ from the control unit 130. The storage unit 121 acquires the frame rate $S_1$, the communication rate $R_1$, and the amount of data $D_1$ from the control unit 130. The storage unit 121 updates each piece of stored information on the basis of each piece of acquired information. For example, the acquisition and update of the above-described information by the storage unit 121 are executed when information is input by the user. The acquisition and update of the above-described information by the storage unit 121 may be performed during a video blanking period. The storage unit 121 may not store the communication rate $R_1$ and the amount of data $D_1$.

The following description supplements the description of the configuration of the image reception apparatus 200. Any one of the three wireless circuits provided in the image reception apparatus 200 is connected to the corresponding wireless circuit of the image transmission apparatus 100 and operates in the image transmission mode. The one wireless circuit transmits communication information to the image transmission apparatus 100. The communication information is output from the control unit 230 to the wireless circuit.

The above-described one wireless circuit transmits a radar detection notification to the image transmission apparatus 100. The radar detection notification is output from the control unit 230 to the wireless circuit. Also, the above-described one wireless circuit transmits information indicating the communication rate $R_1$ to the image transmission apparatus 100. Information indicating the communication rate $R_1$ is calculated by the wireless circuit.

When the third wireless circuit 213 operates in a communication monitoring mode, the third wireless circuit 213 may acquire a communication quality confirmation instruction from the channel quality confirmation unit 2301. In this case, the third wireless circuit 213 outputs the communication quality information to the channel quality confirmation unit 2301. The channel quality confirmation unit 2301 performs scanning by measuring a BUSY time of a channel per predetermined time on the basis of the communication quality information. The BUSY time is a time during which radio waves are output by another wireless device or the like and is a time during which data transmission from the wireless communication unit 210 cannot be performed. The channel quality confirmation unit 2301 measures a received signal strength (RSSI) level indicated by the communication quality information and measures a time. The channel quality confirmation unit 2301 determines whether or not the communication channel is BUSY on the basis of the measured received signal strength level and time.

If radio waves of the radar are detected, the first radar detection unit 2110 and the second radar detection unit 2120 output a radar detection notification to the control unit 230.

The channel quality confirmation unit 2301 outputs a communication quality confirmation instruction to the third wireless circuit 213. The channel quality confirmation unit 2301 acquires communication quality information from the third wireless circuit 213 that has acquired the communication quality confirmation instruction. The channel quality confirmation unit 2301 calculates a channel usage rate on the basis of the communication quality information. The channel usage rate is recorded in the channel state table. The channel quality confirmation unit 2301 performs a determination related to the quality of the communication channel on the basis of the channel usage rate.

The storage unit 221 acquires communication information and communication quality information from the control unit 230. The storage unit 221 updates each piece of stored information on the basis of each piece of acquired information.

The outline of the operation in the first embodiment will be described. In the following description, the radar detection unit corresponds to the first radar detection unit 2110 and the second radar detection unit 2120.

The wireless communication unit 110 (the transmission-side wireless communication unit) transmits image data by radio waves. The image data is generated in synchronization with an imaging clock. The image data is transmitted in the order in which the image data is generated. The wireless communication unit 210 (the reception-side wireless communication unit) receives the image data transmitted by the wireless communication unit 110 by radio waves. The radar detection unit executes a detection process on radio waves of the radar in the communication channel that has a possibility of being used for image data communication by the wireless communication unit 110 and the wireless communication unit 210. The data amount reduction unit 1020 reduces the amount of image data.

The wireless communication unit 110 and the wireless communication unit 210 stop image data communication using the first communication channel within a first time (the channel switching time $T_1$) from a first point in time at which the radar detection unit detects the radio waves of the radar in the first communication channel while the image data communication using the first communication channel is performed. The first communication channel is a communication channel in which detection of the radar is necessary or that has a possibility of being used by the radar. The wireless communication unit 110 and the wireless communication unit 210 start image data communication using the second communication channel within the first time from a first point in time. The second communication channel is a communication channel in which detection of the radar is not necessary or that is not used by the radar.

The data amount reduction unit 1020 reduces the amount of image data so that a total communication time of image data to be communicated by the wireless communication unit 110 and the wireless communication unit 210 from the first point in time to a second point in time at which image data communication using the first communication channel is stopped falls within a second time (the image transmission switching time $T_2$). The wireless communication unit 110 and the wireless communication unit 210 perform image data communication in which the amount of data is reduced by the data amount reduction unit 1020 using the first communication channel from the first point in time to the second point in time.

The storage unit 121 stores the first time, the second time, and the frame rate. The data amount reduction unit 1020 determines the amount of data reduction on the basis of the first time, the second time, and the frame rate stored in the storage unit 121.

The channel quality confirmation unit 2301 confirms qualities of a plurality of communication channels different from the first communication channel when the image data communication using the first communication channel is being performed. A communication channel with relatively high quality among the plurality of communication channels whose qualities have been confirmed by the channel quality confirmation unit 2301 is set as the second communication channel.

The following description supplements the above description. The imaging unit 101 generates image data in synchronization with an imaging clock. The image data constitutes moving-image data. Each piece of the image data is data of one frame. The wireless communication unit 110 transmits the image data by radio waves in the order in which the image data is generated. The wireless communication unit 210 receives the image data by radio waves in the order in which the image data is generated.

The amount of data reduction indicates a magnitude of data reduction. The amount of data reduction corresponds to the data reduction rate C. The data amount reduction unit 1020 determines the amount of data reduction so that the total amount of image data to be transmitted at a predetermined frame rate in the second time becomes smaller than the total amount of image data if image data is transmitted at the predetermined frame rate in a time having the same length as the first time.

The channel use confirmation unit 2300 executes channel use confirmation for confirming whether or not the communication channel is usable by continuously executing the detection process by the radar detection unit for a predetermined time. The channel use confirmation unit 2300 executes the channel use confirmation using the third communication channel. The third communication channel is a communication channel in which detection of the radar is necessary or that has a possibility of being used by the radar. The third communication channel is different from the first communication channel. If radio waves of the radar are detected in the first communication channel, a communication channel with relatively high quality is set among the second communication channel and the third communication channel on which the channel use confirmation is completed. The wireless communication unit 110 and the wireless communication unit 210 start image data communication using the second or third communication channel after the image data communication using the first communication channel is stopped. Alternatively, the wireless communication unit 110 and the wireless communication unit 210 stop the image data communication using the first communication channel after the image data communication using the second communication channel or the third communication channel is started. The channel use confirmation unit 2300 executes channel use confirmation using a communication channel different from the communication channel used for image data communication. While the channel use confirmation is executed, the channel use confirmation unit 2300 stops outputting radio waves in the communication channel from the wireless communication unit 210 using the communication channel on which the channel use confirmation is being executed.

The channel use confirmation unit 2300 executes channel use confirmation using the first communication channel before the image data communication using the first communication channel is performed. Also, before the image data communication using the third communication channel is performed, the channel use confirmation unit 2300 executes channel use confirmation using the third communication channel.

The above-described first communication channel and third communication channel are communication channels belonging to the use band of the radar. That is, the first communication channel and the third communication channel are communication channels belonging to bands other than W52. The above-described second communication channel is a communication channel belonging to W52. That is, the second communication channel is a communication channel belonging to a band other than the band used by the radar. The band other than the band used by the radar does not overlap the band used by the radar. The above-described first time is the channel switching time $T_1$. The above-described second time is the image transmission switching time $T_2$.

The wireless communication unit 110 and the wireless communication unit 210 start image data communication using the second communication channel within the first time from the first point in time at which the radio waves of the radar are detected in the first communication channel. Thus, image transmission can be continued.

The wireless communication unit 110 and the wireless communication unit 210 start image data communication using the second communication channel within the first time from the first point in time. The wireless communication unit 110 and the wireless communication unit 210 stop the image data communication using the second communication channel after the channel use confirmation using the third communication channel is completed. The wireless communication unit 110 and the wireless communication unit 210 start image data communication using the third communication channel after the channel use confirmation using the third communication channel is completed. Therefore, image transmission can be continued. Also, it is possible to shorten the use time of the second communication channel with much interference. Communication channel switching from the second communication channel to another communication channel is an additional matter of the first embodiment.

For example, the channel use confirmation unit 2300 sets a communication channel with highest quality among the plurality of communication channels whose qualities have been confirmed by the channel quality confirmation unit 2301 as the third communication channel. The wireless communication unit 110 and the wireless communication unit 210 set a communication channel with highest quality among the plurality of communication channels whose qualities have been confirmed by the channel quality confirmation unit 2301 as the second communication channel or the third communication channel. Because the communication channel with relatively high quality is set as the second communication channel or the third communication channel, the communication quality is secured.

Hereinafter, the operation mode of the first wireless circuit 211 is referred to as an RF1 mode. Likewise, hereinafter, the operation mode of the second wireless circuit 212 is referred to as an RF2 mode. Similarly, hereinafter, the operation mode of the third wireless circuit 213 is referred to as an RF3 mode. Information indicating the set operation mode is stored in the storage unit 221.

Figure 6:
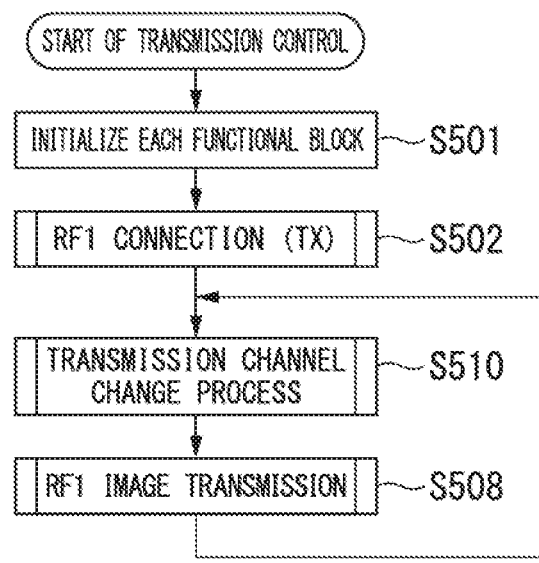
FIG. 6 is a flowchart showing a procedure of an operation of the image transmission apparatus according to the first embodiment of the present invention.

Details of an operation in the first embodiment will be described. The operation of the image transmission apparatus 100 will be described. FIGS. 6 to 9 show a procedure of the operation of the image transmission apparatus 100. FIG. 6 shows a procedure of transmission control.

When the image transmission apparatus 100 is powered on, the control unit 130 initializes each functional block related to the first wireless circuit 111, the second wireless circuit 112, and the third wireless circuit 113 (step S501).

Figure 7:
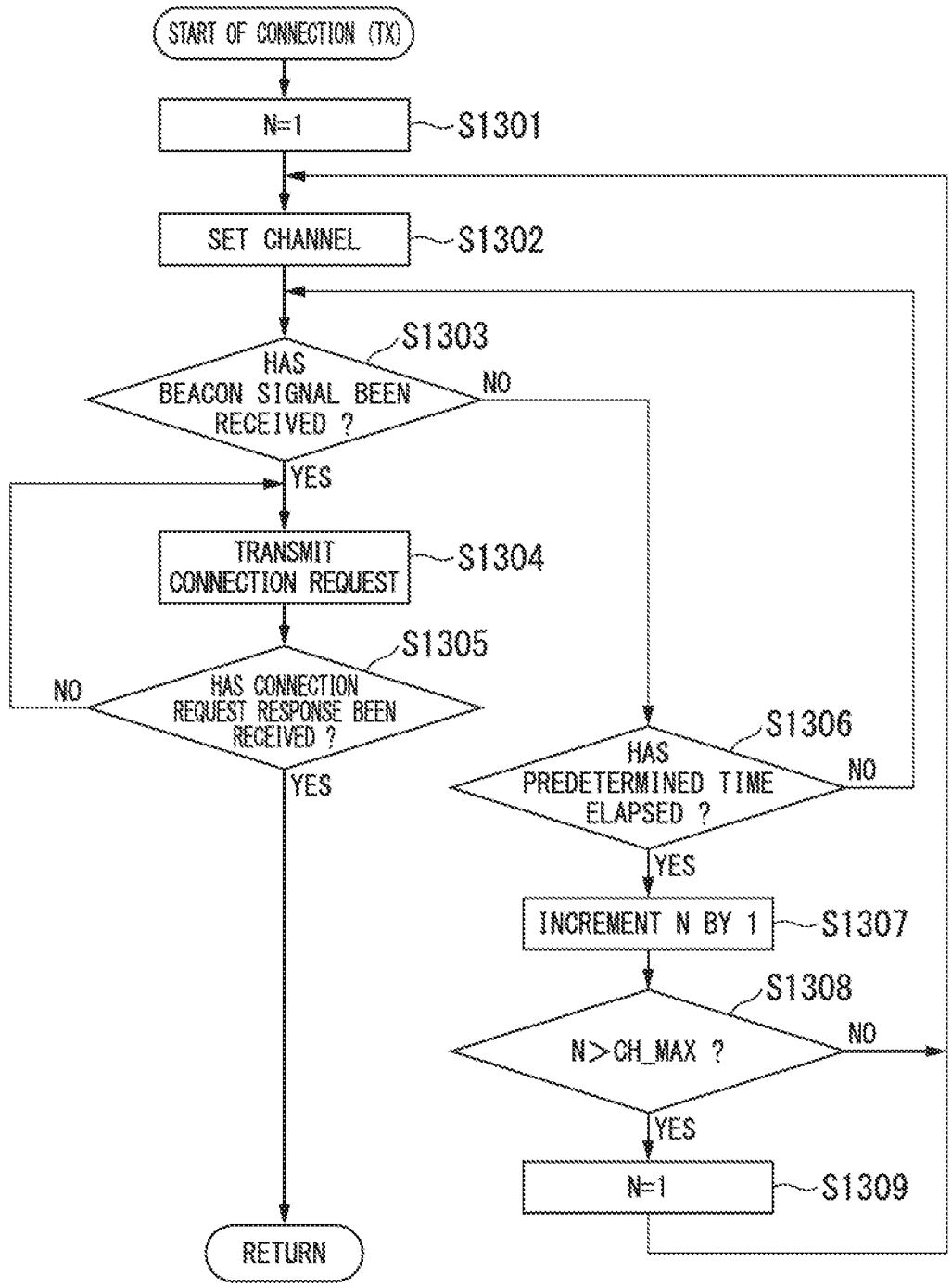
FIG. 7 is a flowchart showing a procedure of an operation of the image transmission apparatus according to the first embodiment of the present invention.

After the processing in step S501 is executed, the control unit 130 performs control for performing a connection to the wireless communication unit 210 (the first wireless circuit 211) using the wireless communication unit 110 (the first wireless circuit 111) (step S502). Thereby, the wireless communication unit 110 (the first wireless circuit 111) is connected to the wireless communication unit 210 (the first wireless circuit 211). In step S502, the process shown in FIG. 7 is executed. Details of the process shown in FIG. 7 will be described below.

Figure 8:
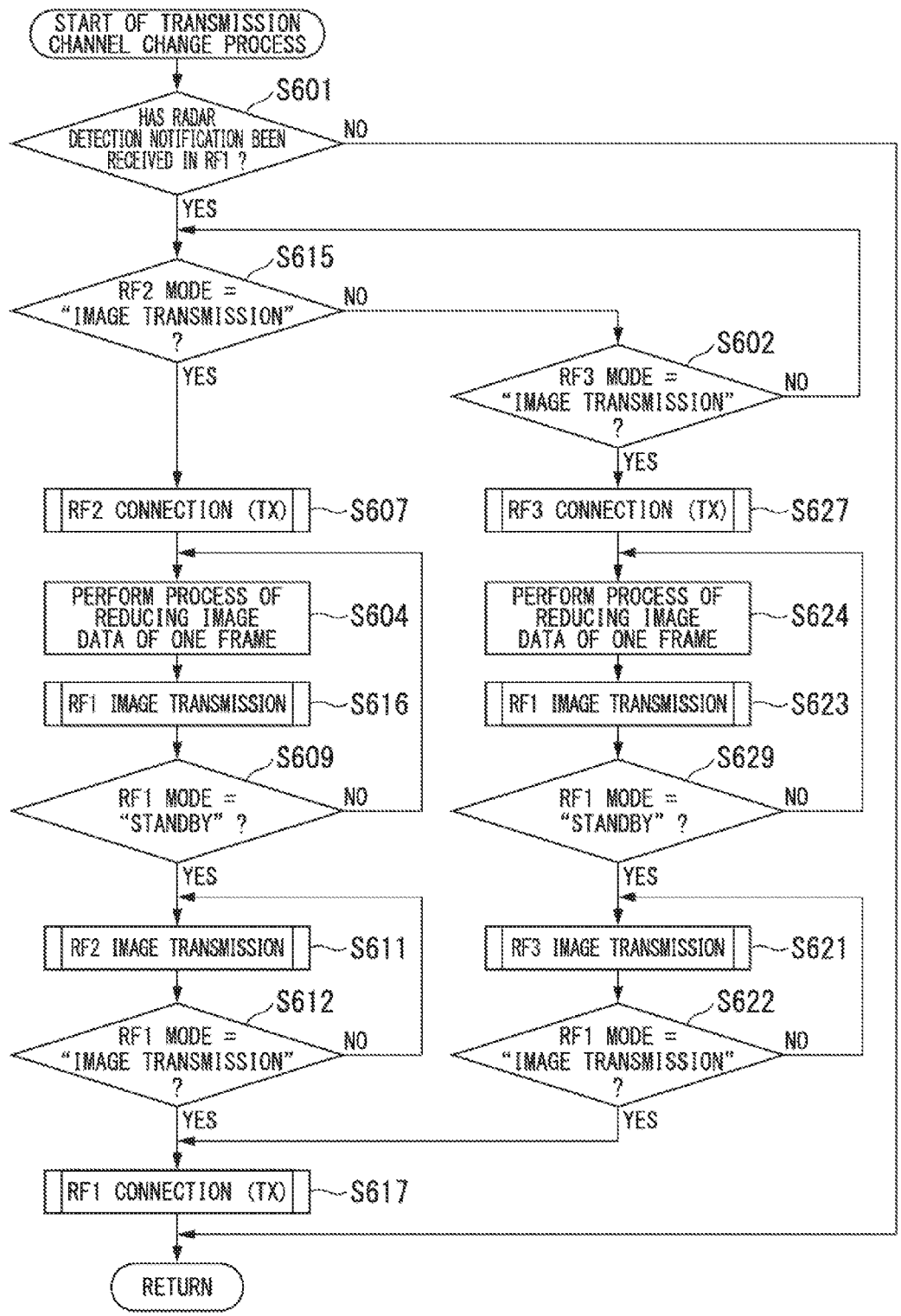
FIG. 8 is a flowchart showing a procedure of an operation of the image transmission apparatus according to the first embodiment of the present invention.

After the processing in step S502 is executed, a transmission channel change process is executed (step S510). In the transmission channel change process, processing related to a change in the communication channel to be used for image data communication is executed. In step S502, the process shown in FIG. 8 is executed. Details of the process shown in FIG. 8 will be described below.

Figure 9:
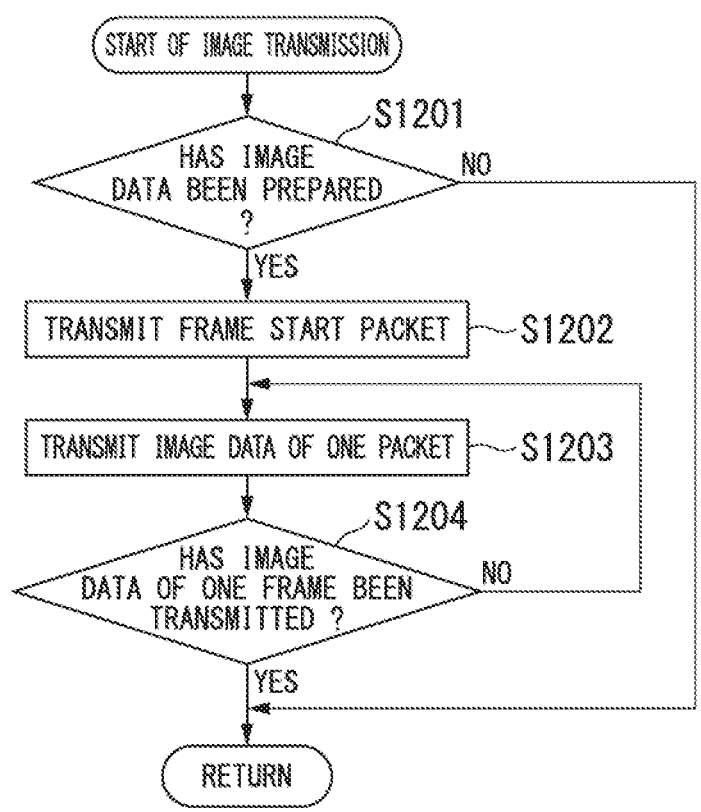
FIG. 9 is a flowchart showing a procedure of an operation of the image transmission apparatus according to the first embodiment of the present invention.

After the processing in step S510 is executed, the control unit 130 performs control for transmitting image data by radio waves using the wireless communication unit 110 (the first wireless circuit 111) (step S508). Thereby, the wireless communication unit 110 (the first wireless circuit 111) transmits image data by radio waves. In step S508, one frame of image data whose amount is not reduced is transmitted. In step S508, the process shown in FIG. 9 is executed. Details of the process shown in FIG. 9 will be described below. After the processing in step S508 is executed, the processing in step S510 is executed.

FIG. 7 shows a procedure of an operation of the image transmission apparatus 100 when the connection is performed. When a connection using a communication channel set in one of the third wireless circuits of the image transmission apparatus 100 is performed, the process is executed in accordance with FIG. 7. Hereinafter, a process executed in the connection using the communication channel set in the first wireless circuit 111 will be described.

The control unit 130 sets a variable N to 1 (step S1301). The variable N corresponds to the channel number A1 shown in FIG. 5.

After the variable N is set to 1, the control unit 130 sets a communication channel in the first wireless circuit 111 (step S1302). In step S1302, the control unit 130 sets the communication channel corresponding to the variable N in the first wireless circuit 111. For example, if the variable N is 1, a communication channel corresponding to a channel number 1 is set in the first wireless circuit 111. As shown in FIG. 5, the communication channel corresponding to the channel number 1 is channel 36 belonging to W52.

After the communication channel is set, the control unit 130 monitors the wireless communication unit 110 (the first wireless circuit 111) and determines whether or not a beacon signal has been received (step S1303). If the communication channel set in the wireless communication unit 110 (the first wireless circuit 111) is the same as the communication channel set in the wireless communication unit 210 (the first wireless circuit 211), the wireless communication unit 110 (the first wireless circuit 111) receives a beacon signal by radio waves. Until the beacon signal is received, outputting the radio waves from the first wireless circuit 111 is stopped.

If the beacon signal has been received in step S1303, the control unit 130 performs control for transmitting a connection request by radio waves using the wireless communication unit 110 (the first wireless circuit 111) (step S1304). Thereby, the wireless communication unit 110 (the first wireless circuit 111) transmits the connection request by radio waves.

After the connection request is transmitted, a connection request response is transmitted from the image reception apparatus 200 that has received the connection request. The wireless communication unit 110 (the first wireless circuit 111) receives the connection request response by radio waves. The control unit 130 monitors the wireless communication unit 110 (the first wireless circuit 111) and determines whether or not the connection request response has been received (step S1305).

If the connection request response has not been received in step S1305, the processing in step S1304 is executed. If the connection request response has been received in step S1305, the connection is completed. After the connection is completed, the process shown in FIG. 7 ends.

If the beacon signal has not been received in step S1303, the control unit 130 determines whether or not a predetermined time has elapsed from a point in time at which the communication channel was set in the first wireless circuit 111 (corresponding to step S1302) (step S1306). If the predetermined time has not elapsed, the processing in step S1303 is executed.

$$F = T_1 * S_1 \quad (1)$$

If the predetermined time has elapsed, the control unit 130 increments the variable N by 1 (step S1307). After the variable N is incremented by 1, the control unit 130 determines whether or not the variable N is larger than a maximum channel number CH_MAX (step S1308). As shown in FIG. 5, the maximum channel number CH_MAX is 19.

$$B = T_2 * R_1 \quad (2)$$

If the variable N is less than or equal to the maximum channel number CH_MAX in step S1308, the processing in step S1302 is executed. If the variable N is larger than the maximum channel number CH_MAX in step S1308, the control unit 130 sets the variable N to 1 (step S1309). After the variable N is set to 1, the processing in step S1302 is executed.

$$Bpf = B/F \quad (3)$$

FIG. 8 shows a procedure of an operation of the image transmission apparatus 100 when the transmission channel change process is performed.

$$C = \frac{Bpf}{D_1} = \frac{T_2 * R_1}{D_1 * T_1 * S_1} \quad (4)$$

The control unit 130 monitors the wireless communication unit 110 (the first wireless circuit 111) and determines whether or not a radar detection notification has been received (step S601). The wireless communication unit 110 (the first wireless circuit 111) receives the radar detection notification transmitted from the image reception apparatus 200 by radio waves.

$$\begin{cases} E = F * D_1 & (5) \\ E > B & (6) \end{cases}$$

$$\therefore F * D_1 > B \quad (7)$$

$$\therefore C = \frac{B}{D_1 * F} < 1 \quad (8)$$

If the radar detection notification has not been received in step S601, the process shown in FIG. 8 ends. If the radar detection notification has been received in step S601, the control unit 130 acquires communication information of the second wireless circuit 212 from the second wireless circuit 112 and determines whether or not the RF2 mode is the image transmission mode (step S615). The image transmission mode is a mode for performing image data communication.

In step S615, if the RF2 mode is the image transmission mode, the control unit 130 performs control for performing a connection to the wireless communication unit 210 (the second wireless circuit 212) using the wireless communication unit 110 (the second wireless circuit 112) (step S607). Thereby, the wireless communication unit 110 (the second wireless circuit 112) is connected to the wireless communication unit 210 (the second wireless circuit 212). In step S607, the process shown in FIG. 7 is executed.

After the processing in step S607 is executed, the control unit 130 outputs a data reduction instruction to the data amount reduction unit 1020 (step S604). Thereby, the control unit 130 causes the data amount reduction unit 1020 to execute a process of reducing the amount of image data of one frame. The data amount reduction unit 1020 calculates the data reduction rate C on the basis of the channel switching time $T_1$, the image transmission switching time $T_2$, the frame rate $S_1$, the communication rate $R_1$, and the amount of data $D_1$. The data amount reduction unit 1020 reduces the amount of image data of one frame output from the imaging unit 101 on the basis of the data reduction rate C.

After the processing in step S604 is executed, the control unit 130 performs control for transmitting image data by radio waves using the wireless communication unit 110 (the first wireless circuit 111) (step S616). Thereby, the wireless communication unit 110 (the first wireless circuit 111) transmits image data by radio waves. In step S616, image data of one frame with the reduced amount of data is transmitted. In step S616, the process shown in FIG. 9 is executed. Details of the process shown in FIG. 9 will be described below. If radio waves of the radar are detected in the communication channel set in the first wireless circuit 111, the transmission of the image data using the first wireless circuit 111 is continued in step S616 until the channel switching time $T_1$ elapses.

$$F' = T_1 * S_2 \quad (9)$$

After the processing in step S616 is executed, the control unit 130 acquires the communication information of the first wireless circuit 211 from the first wireless circuit 111 and determines whether or not the RF1 mode is a standby mode (step S609). The standby mode is a mode of standby in which a connection is not performed.

$$C' = \frac{B}{D_2 * F'} = \frac{T_2 * R_1}{D_2 * T_1 * S_2} \quad (10)$$

If the RF1 mode is not the standby mode in step S609, the processing in step S604 is executed. If the RF1 mode is the standby mode in step S609, the control unit 130 performs control for transmitting image data by radio waves using the wireless communication unit 110 (the second wireless circuit 112) (step S611). Thereby, the wireless communication unit 110 (the second wireless circuit 112) transmits the image data by radio waves. In step S611, image data of one frame in which the amount of data is not reduced is transmitted. In step S611, the process shown in FIG. 9 is executed. Details of the process shown in FIG. 9 will be described below.

$$\begin{cases} S_1 < S_2 & (11) \\ D_1 < D_2 & (12) \end{cases}$$

$$\therefore S_1 * D_1 < S_2 * D_2 \quad (13)$$

$$\therefore \frac{B}{D_2 * T_1 * S_2} < \frac{B}{D_1 * T_1 * S_1} \quad (14)$$

$$\therefore C' < C < 1 \quad (15)$$

After the processing in step S611 is executed, the control unit 130 acquires the communication information of the first wireless circuit 211 from the first wireless circuit 111 and determines whether or not the RF1 mode is the image transmission mode (step S612).

If the RF1 mode is not the image transmission mode in step S612, the processing in step S611 is executed. If the RF1 mode is the image transmission mode in step S612, the control unit 130 performs control for performing a connection to the wireless communication unit 210 (the first wireless circuit 211) using the wireless communication unit 110 (the first wireless circuit 111) (step S617). Thereby, the wireless communication unit 110 (the first wireless circuit 111) is connected to the wireless communication unit 210 (the first wireless circuit 211). In step S617, the process shown in FIG. 7 is executed. After the processing in step S617 is executed, the process shown in FIG. 8 ends.

If the RF2 mode is not the image transmission mode in step S615, the control unit 130 acquires the communication information of the third wireless circuit 213 from the third wireless circuit 113 and determines whether or not the RF3 mode is the image transmission mode (step S602).

If the RF3 mode is not the image transmission mode in step S602, the processing in step S615 is executed. If the RF3 mode is the image transmission mode in step S602, the control unit 130 performs control for performing a connection to the wireless communication unit 210 (the third wireless circuit 213) using the wireless communication unit 110 (the third wireless circuit 113) (step S627). Thereby, the wireless communication unit 110 (the third wireless circuit 113) is connected to the wireless communication unit 210 (the third wireless circuit 213). In step S627, the process shown in FIG. 7 is executed.

After the processing in step S627 is executed, the control unit 130 outputs a data reduction instruction to the data amount reduction unit 1020 (step S624). Thereby, the data amount reduction unit 1020 reduces the amount of image data of one frame output from the imaging unit 101. The processing in step S624 is similar to the processing in step S604.

After the processing in step S624 is executed, an image data transmission process by the first wireless circuit 111 is executed (step S623). In step S623, the process shown in FIG. 9 is executed. The processing in step S623 is similar to the processing in step S616. In step S623, image data of one frame with the reduced amount of data is transmitted. Details of the process shown in FIG. 9 will be described below. If radio waves of the radar are detected in the communication channel set in the first wireless circuit 111, the transmission of the image data using the first wireless circuit 111 is continued in step S623 until the channel switching time $T_1$ elapses.

After the processing in step S623 is executed, the control unit 130 acquires the communication information of the first wireless circuit 211 from the first wireless circuit 111 and determines whether or not the RF1 mode is the standby mode (step S629).

If the RF1 mode is not the standby mode in step S629, the processing in step S624 is executed. If the RF1 mode is the standby mode in step S629, the control unit 130 performs control for transmitting image data by radio waves using the wireless communication unit 110 (the third wireless circuit 113) (step S621). Thereby, the wireless communication unit 110 (the third wireless circuit 113) transmits image data by radio waves. In step S621, image data of one frame in which the amount of data is not reduced is transmitted. In step S621, the process shown in FIG. 9 is executed. Details of the process shown in FIG. 9 will be described below.

After the processing in step S621 is executed, the control unit 130 acquires communication information of the first wireless circuit 211 from the first wireless circuit 111 and determines whether or not the RF1 mode is the image transmission mode (step S622).

If the RF1 mode is not the image transmission mode in step S622, the processing in step S621 is executed. If the RF1 mode is the image transmission mode in step S622, the processing in step S617 is executed.

In steps S604 and S624, the control unit 130 may further output the data reduction instruction to the data amount reduction unit 1020 after the data amount reduction unit 1020 reduces the amount of image data. When the user issues an instruction for changing the frame rate $S_1$ or the amount of data $D_1$, the data reduction rate C may be calculated on the basis of the changed frame rate $S_1$ or the amount of data $D_1$ in steps S604 and S624. If the communication rate $R_1$ is changed due to a change in the communication state, the data reduction rate C may be calculated on the basis of the changed communication rate $R_1$ in steps S604 and S624.

FIG. 9 shows a procedure of an operation of the image transmission apparatus 100 when image data is transmitted. When the transmission of image data using a communication channel set in one of the three wireless circuits of the image transmission apparatus 100 is performed, the process is executed in accordance with FIG. 9. Hereinafter, the process executed in the transmission of the image data using the communication channel set in the first wireless circuit 111 will be described.

The control unit 130 determines whether or not image data has been prepared (step S1201).

If the image data has not been prepared in step S1201, the process shown in FIG. 9 ends. If the image data has been prepared in step S1201, the control unit 130 performs control for transmitting a frame start packet by radio waves using the wireless communication unit 110 (the first wireless circuit 111) (step S1202). Thereby, the wireless communication unit 110 (the first wireless circuit 111) transmits the frame start packet by the radio waves.

After the frame start packet is transmitted, the control unit 130 performs control for transmitting image data of one packet by radio waves using the wireless communication unit 110 (the first wireless circuit 111) (step S1203). Thereby, the wireless communication unit 110 (the first wireless circuit 111) transmits image data of one packet by the radio waves. Image data of one frame is divided into a plurality of pieces of image data. Each of the plurality of pieces of image data is stored in the packet.

Figure 10:
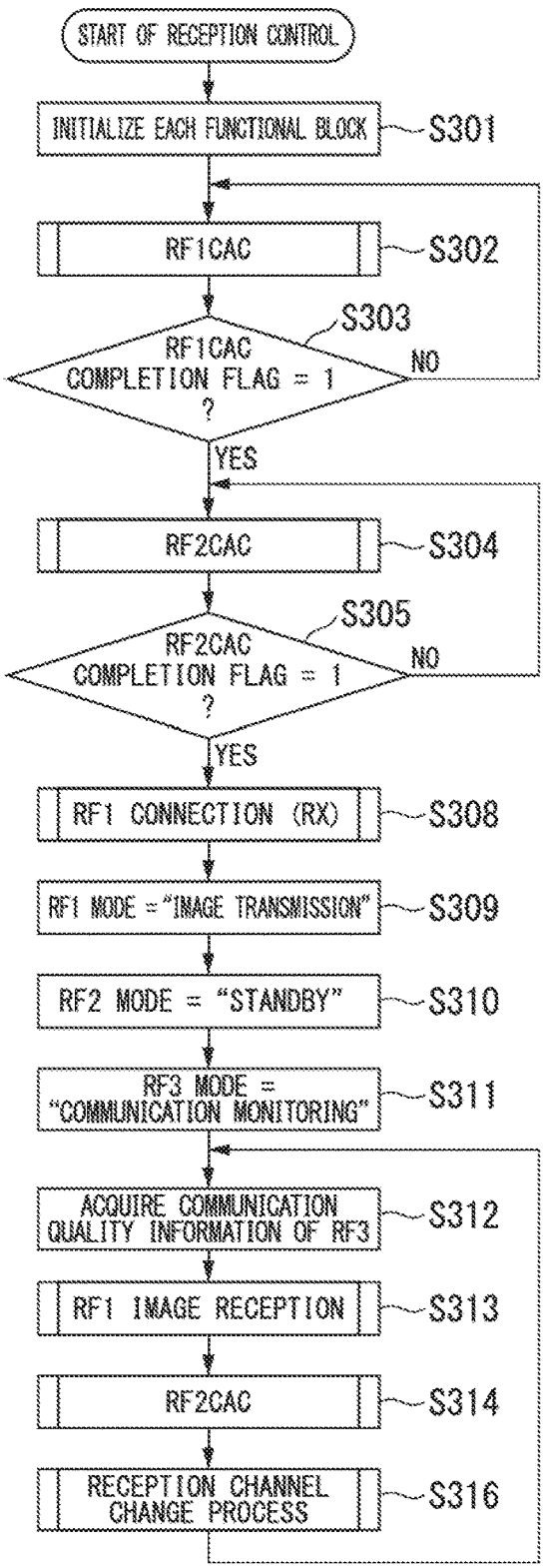
FIG. 10 is a flowchart showing a procedure of an operation of the image reception apparatus according to the first embodiment of the present invention.

After the image data of one packet is transmitted, the control unit 130 determines whether or not the transmission of image data of one frame has been completed (step S1204). If the transmission of the image data of one frame has not been completed in step S1204, the processing in step S1203 is executed. If the transmission of the image data of one frame has been completed in step S1204, the process shown in FIG. 9 ends The operation of the image reception apparatus 200 will be described. FIGS. 10 to 17 show a procedure of the operation of the image reception apparatus 200. FIG. 10 shows a procedure of reception control.

When the image reception apparatus 200 is powered on, the control unit 230 initializes functional blocks related to the first wireless circuit 211, the second wireless circuit 212, and the third wireless circuit 213 (step S301). In step S301, the control unit 230 initializes setting of the communication channel, an RF1CAC timer, an RF1CAC completion flag, and a channel state table.

In step S301, any communication channel belonging to a band other than W52 may be set in the first wireless circuit 211 and the second wireless circuit 212. In step S301, a communication channel belonging to a band of any one of W52, W53, and W56 is set in the third wireless circuit 213. The communication channels set in the first wireless circuit 211, the second wireless circuit 212, and the third wireless circuit 213 are different from one another.

The RF1CAC timer is a timer for measuring an execution time of CAC using the communication channel set in the first wireless circuit 211. For example, an initial value of the RF1CAC timer is 0. After the RF1CAC timer is initialized, the value of the RF1CAC timer increases with the passage of time. In the first embodiment, the RF1CAC timer and the RF2CAC timer are used. The RF2CAC timer is a timer for measuring the execution time of CAC using the communication channel set in the second wireless circuit 212.

The RF1CAC completion flag indicates whether or not CAC using the communication channel set in the first wireless circuit 211 has been completed. For example, an initial value of the RF1CAC completion flag is 0. In the first embodiment, the RF1CAC completion flag and an RF2CAC completion flag are used. The RF2CAC completion flag indicates whether or not CAC using the communication channel set in the second wireless circuit 212 has been completed.

Information on the communication channels set in the first wireless circuit 211, the second wireless circuit 212, and the third wireless circuit 213 is stored in the storage unit 221. The value of the RF1CAC timer and the value of the RF1CAC completion flag are stored in the storage unit 221. The channel state table is stored in the storage unit 221.

In step S301, the first radar detection unit 2110 and the second radar detection unit 2120 start a process of detecting radio waves of the radar.

After the processing in step S301 is executed, the channel use confirmation unit 2300 executes CAC using the communication channel set in the first wireless circuit 211 (step S302). In step S302, the process shown in FIG. 11 is executed.

Figure 11:
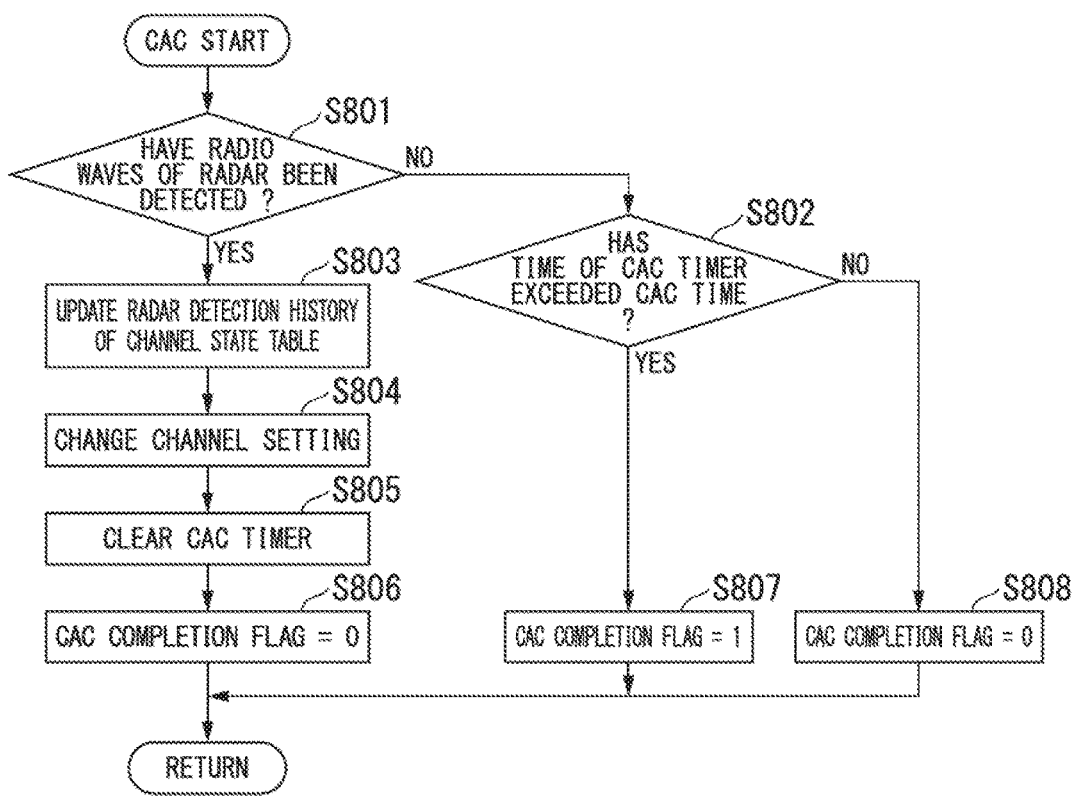
FIG. 11 is a flowchart showing a procedure of an operation of the image reception apparatus according to the first embodiment of the present invention.

FIG. 11 shows a procedure of an operation of the image reception apparatus 200 when CAC is executed. In CAC using a communication channel set in any one of the first wireless circuits, the process shown in FIG. 11 is executed. Hereinafter, processing executed in CAC using the communication channel set in the first wireless circuit 211 will be described.

The channel use confirmation unit 2300 confirms whether or not a radar detection notification has been acquired from the first radar detection unit 2110. Thereby, the channel use confirmation unit 2300 determines whether or not radio waves of the radar have been detected in the communication channel set in the first wireless circuit 211 (step S801).

When it is recognized that a specific radar pulse exceeding a predetermined reference value has been received within a band to which the communication channel set in the first wireless circuit 211 belongs, the radio waves of the radar are detected. For example, a bandwidth of channel 56 of W53 is 20 MHz. A plurality of types of radar pulses are defined. The predetermined reference value is established in the law.

If the radio waves of the radar have been detected in step S801, the channel use confirmation unit 2300 updates the radar detection history of the channel state table (step S803). In step S803, 1 is recorded in the radar detection history of the communication channel set in the first wireless circuit 211 in the channel state table. In the operation of the image reception apparatus 200, as in step S801, there are a plurality of steps in which it is determined whether or not the radio waves of the radar have been detected. In these steps, if it is determined that the radio waves of the radar have been detected, the radar detection history of the channel state table is similarly updated. In the following description, the process of updating the radar detection history of the channel state table will be omitted.

After the radar detection history of the channel state table is updated, the channel use confirmation unit 2300 changes a communication channel set in the first wireless circuit 211 (step S804). In step S804, a communication channel belonging to a band other than W52 may be set in the first wireless circuit 211. In step S804, a communication channel different from a communication channel immediately previously used by the first wireless circuit 211 is set in the first wireless circuit 211.

After the communication channel is changed, the channel use confirmation unit 2300 clears the RF1CAC timer (step S805). That is, the RF1CAC timer is initialized. After the RF1CAC timer is cleared, the channel use confirmation unit 2300 sets the RF1CAC completion flag to 0 (step S806).

If the radio waves of the radar have not been detected in step S801, the channel use confirmation unit 2300 determines whether or not a time indicated by the RF1CAC timer has exceeded a CAC time (step S802). The CAC time is a predetermined time during which CAC of one communication channel continues. For example, the CAC time is 60 seconds.

If the time indicated by the RF1CAC timer has exceeded the CAC time in step S802, the channel use confirmation unit 2300 sets the RF1CAC completion flag to 1 (step S807). That is, if the radio waves of the radar are not continuously detected during the CAC time, CAC is completed. If the time indicated by the RF1CAC timer has not exceeded the CAC time in step S802, the channel use confirmation unit 2300 sets the RF1CAC completion flag to 0 (step S808).

After the processing in one of step S806, step S807, and step S808 is executed, the process shown in FIG. 11 ends.

After the processing is executed in step S302, the control unit 230 determines whether or not the RF1CAC completion flag is 1 (step S303). If the RF1CAC completion flag is not 1 in step S303, CAC using the communication channel set in the first wireless circuit 211 is not completed. Thus, the processing in step S302 is executed again.

If the RF1CAC completion flag is 1 in step S303, the channel use confirmation unit 2300 executes CAC using the communication channel set in the second wireless circuit 212 (step S304). In step S304, the process shown in FIG. 11 is executed.

After the processing in step S304 is executed, the control unit 230 determines whether or not the RF2CAC completion flag is 1 (step S305). If the RF2CAC completion flag is not 1 in step S305, CAC using the communication channel set in the second wireless circuit 212 is not completed. Thus, the processing in step S304 is executed again.

If the RF2CAC completion flag is 1 in step S305, the control unit 230 performs control for performing a connection to the wireless communication unit 110 (the first wireless circuit 111) using the wireless communication unit 210 (the first wireless circuit 211) (step S308). Thereby, the wireless communication unit 210 (the first wireless circuit 211) is connected to the wireless communication unit 110 (the first wireless circuit 111). In step S308, the communication channel set when CAC is completed in step S302 is used. In step S308, the process shown in FIG. 12 is executed.

Figure 12:
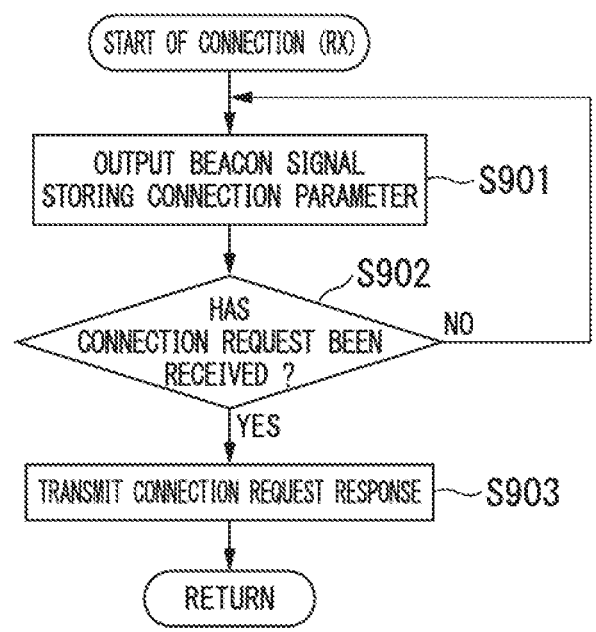
FIG. 12 is a flowchart showing a procedure of an operation of the image reception apparatus according to the first embodiment of the present invention.

FIG. 12 shows a procedure of an operation of the image reception apparatus 200 when the connection is performed. When a connection using a communication channel set in one of the three wireless circuits of the image reception apparatus 200 is performed, the process is executed in accordance with FIG. 12. Hereinafter, the process executed in the connection using the communication channel set in the first wireless circuit 211 will be described.

The control unit 230 performs control for outputting a beacon signal by radio waves using the wireless communication unit 210 (the first wireless circuit 211) (step S901). Thereby, the wireless communication unit 210 (the first wireless circuit 211) wirelessly outputs the beacon signal. Parameters necessary for a wireless connection are stored in the beacon signal. For example, the parameters are a communication channel, a media access control (MAC) address, a service set identifier (SSID), and the like. For example, the beacon signal is transmitted in broadcasting. The beacon signal may be transmitted in multicasting targeting a specific group.

After the beacon signal is output, a connection request is transmitted from the image transmission apparatus 100 that has received the beacon signal. The connection request is a packet for requesting a wireless communication connection partner to perform a connection for data communication. The wireless communication unit 210 (the first wireless circuit 211) receives the connection request by radio waves. The control unit 230 monitors the wireless communication unit 210 (the first wireless circuit 211) and determines whether or not the connection request has been received (step S902). If the connection request has not been received in step S902, the processing in step S901 is executed.

If the connection request has been received in step S902, the control unit 230 performs control for transmitting a connection request response by radio waves using the wireless communication unit 210 (the first wireless circuit 211) (step S903). Thereby, the wireless communication unit 210 (the first wireless circuit 211) transmits the connection request response by radio waves. The connection request response is a response to the connection request. When the connection request response is received by the image transmission apparatus 100, the connection is completed. After the connection request response is transmitted, the process in FIG. 12 ends.

After the processing in step S308 is executed, the control unit 230 sets the RF1 mode to the image transmission mode (step S309). After the processing in step S309 is executed, the control unit 230 sets the RF2 mode to the standby mode (step S310). After the processing in step S310 is executed, the control unit 230 sets the RF3 mode to the communication monitoring mode (step S311). The communication monitoring mode is a mode for executing scanning. In step S311, the channel quality confirmation unit 2301 starts scanning using the third wireless circuit 213.

After the processing in step S311 is executed, the channel quality confirmation unit 2301 outputs a communication quality confirmation instruction to the third wireless circuit 213. The channel quality confirmation unit 2301 acquires communication quality information from the third wireless circuit 213 (step S312). The channel quality confirmation unit 2301 calculates the channel usage rate on the basis of the communication quality information acquired in step S312. The calculated channel usage rate is recorded in the channel state table. If scanning of the communication channel set in the third wireless circuit 213 is completed in step S312, the channel quality confirmation unit 2301 changes the communication channel set in the third wireless circuit 213.

After the processing in step S312 is executed, the control unit 230 performs control for receiving image data by radio waves using the wireless communication unit 210 (the first wireless circuit 211) (step S313). Thereby, the wireless communication unit 210 (the first wireless circuit 211) receives the image data by radio waves. In step S313, image data of one frame in which the amount of data is not reduced is received. In step S313, the process shown in FIG. 13 is executed.

Figure 13:
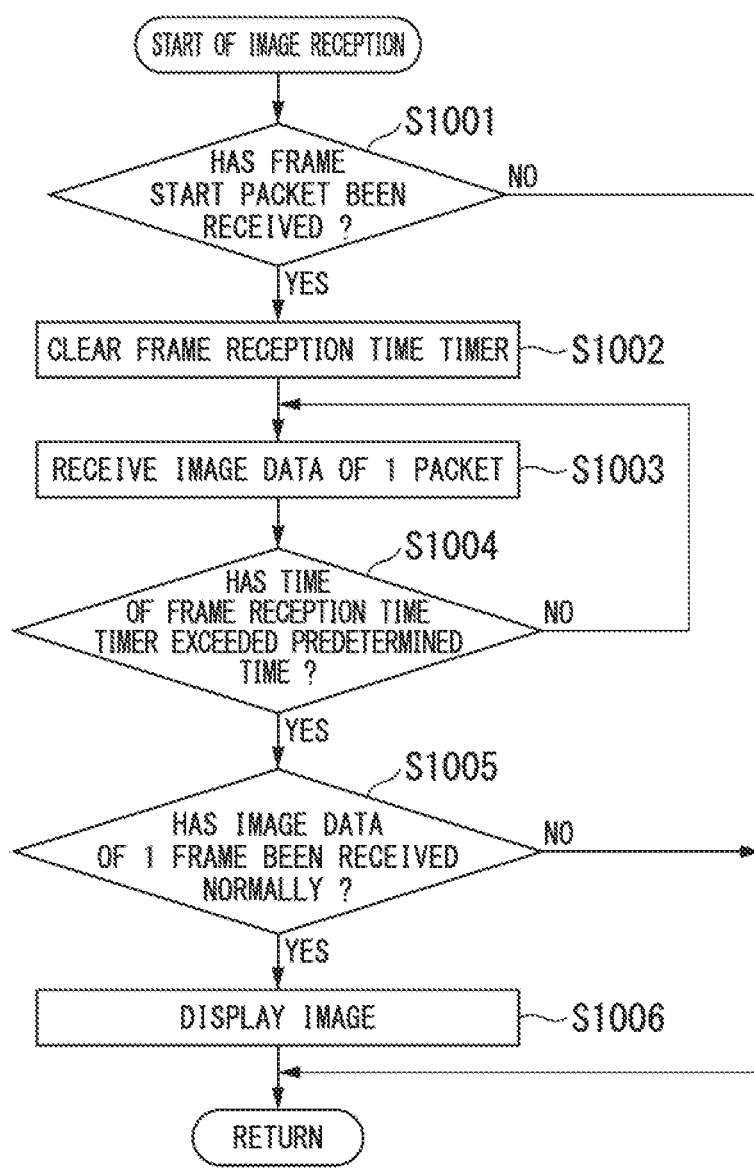
FIG. 13 is a flowchart showing a procedure of an operation of the image reception apparatus according to the first embodiment of the present invention.
Figure 14:
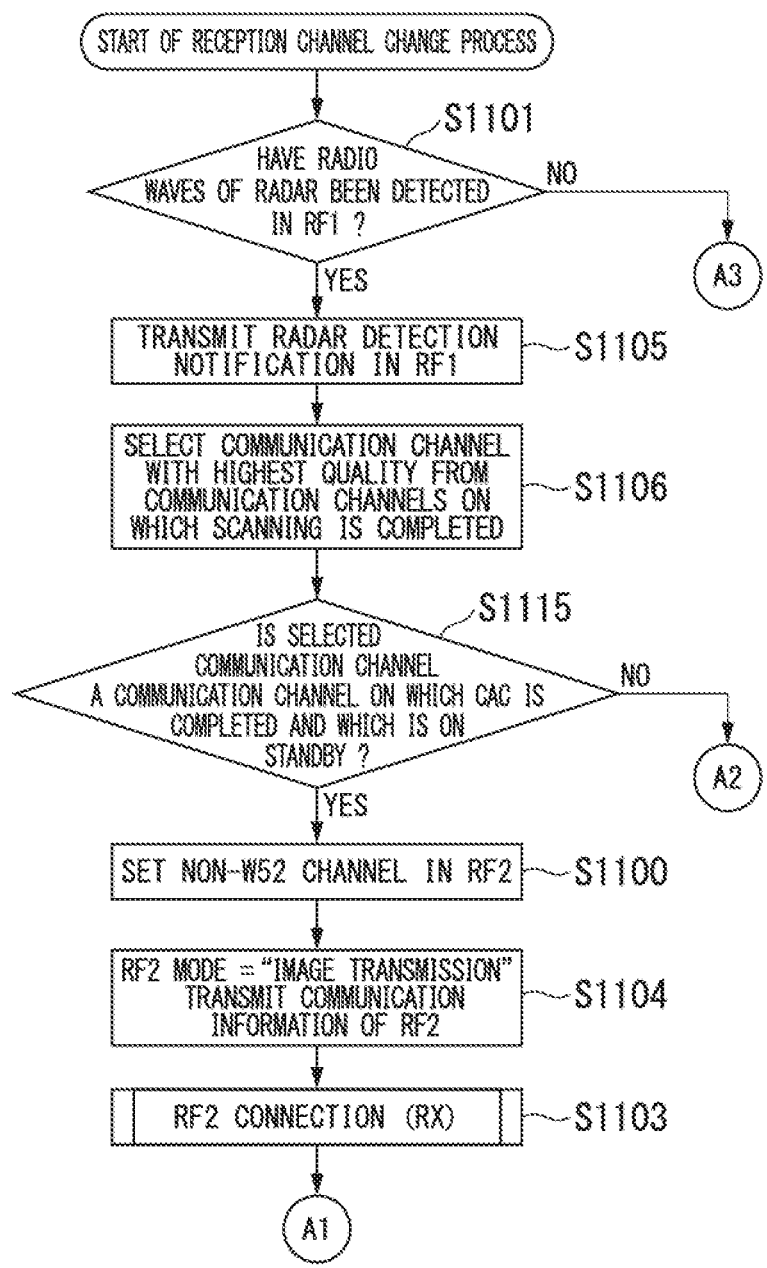
FIG. 14 is a flowchart showing a procedure of an operation of the image reception apparatus according to the first embodiment of the present invention.
Figure 15:
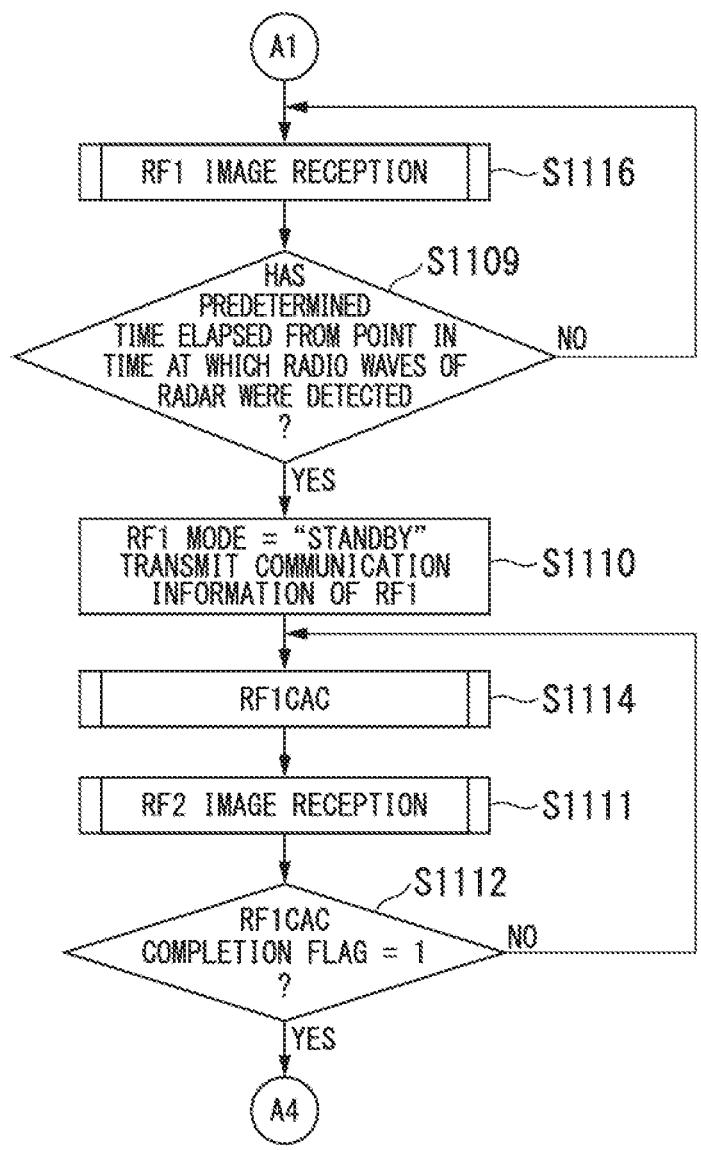
FIG. 15 is a flowchart showing a procedure of an operation of the image reception apparatus according to the first embodiment of the present invention.
Figure 16:
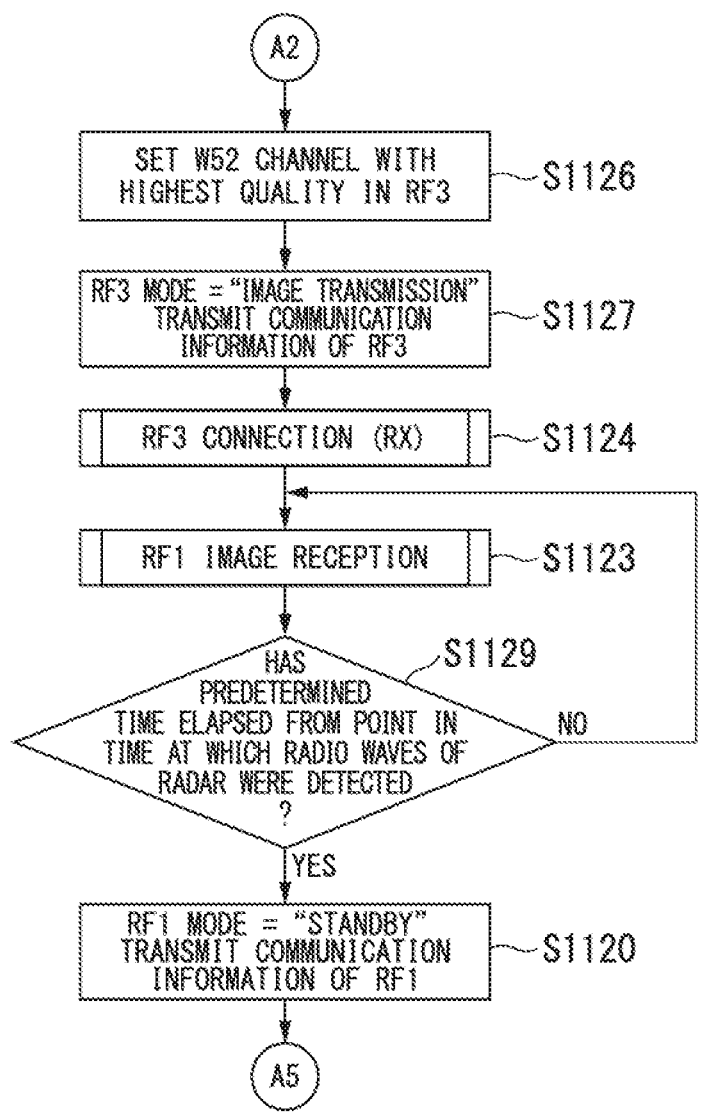
FIG. 16 is a flowchart showing a procedure of an operation of the image reception apparatus according to the first embodiment of the present invention.
Figure 17:
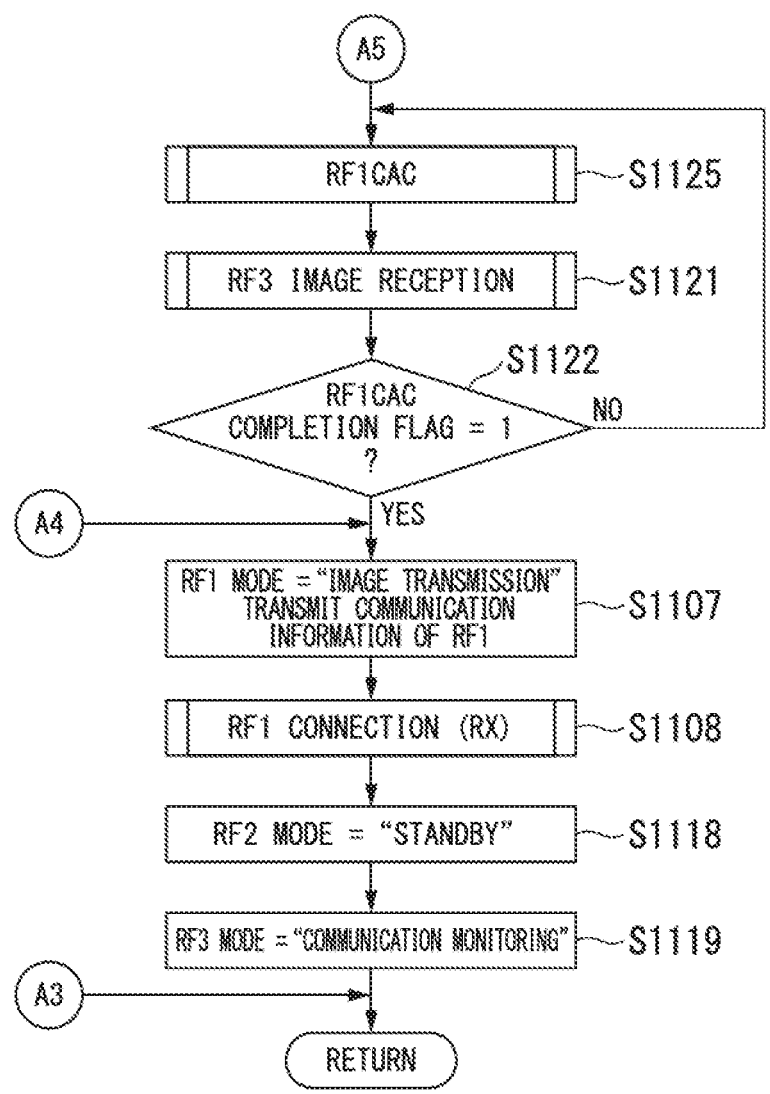
FIG. 17 is a flowchart showing a procedure of an operation of the image reception apparatus according to the first embodiment of the present invention.

FIG. 13 shows a procedure of an operation of the image reception apparatus 200 when image data is received. When the reception of image data using a communication channel set in one of the three wireless circuits of the image reception apparatus 200 is performed, the process is executed in accordance with FIG. 13. Hereinafter, the process executed in reception of image data using the communication channel set in the first wireless circuit 211 will be described.

If image data communication is started, a frame start packet is transmitted from the image transmission apparatus 100. The wireless communication unit 210 (the first wireless circuit 211) receives the frame start packet by radio waves. The control unit 230 monitors the wireless communication unit 210 (the first wireless circuit 211) and determines whether or not the frame start packet has been received (step S1001).

If the frame start packet has not been received in step S1001, the process shown in FIG. 13 ends. If the frame start packet has been received in step S1001, the control unit 230 clears a frame reception time timer (step S1002). That is, the frame reception time timer is initialized. The frame reception time timer is a timer for measuring one frame time.

After the frame reception time timer is cleared, the control unit 230 performs control for receiving image data of one packet by radio waves using the wireless communication unit 210 (the first wireless circuit 211) (step S1003). Thereby, the wireless communication unit 210 (the first wireless circuit 211) receives the image data of one packet by radio waves.

After the image data of one packet is received, the control unit 230 determines whether or not a time indicated by the frame reception time timer has exceeded a predetermined time (step S1004). This predetermined time is one frame time.

If the time indicated by the frame reception time timer has not exceeded the predetermined time in step S1004, the processing in step S1003 is executed. If the time indicated by the frame reception time timer has exceeded the predetermined time in step S1004, the control unit 230 determines whether or not image data of one frame has been received normally (step S1005).

If the image data of one frame has not been received normally in step S1005, the process in FIG. 13 ends. If the image data of one frame has been received normally in step S1005, the control unit 230 performs control for displaying an image (step S1006). Thereby, the image processing unit 201 performs image processing on the received image data and generates display data. The display apparatus 300 displays an image on the basis of the display data. After the image is displayed, the process in FIG. 13 ends.

After the processing in step S313 is executed, the channel use confirmation unit 2300 executes CAC using the communication channel set in the second wireless circuit 212 (step S314). In step S314, the process shown in FIG. 11 is executed. In step S314, a communication channel used for receiving the image data and a communication channel on which CAC was immediately previously executed in the second wireless circuit 212 are not used.

After the processing in step S314 is executed, the reception channel change process is executed (step S316). In the reception channel change process, processing related to a change in a communication channel to be used for image data communication is executed. In step S316, the process shown in FIGS. 14, 15, 16, and 17 is executed. After the processing in step S316 is executed, the processing in step S312 is executed.

FIGS. 14, 15, 16, and 17 show a procedure of an operation of the image reception apparatus 200 when the reception channel change process is performed.

The channel use confirmation unit 2300 confirms whether or not a radar detection notification has been acquired from the first radar detection unit 2110. Thereby, the channel use confirmation unit 2300 determines whether radio waves of the radar have been detected in the communication channel set in the first wireless circuit 211 (step S1101).

If the radio waves of the radar have not been detected in step S1101, the reception channel change process ends. If the radio waves of the radar have been detected in step S1101, the control unit 230 performs control for transmitting the radar detection notification by radio waves using the wireless communication unit 210 (the first wireless circuit 211) (step S1105). Thereby, the wireless communication unit 210 (the first wireless circuit 211) transmits the radar detection notification by radio waves.

After the processing in step S1105 is executed, the channel quality confirmation unit 2301 reads the channel state table from the storage unit 221. The channel quality confirmation unit 2301 selects a communication channel on the basis of the channel usage rate recorded in the channel state table (step S1106). In step S1106, the channel quality confirmation unit 2301 selects a communication channel with highest quality from communication channels on which scanning is completed. The communication channels to be selected are two types of communication channels. One of the two types of communication channels is a communication channel on which scanning is completed and which belongs to W52. The other of the two types of communication channels is a communication channel on which CAC is completed and which belongs to a band other than W52 set in the second wireless circuit 212 on standby.

After the processing in step S1106 is executed, the channel quality confirmation unit 2301 determines whether or not the selected communication channel is a communication channel on which CAC is completed and which is on standby (step S1115). The communication channel on which CAC is completed and which is on standby is a communication channel set in the second wireless circuit 212.

If the selected communication channel is a communication channel on which CAC is completed and which is on standby in step S1115, the control unit 230 sets a communication channel belonging to a band other than W52 in the second wireless circuit 212 (step S1100). In step S1100, the communication channel set when CAC in the second wireless circuit 212 is completed is used. This communication channel is the same as the communication channel selected in step S1106.

After the processing in step S1100 is executed, the control unit 230 sets the RF2 mode to the image transmission mode. Further, the control unit 230 performs control for transmitting the communication information of the second wireless circuit 212 by radio waves using the wireless communication unit 210 (the first wireless circuit 211) (step S1104). Thereby, the wireless communication unit 210 (the first wireless circuit 211) transmits the communication information of the second wireless circuit 212 by radio waves.

After the processing in step S1104 is executed, the control unit 230 performs control for performing a connection to the wireless communication unit 110 (the second wireless circuit 112) using the wireless communication unit 210 (the second wireless circuit 212) (step S1103). Thereby, the wireless communication unit 210 (the second wireless circuit 212) is connected to the wireless communication unit 110 (the second wireless circuit 112). In step S1103, the communication channel set in step S1100 is used. In step S1103, the process shown in FIG. 12 is executed.

After the processing in step S1103 is executed, the control unit 230 performs control for receiving image data by radio waves using the wireless communication unit 210 (the first wireless circuit 211) (step S1116). Thereby, the wireless communication unit 210 (the first wireless circuit 211) receives the image data by radio waves. In step S1116, image data of one frame with the reduced amount of data is received. In step S1116, the process shown in FIG. 13 is executed.

After the processing in step S1116 is executed, the control unit 230 determines whether or not a predetermined time has elapsed from a point in time at which the radio waves of the radar were detected (step S1109). The predetermined time is a time that is longer than the image transmission switching time $T_2$ and shorter than the channel switching time $T_1$.

If the predetermined time has not elapsed in step S1109, the processing in step S1116 is executed. If radio waves of the radar are detected in the communication channel set in the first wireless circuit 211, the reception of the image data using the first wireless circuit 211 is continued in step S1116 until the predetermined time elapses.

If the predetermined time has elapsed in step S1109, the control unit 230 sets the RF1 mode to the standby mode. Further, the control unit 230 performs control for transmitting communication information of the first wireless circuit 211 by radio waves using the wireless communication unit 210 (the second wireless circuit 212) (step S1110). Thereby, the wireless communication unit 210 (the second wireless circuit 212) transmits communication information of the first wireless circuit 211 by radio waves.

After the processing in step S1110 is executed, the channel use confirmation unit 2300 executes CAC using the communication channel set in the first wireless circuit 211 (step S1114). In step S1114, the process shown in FIG. 11 is executed.

After the processing in step S1114 is executed, the control unit 230 performs control for receiving image data by radio waves using the wireless communication unit 210 (the second wireless circuit 212) (step S1111). Thereby, the wireless communication unit 210 (the second wireless circuit 212) receives the image data by radio waves. In step S1111, image data of one frame in which the amount of data is not reduced is received. In step S1111, the process shown in FIG. 13 is executed.

After the processing in step S1111 is executed, the control unit 230 determines whether or not the RF1CAC completion flag is 1 (step S1112). If the RF1CAC completion flag is not 1 in step S1112, CAC using the communication channel set in the first wireless circuit 211 is not completed. Thus, the processing in step S1114 is executed again. If the RF1CAC completion flag is 1 in step S1112, the processing in step S107 is executed.

If the selected communication channel is not a communication channel on which CAC is completed and which is on standby in step S1115, the control unit 230 sets a communication channel in the third wireless circuit 213 (step S1126). In step S1126, a communication channel with highest quality among communication channels belonging to W52 is set in the third wireless circuit 213.

After the processing in step S1126 is executed, the control unit 230 sets the RF3 mode to the image transmission mode. Further, the control unit 230 performs control for transmitting communication information of the third wireless circuit 213 by radio waves using the wireless communication unit 210 (first wireless circuit 211) (step S1127). Thereby, the wireless communication unit 210 (the first wireless circuit 211) transmits the communication information of the third wireless circuit 213 by radio waves.

After the processing in step S1127 is executed, the control unit 230 performs control for performing a connection to the wireless communication unit 110 (the third wireless circuit 113) using the wireless communication unit 210 (the third wireless circuit 213) (step S1124). Thereby, the wireless communication unit 210 (the third wireless circuit 213) is connected to the wireless communication unit 110 (the third wireless circuit 113). In step S1124, the communication channel set in step S1126 is used. In step S1124, the process shown in FIG. 12 is executed.

After the processing in step S1124 is executed, the processing in steps S1123 and S1129 is executed. The processing in steps S1123 and S1129 is similar to the processing in steps S1116 and S1109.

If the predetermined time has elapsed in step S1129, the control unit 230 sets the RF1 mode to the standby mode. Further, the control unit 230 performs control for transmitting the communication information of the third wireless circuit 213 by radio waves using the wireless communication unit 210 (the third wireless circuit 213) (step S1120). Thereby, the wireless communication unit 210 (the third wireless circuit 213) transmits the communication information of the third wireless circuit 213 by radio waves.

After the processing in step S1120 is executed, the channel use confirmation unit 2300 executes CAC using the communication channel set in the first wireless circuit 211 (step S1125). In step S1125, the process shown in FIG. 11 is executed.

After the processing in step S1125 is executed, the control unit 230 performs control for receiving image data by radio waves using the wireless communication unit 210 (the third wireless circuit 213) (step S1121). Thereby, the wireless communication unit 210 (the third wireless circuit 213) receives the image data by radio waves. In step S1121, image data of one frame in which the amount of data is not reduced is received. In step S1121, the process shown in FIG. 13 is executed.

After the processing in step S1121 is executed, the control unit 230 determines whether or not the RF1CAC completion flag is 1 (step S1122). If the RF1CAC completion flag is not 1 in step S1122, CAC using the communication channel set in the first wireless circuit 211 is not completed. Thus, the processing in step S1125 is executed again.

If the RF1CAC completion flag is 1 in step S1122, the control unit 230 sets the RF1 mode to the image transmission mode. Further, the control unit 230 performs control for transmitting the communication information of the first wireless circuit 211 by radio waves using the wireless communication unit 210 (the second wireless circuit 212 or the third wireless circuit 213) (step S107). Thereby, the wireless communication unit 210 (the second wireless circuit 212 or the third wireless circuit 213) transmits the communication information of the first wireless circuit 211 by radio waves. If step S1103 is executed, the second wireless circuit 212 is used in step S1107. If step S1124 is executed, the third wireless circuit 213 is used in step S1107.

After the processing in step S1107 is executed, the control unit 230 performs control for performing a connection to the wireless communication unit 110 (the first wireless circuit 111) using the wireless communication unit 210 (the first wireless circuit 211) (step S1108). Thereby, the wireless communication unit 210 (the first wireless circuit 211) is connected to the wireless communication unit 110 (the first wireless circuit 111). In step S1108, the communication channel set when CAC in step S1114 or S1125 is completed is used. In step S1108, the process shown in FIG. 12 is executed.

After the processing in step S1108 is executed, the control unit 230 sets the RF2 mode to the standby mode (step S1118). After the processing in step S1118 is executed, the control unit 230 sets the RF3 mode to the communication monitoring mode (step S1119). In step S1119, the channel quality confirmation unit 2301 starts scanning using the third wireless circuit 213. After the processing in step S1119 is executed, the reception channel change process ends.

The connection in steps S1103 and S1124 is completed before a point in time at which the channel switching time $T_1$ has elapsed from a point in time at which the radio waves of the radar were detected in step S1101. Thus, switching from the communication channel set in the first wireless circuit 211 to the communication channel set in the second wireless circuit 212 or the third wireless circuit 213 is performed within the channel switching time $T_1$.

As described above, while image data communication using the first communication channel is performed, the wireless communication unit 110 and the wireless communication unit 210 stop image data communication using the first communication channel within the first time from a first point in time (corresponding to step S1101) at which the radar detection unit has detected the radio waves of the radar in the first communication channel (corresponding to steps S609, S629, S1110, and S1120). The wireless communication unit 110 and the wireless communication unit 210 start image data communication using the second communication channel within the channel switching time $T_1$ from the first point of time (corresponding to steps S611 and S1111). Alternatively, the wireless communication unit 110 and the wireless communication unit 210 start image data communication using the third communication channel within the channel switching time $T_1$ from the first point of time (corresponding to steps S621 and S1121).

The data amount reduction unit 1020 reduces the amount of image data so that a total communication time of image data to be communicated by the wireless communication unit 110 and the wireless communication unit 210 from a first point in time to a second point in time at which image data communication using the first communication channel is stopped falls within the image transmission switching time $T_2$ (corresponding to steps S604 and S624). The wireless communication unit 110 and the wireless communication unit 210 use the first communication channel from the first point in time to the second point in time to perform image data communication whose amount is reduced by the data amount reduction unit 1020 (corresponding to steps S616, S623, S1116, and S1123).

As described above, the channel quality confirmation unit 2301 confirms qualities of a plurality of communication channels different from the first communication channel when the image data communication using the first communication channel is being performed (corresponding to step S312). A communication channel with relatively high quality among the plurality of communication channels whose qualities have been confirmed by the channel quality confirmation unit 2301 is set as the second communication channel (corresponding to step S1100). Alternatively, a communication channel with relatively high quality among the plurality of communication channels whose qualities have been confirmed by the channel quality confirmation unit 2301 is set as the third communication channel (corresponding to step S1126).

Figure 18:
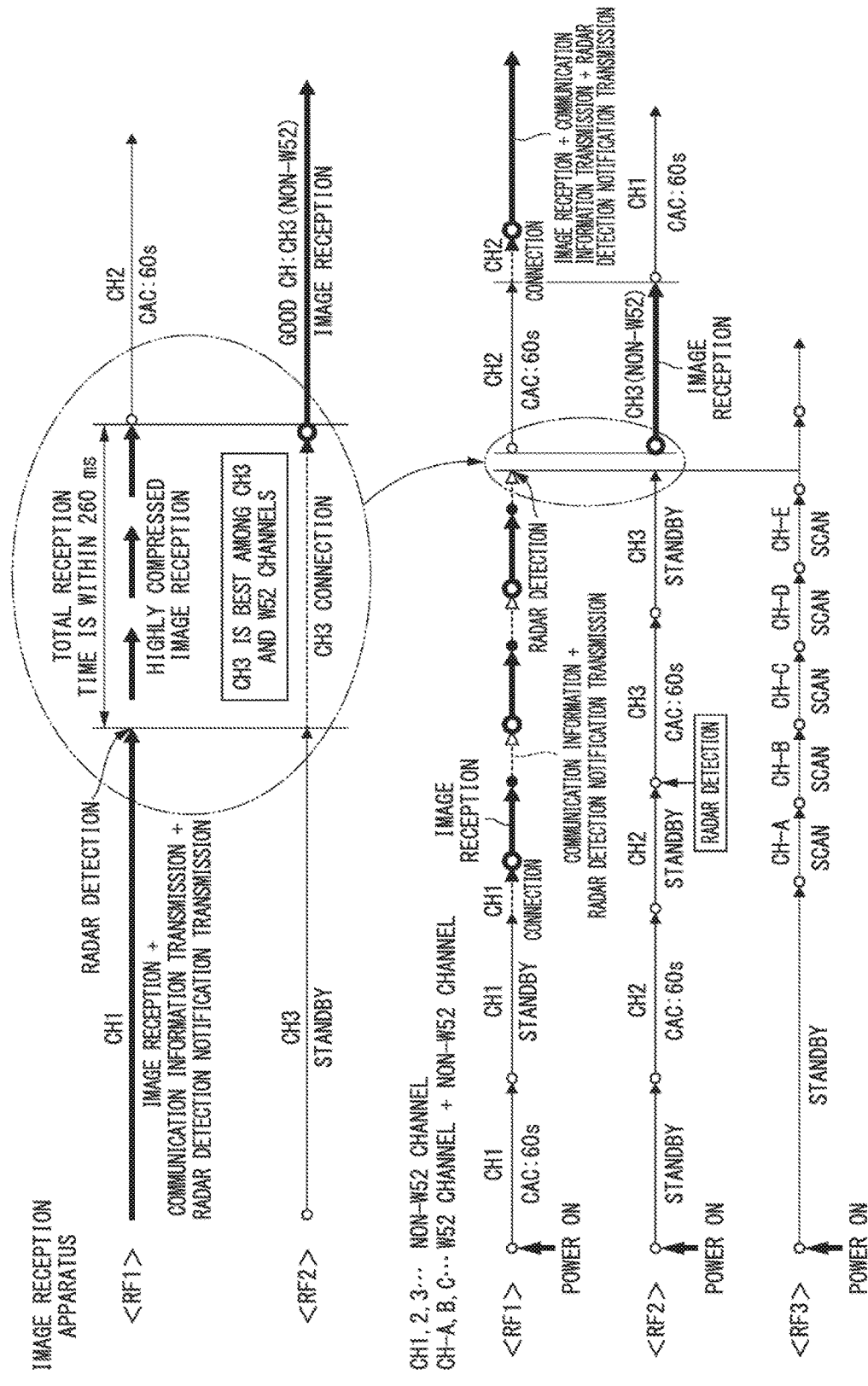
FIG. 18 is a sequence diagram showing an operation of each wireless circuit included in the image reception apparatus according to the first embodiment of the present invention.
Figure 19:
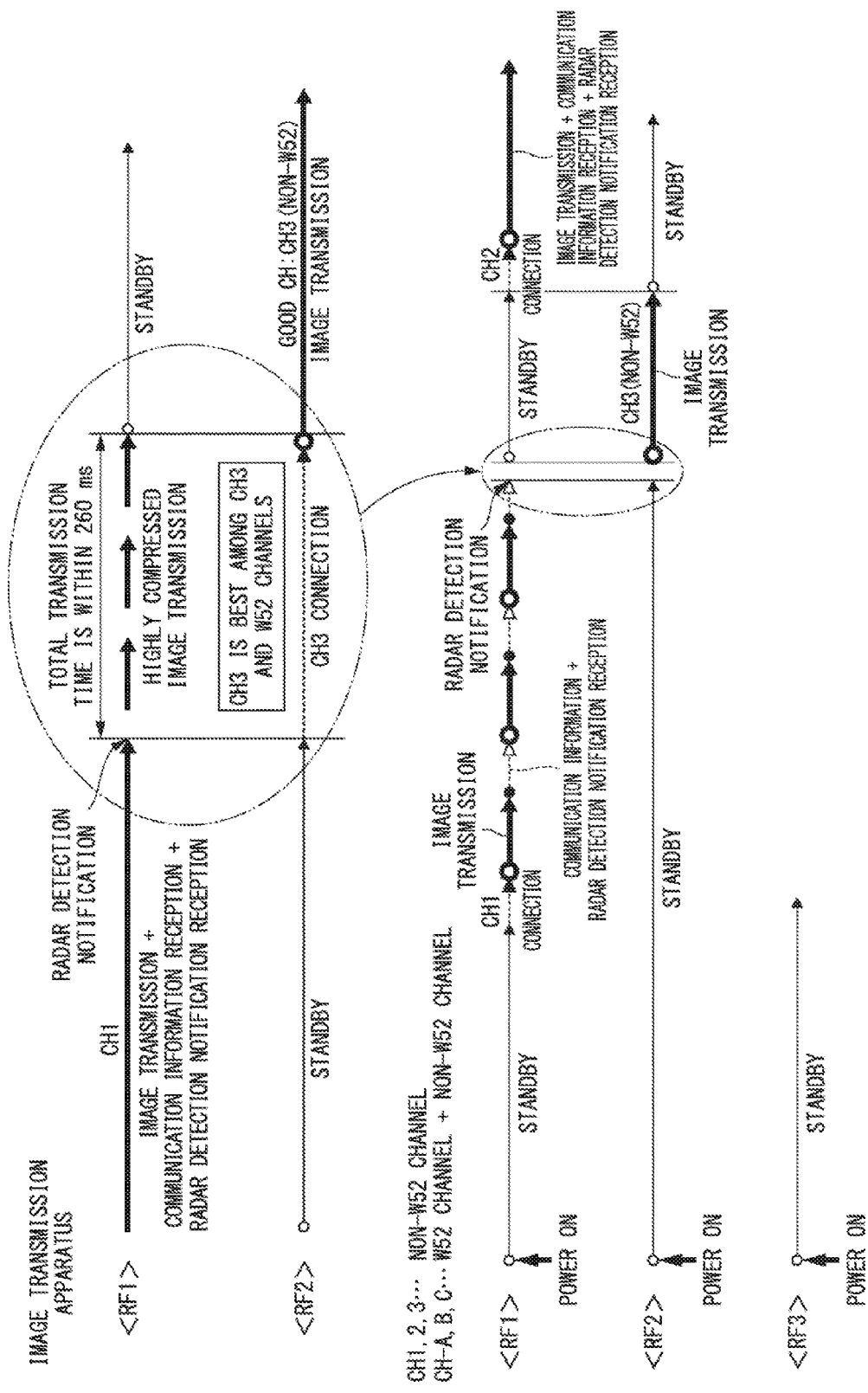
FIG. 19 is a sequence diagram showing an operation of each wireless circuit included in the image transmission apparatus according to the first embodiment of the present invention.

FIGS. 18 and 19 show an operation when a communication channel to be used for image transmission is switched from a communication channel set in the first wireless circuit 111 and the first wireless circuit 211 to a communication channel set in the second wireless circuit 112 and the second wireless circuit 212. FIG. 18 shows an operation of each wireless circuit included in the image reception apparatus 200. FIG. 19 shows an operation of each wireless circuit included in the image transmission apparatus 100.

After the image reception apparatus 200 is powered on, CAC using a communication channel CH1 belonging to a band other than W52 is executed in the first wireless circuit 211 (corresponding to step S302). After CAC is completed, the first wireless circuit 211 is connected to the first wireless circuit 111 using the communication channel CH1 (corresponding to step S308). After the connection is completed, the first wireless circuit 211 receives the image data using the communication channel CH1 (the first communication channel) (corresponding to step S313). When the image data is being received, the first wireless circuit 211 executes a detection process on radio waves of the radar by ISM (corresponding to step S1101). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

After the image reception apparatus 200 is powered on, CAC using a communication channel CH2 belonging to a band other than W52 is executed in the second wireless circuit 212 (corresponding to step S304). After CAC is completed, the second wireless circuit 212 executes a detection process on radio waves of the radar by ISM (corresponding to step S801 within step S314). If radio waves of the radar are detected in the second wireless circuit 212, the communication channel is changed to a communication channel CH3, and CAC using the communication channel CH3 is executed (corresponding to step S314).

After the image reception apparatus 200 is powered on, scanning is executed in the third wireless circuit 213 (corresponding to step S312). Scanning is performed on both a communication channel belonging to W52 and a communication channel belonging to a band other than W52. If scanning on one communication channel is completed, the communication channel is changed and scanning is executed. A communication channel CH-A or the like on which scanning is performed may include the communication channel CH1, the communication channel CH2, and the communication channel CH3. When image data communication is being performed, scanning of the communication channel to be used for the communication is not executed.

When the first wireless circuit 211 is receiving image data, radio waves of the radar are detected (corresponding to step S1101). The quality of the communication channel CH3 on which CAC is executed in the second wireless circuit 212 is higher than the quality of a communication channel belonging to W52. Thus, the communication channel CH3 is set in the second wireless circuit 212 (corresponding to step S1100). Thereby, the communication channel to be used for image transmission is switched from the first communication channel to the communication channel CH3. The first wireless circuit 211 receives image data whose amount is reduced (corresponding to step S1116). A total transmission time of the image data whose amount is reduced is within the image transmission switching time $T_2$. For example, the image transmission switching time $T_2$ is 260 milliseconds.

The first wireless circuit 211 is set in the standby mode and hence the first wireless circuit 211 stops receiving the image data (corresponding to step S1110). Thereafter, the second wireless circuit 212 receives the image data using the communication channel CH3 (the third communication channel) belonging to a band other than W52 (corresponding to step S1111). Switching of the communication channel is performed within the channel switching time $T_1$ from a point in time at which the radio waves of the radar were detected.

After receiving of the image data is stopped, CAC using the communication channel CH2 different from the communication channel CH1 used for receiving the image data is executed in the first wireless circuit 211 (corresponding to step S1114). After CAC is completed, the first wireless circuit 211 is connected to the first wireless circuit 111 using the communication channel CH2 (corresponding to step S1108). After the connection is completed, the first wireless circuit 211 receives the image data using the communication channel CH2 (corresponding to step S313). When the image data is being received, the first wireless circuit 211 executes a detection process on radio waves of the radar by ISM (corresponding to step S1101). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

If CAC is completed in the first wireless circuit 211 after the second wireless circuit 212 starts receiving image data, the second wireless circuit 212 stops receiving the image data (step S1118). Thereafter, in the second wireless circuit 212, CAC using the communication channel CH1 belonging to a band other than W52 is executed (corresponding to step S314).

After the image transmission apparatus 100 is powered on, the first wireless circuit 111 is connected to the first wireless circuit 211 using the communication channel CH1 belonging to a band other than W52 (corresponding to step S502). After the connection is completed, the first wireless circuit 111 transmits the image data using the communication channel CH1 (the first communication channel) (corresponding to step S508). The first wireless circuit 111 receives communication information from the first wireless circuit 211 during a blanking period other than a period during which image data is received. Also, if radio waves of the radar are detected in the image reception apparatus 200, the first wireless circuit 111 receives the radar detection notification from the first wireless circuit 211 during the blanking period.

After the image transmission apparatus 100 is powered on, the second wireless circuit 112 and the third wireless circuit 113 are on standby.

When the first wireless circuit 111 is transmitting image data, the radio waves of the radar are detected by the image reception apparatus 200. Thus, the communication channel to be used for image transmission is switched from the first communication channel to the communication channel CH3 set in the second wireless circuit 212 (corresponding to step S607). The first wireless circuit 111 transmits the image data whose amount is reduced by the data amount reduction unit 1020 (corresponding to step S616). A total transmission time of the image data whose amount is reduced is within the image transmission switching time $T_2$. For example, the image transmission switching time $T_2$ is 260 milliseconds.

After receiving notification information indicating that the first wireless circuit 211 is in the standby mode, the first wireless circuit 111 stops transmitting the image data (corresponding to step S609). Thereafter, the second wireless circuit 112 transmits the image data using the communication channel CH3 (the third communication channel) belonging to a band other than W52 (corresponding to step S611). Switching of the communication channel is performed within the channel switching time $T_1$ from a point in time at which the radio waves of the radar were detected.

Notification information indicating that the first wireless circuit 211 is in the image transmission mode is received and hence the second wireless circuit 112 stops transmitting image data (corresponding to step S612). Thereafter, the first wireless circuit 111 transmits the image data using the communication channel CH2 belonging to a band other than W52 (corresponding to step S508). The first wireless circuit 111 receives communication information from the first wireless circuit 211 during a blanking period other than a period during which image data is received. Also, if radio waves of the radar are detected in the image reception apparatus 200, the first wireless circuit 111 receives the radar detection notification from the first wireless circuit 211 during the blanking period.

Figure 20:
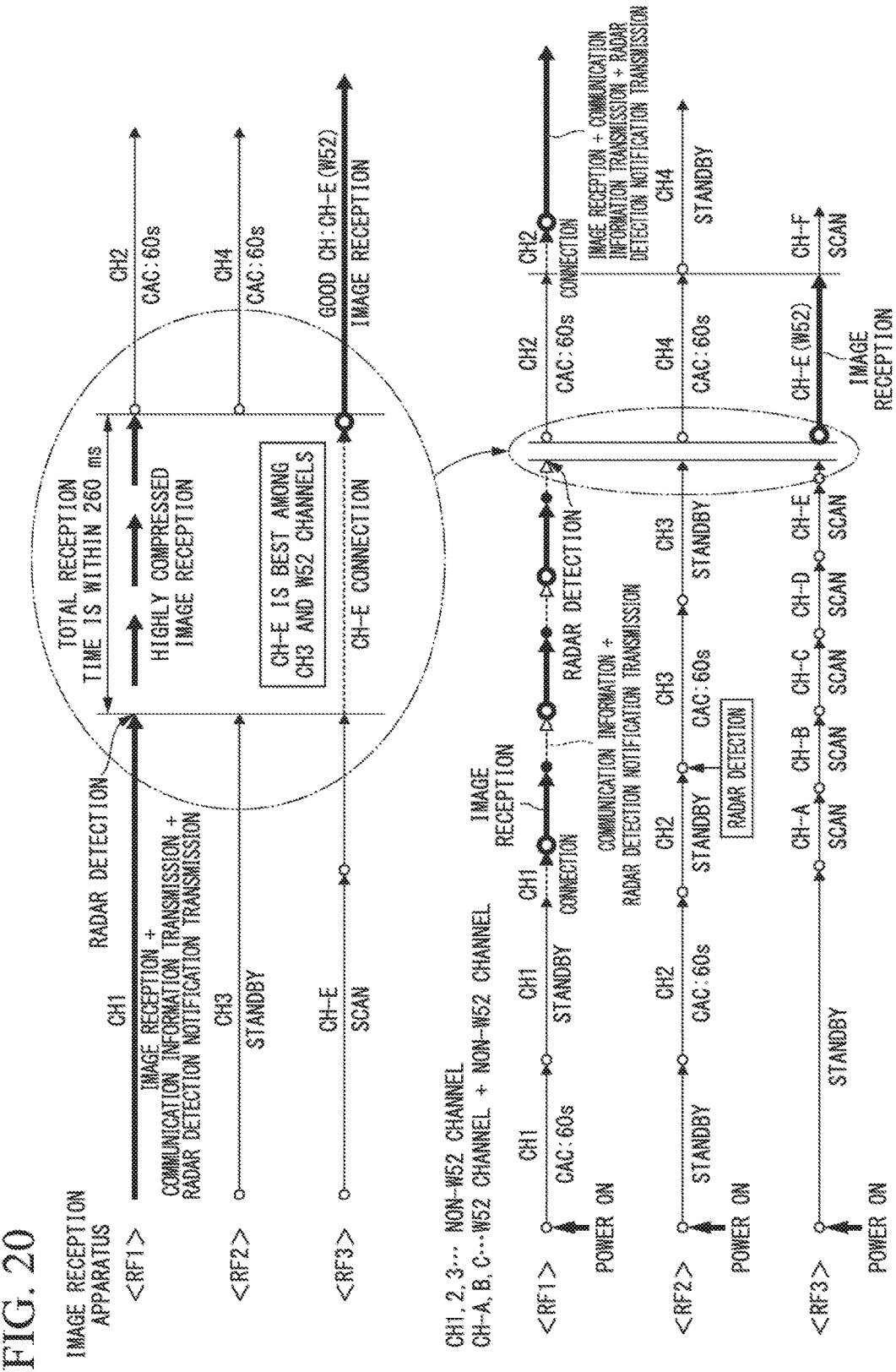
FIG. 20 is a sequence diagram showing an operation of each wireless circuit included in the image reception apparatus according to the first embodiment of the present invention.
Figure 21:
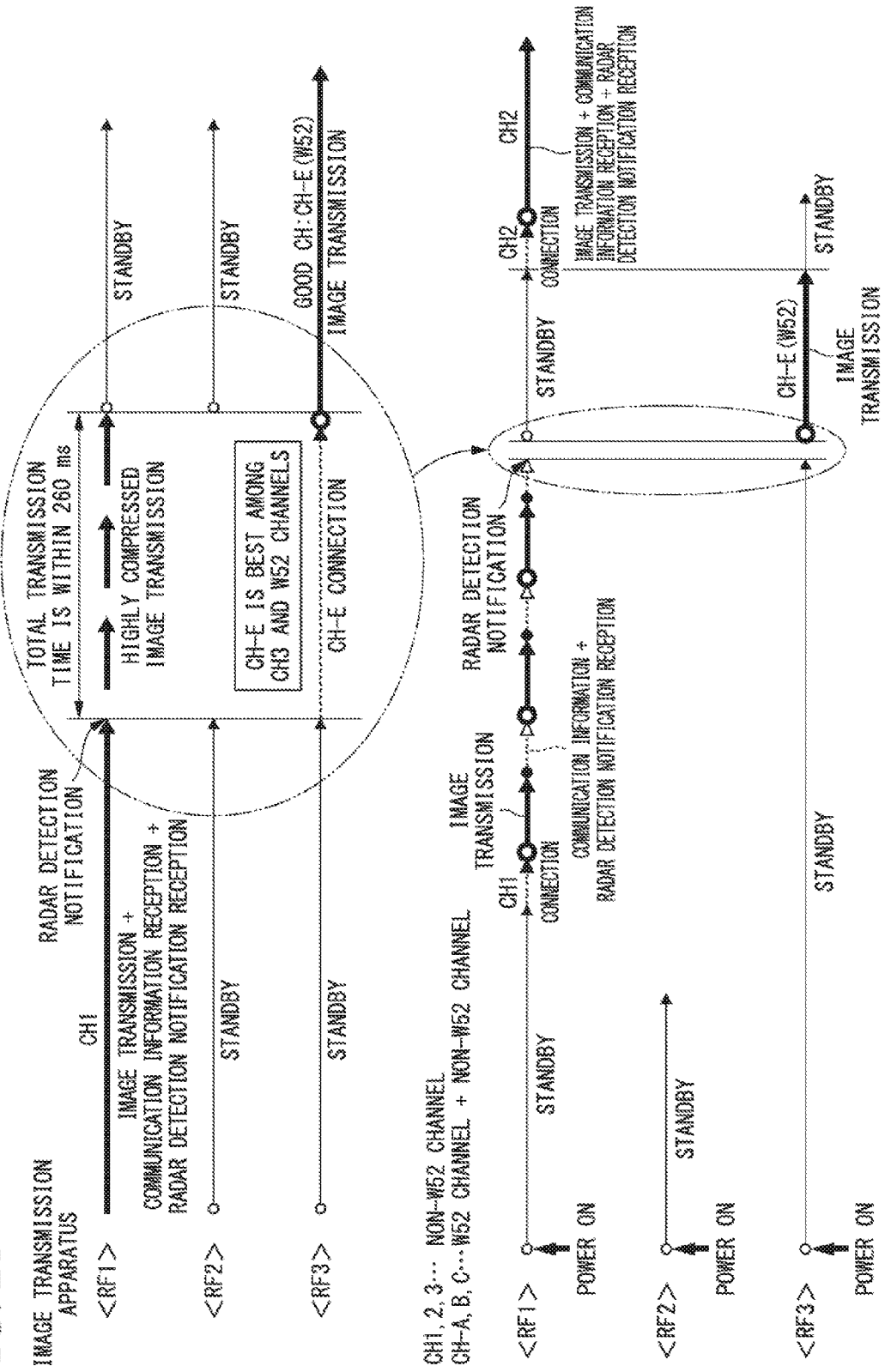
FIG. 21 is a sequence diagram showing an operation of each wireless circuit included in the image transmission apparatus according to the first embodiment of the present invention.

FIGS. 20 and 21 show an operation when the communication channel to be used for image transmission is switched from the communication channel set in the first wireless circuit 111 and the first wireless circuit 211 to the communication channel set in the third wireless circuit 113 and the third wireless circuit 213. FIG. 20 shows an operation of each wireless circuit included in the image reception apparatus 200. FIG. 21 shows an operation of each wireless circuit included in the image transmission apparatus 100.

In FIG. 20, an operation before detection of radio waves of the radar in the communication channel set in the first wireless circuit 211 is similar to the operation shown in FIG. 18. When the first wireless circuit 211 is receiving image data, radio waves of the radar are detected (corresponding to step S1101). Quality of a communication channel CH-E belonging to W52 is higher than qualities of the communication channel belonging to W52 and the communication channel CH3 on which CAC is executed in the second wireless circuit 212. Thus, the communication channel CH-E is set in the second wireless circuit 212 (corresponding to step S1126). Thereby, the communication channel to be used for image transmission is switched from the first communication channel to the communication channel CH-E. The first wireless circuit 211 receives the image data whose amount is reduced (corresponding to step S1123). A total transmission time of the image data whose amount is reduced is within the image transmission switching time $T_2$. For example, the image transmission switching time $T_2$ is 260 milliseconds.

The first wireless circuit 211 is set in the standby mode and hence the first wireless circuit 211 stops receiving the image data (corresponding to step S1120). Thereafter, the third wireless circuit 213 receives the image data using the communication channel CH-E (the second communication channel) belonging to W52 (corresponding to step S1121). Switching of the communication channel is performed within the channel switching time $T_1$ from a point in time at which the radio waves of the radar were detected.

After receiving of the image data is stopped, the operation of the first wireless circuit 211 is similar to the operation shown in FIG. 18.

If CAC is completed in the first wireless circuit 211 after the third wireless circuit 213 starts receiving image data, the third wireless circuit 213 stops receiving the image data (corresponding to step S1119). Thereafter scanning is executed in the third wireless circuit 213 (corresponding to step S312).

In FIG. 21, the operation before detection of radio waves of the radar in the communication channel set in the first wireless circuit 211 is similar to the operation shown in FIG. 19. When the first wireless circuit 111 is transmitting image data, the radio waves of the radar are detected by the image reception apparatus 200. Thus, the communication channel to be used for image transmission is switched from the first communication channel to the communication channel CH-E set in the third wireless circuit 213 (corresponding to step S627). The first wireless circuit 111 transmits the image data whose amount is reduced by the data amount reduction unit 1020 (corresponding to step S623). A total transmission time of the image data whose amount is reduced is within the image transmission switching time $T_2$. For example, the image transmission switching time $T_2$ is 260 milliseconds.

After receiving notification information indicating that the first wireless circuit 211 is in the standby mode, the first wireless circuit 111 stops transmitting the image data (corresponding to step S629). Thereafter, the third wireless circuit 113 transmits the image data using the communication channel CH-E (the second communication channel) belonging to W52 (corresponding to step S621). Switching of the communication channel is performed within the channel switching time $T_1$ from a point in time at which the radio waves of the radar were detected.

After receiving notification information indicating that the first wireless circuit 211 is in the image transmission mode, the third wireless circuit 113 stops transmitting the image data (corresponding to step S622). Thereafter, the first wireless circuit 111 transmits the image data using the communication channel CH2 belonging to a band other than W52 (corresponding to step S508). The first wireless circuit 111 receives communication information from the first wireless circuit 211 during a blanking period other than a period during which image data is received. Also, if radio waves of the radar are detected in the image reception apparatus 200, the first wireless circuit 111 receives the radar detection notification from the first wireless circuit 211 during the blanking period.

Modified Example of First Embodiment

Figure 22:
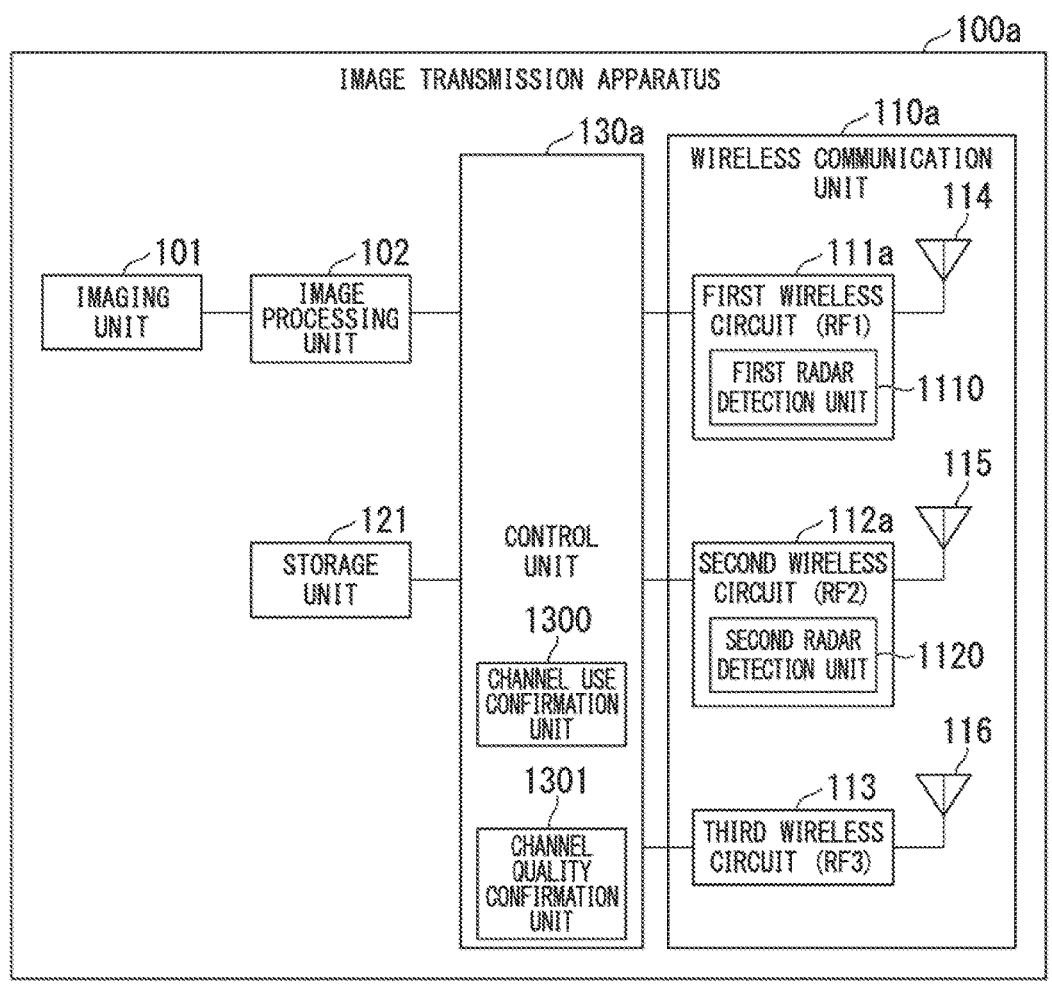
FIG. 22 is a block diagram showing a configuration of an image transmission apparatus according to a modified example of the first embodiment of the present invention.

FIG. 22 shows a configuration of an image transmission apparatus 100a according to the modified example of the first embodiment. With respect to the configuration shown in FIG. 22, differences from the configuration shown in FIG. 3 will be described.

In the image transmission apparatus 100a, the wireless communication unit 110 in the image transmission apparatus 100 shown in FIG. 3 is changed to a wireless communication unit 110a. In the wireless communication unit 110a, the first wireless circuit 111 in the wireless communication unit 110 shown in FIG. 3 is changed to a first wireless circuit 111a. In the wireless communication unit 110a the second wireless circuit 112 in the wireless communication unit 110 shown in FIG. 3 is changed to a second wireless circuit 112a.

The first wireless circuit 111a includes a first radar detection unit 1110. The second wireless circuit 112a includes a second radar detection unit 1120. The first radar detection unit 1110 and the second radar detection unit 1120 execute a detection process on radio waves of radar in a communication channel that has a possibility of being used for image transmission. The first radar detection unit 1110 executes a detection process on radio waves of the radar in the communication channel set in the first wireless circuit 111a. The second radar detection unit 1120 executes the detection process on the radio waves of the radar in the communication channel set in the second wireless circuit 112a. The first radar detection unit 1110 and the second radar detection unit 1120 can execute the detection process on the radio waves of the radar at the same time.

In the image transmission apparatus 100a, the control unit 130 in the image transmission apparatus 100 shown in FIG. 3 is changed to a control unit 130a. The control unit 130a includes a channel use confirmation unit 1300 and a channel quality confirmation unit 1301. The channel use confirmation unit 1300 executes channel use confirmation. i.e., CAC. The channel quality confirmation unit 1301 executes channel quality confirmation, i.e., scanning.

With respect to points other than the above, the configuration shown in FIG. 22 is similar to the configuration shown in FIG. 3.

In the modified example of the first embodiment, the image reception apparatus 200 may not include the first radar detection unit 2110 and the second radar detection unit 2120. In the modified example of the first embodiment, the image transmission apparatus 100a executes CAC and scanning. Also, in the modified example of the first embodiment, the image transmission apparatus 100a performs control related to switching of communication channels. Except for this point, the operation in the modified example of the first embodiment is similar to the operation in the first embodiment.

It is only necessary for at least one of the image transmission apparatus 100 and the image reception apparatus 200 to include a radar detection unit. Therefore, only one of the image transmission apparatus 100 and the image reception apparatus 200 may include the radar detection unit. Alternatively, the image transmission apparatus 100 and the image reception apparatus 200 may include the radar detection unit.

It is only necessary for at least one of the image transmission apparatus 100 and the image reception apparatus 200 to include a channel use confirmation unit. Therefore, only one of the image transmission apparatus 100 and the image reception apparatus 200 may include the channel use confirmation unit. Alternatively, the image transmission apparatus 100 and the image reception apparatus 200 may include the channel use confirmation unit.

Scanning may be performed only on communication channels belonging to W52. Alternatively, scanning may be performed only on communication channels belonging to bands other than W52.

It is only necessary for at least one of the image transmission apparatus 100 and the image reception apparatus 200 to include a channel quality confirmation unit. Therefore, only one of the image transmission apparatus 100 and the image reception apparatus 200 may include the channel quality confirmation unit. Alternatively, the image transmission apparatus 100 and the image reception apparatus 200 may include the channel quality confirmation unit. If only the image transmission apparatus 100 includes the channel quality confirmation unit 1301 and the channel quality confirmation unit 1301 executes channel monitoring using a communication channel belonging to a band other than W52 by active scanning, the image transmission apparatus 100 includes the radar detection unit and a channel use confirmation unit 1300.

In each aspect of the present invention, a communication channel belonging to W52 is set as the second communication channel on the basis of a result of the scanning and any communication channel belonging to a band other than W52 may be set as the third communication channel regardless of the result of the scanning. Likewise, in each aspect of the present invention, any communication channel belonging to W52 is set as the second communication channel regardless of the result of the scanning and a communication channel belonging to a band other than W52 may be set as the third communication channel on the basis of the result of the scanning. Alternatively, in each aspect of the present invention, any communication channel belonging to W52 is set as the second communication channel regardless of the result of the scanning and a communication channel belonging to a band other than W52 may be set as the third communication channel regardless of the result of the scanning.

According to the first embodiment, the image communication system 10 including the image transmission apparatus 100 or 100a and the image reception apparatus 200 is configured. The image transmission apparatus 100 includes a transmission-side wireless communication unit (the wireless communication unit 110 or 110a). The image reception apparatus includes a reception-side wireless communication unit (the wireless communication unit 210). At least one of the image transmission apparatuses 100 and 100a and the image reception apparatus 200 has a radar detection unit (the first radar detection unit 1110 or 2110 and the second radar detection unit 1120 or 2120). The image transmission apparatus 100 includes a data amount reduction unit 1020.

The image communication system of each aspect of the present invention may not include a configuration corresponding to at least one of an imaging unit 101, an image processing unit 102, a storage unit 121, a channel use confirmation unit 1300, a channel quality confirmation unit 1301, an image processing unit 201, a storage unit 221, a channel use confirmation unit 2300, and a channel quality confirmation unit 2301.

According to the first embodiment, the image transmission apparatus 100a including the transmission-side wireless communication unit (the wireless communication unit 110a), the radar detection unit (the first radar detection unit 1110 and the second radar detection unit 1120), and the data amount reduction unit 1020 is configured.

The image transmission apparatus according to each aspect of the present invention may not include a configuration corresponding to at least one of the imaging unit 101, the image processing unit 102, the storage unit 121, the channel use confirmation unit 1300, and the channel quality confirmation unit 1301.

According to the first embodiment, an image transmission method having a first step, a second step, a third step, a fourth step, a fifth step, and a sixth step is configured. The first step corresponds to steps S508, S611, S616, and S621. The second step corresponds to FIG. 11. The third step corresponds to steps S609 and S629. The fourth step corresponds to step S611. The fifth step corresponds to step S604. The sixth step corresponds to step S616.

In the first step, image data is transmitted by radio waves. The image data is generated in synchronization with an imaging clock. The image data is transmitted in the order in which the image data is generated. In the second step, a detection process on radio waves of radar is executed in a communication channel that has a possibility of being used for image data communication in the first step. In the third step, image data communication using the first communication channel is stopped within a first time from a first point in time at which the radio waves of the radar are detected in the first communication channel in the second step while the image data communication using the first communication channel is performed. The first communication channel is a communication channel in which detection of the radar is necessary or that has a possibility of being used by the radar. In the fourth step, image data communication using a second communication channel is started within the first time from the first point in time. The second communication channel is a communication channel in which detection of the radar is not necessary or that is not used by the radar. In the fifth step, the amount of image data is reduced so that a total communication time of the image data to be communicated from the first point in time to a second point in time at which the image data communication using the first communication channel is stopped falls within a second time. In the sixth step, the image data communication in which the amount of data is reduced in the fifth step is performed using the first communication channel from the first point in time to the second point in time.

According to the first embodiment, a program for causing a computer of the image transmission apparatus 100a to execute the above-described first to sixth steps is configured.

In each aspect of the present invention, switching of the communication channel from the second communication channel to another communication channel may not be performed while image data communication using the second communication channel is performed. Likewise, in each aspect of the present invention, while image data communication using the third communication channel is performed, switching of the communication channel from the third communication channel to another communication channel may not be performed.

In the first embodiment, the wireless communication unit 110 and the wireless communication unit 210 perform the image data communication in which the amount of data is reduced using the first communication channel from the first point in time to the second point in time. The first point in time is a point in time at which the radio waves of the radar are detected in the first communication channel while image data communication using the first communication channel is performed. The second point in time is a point in time at which the image data communication using the first communication channel is stopped. Thus, image transmission can be continued if radio waves of the radar are detected in the communication channel used for image transmission.

In the first embodiment, it is possible to change the amount of data reduction by changing the frame rate. Thus, it is possible to select one piece of image data with low image quality and a high frame rate and image data with high image quality and a low frame rate.

In the first embodiment, because the communication channel with relatively high quality is set to the second communication channel or the third communication channel, the communication quality is secured.

Second Embodiment

Figure 23:
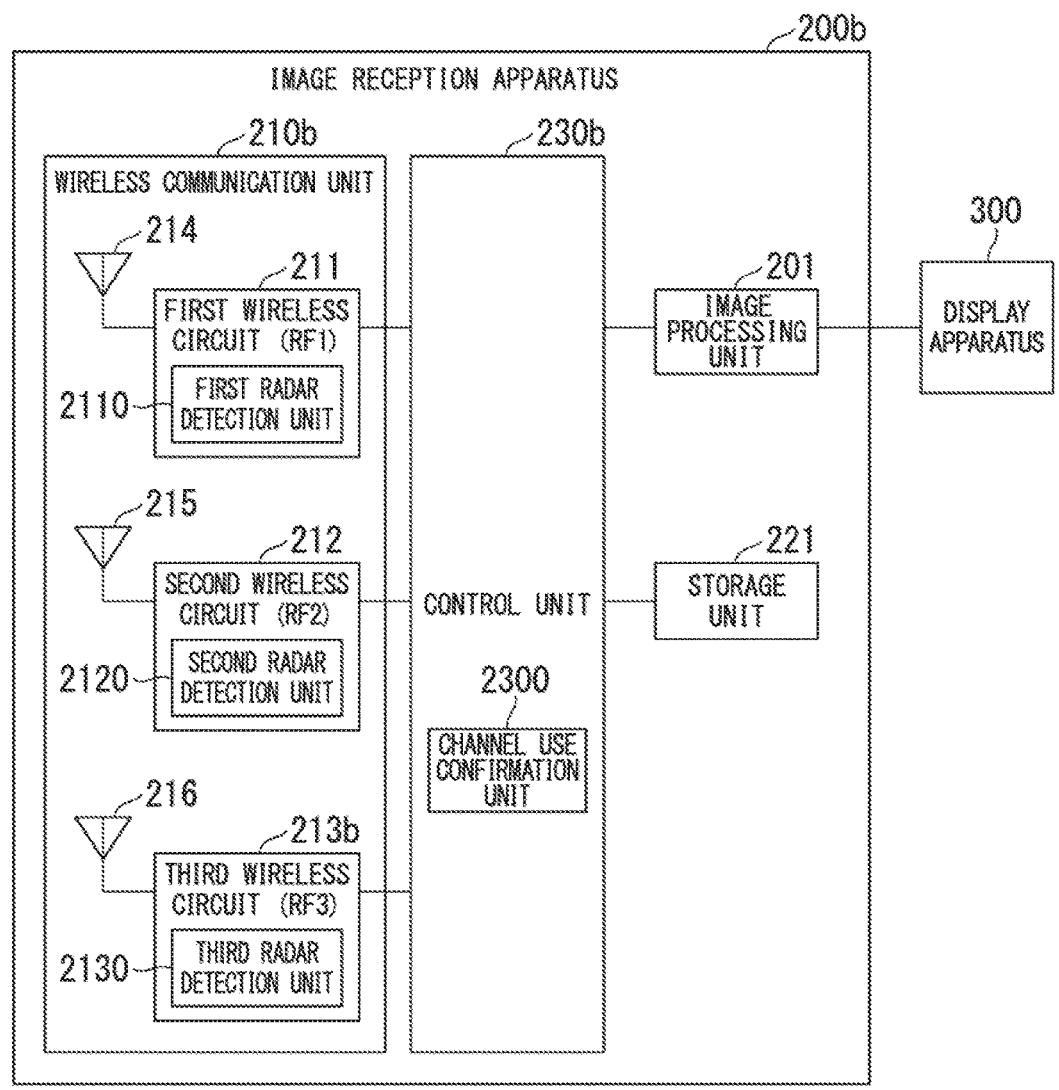
FIG. 23 is a block diagram showing a configuration of an image reception apparatus according to a second embodiment of the present invention.

In the second embodiment of the present invention, the image reception apparatus 200 shown in FIG. 4 is changed to an image reception apparatus 200b shown in FIG. 23.

FIG. 23 shows the configuration of the image reception apparatus 200b. As shown in FIG. 23, the image reception apparatus 200b includes an image processing unit 201, a wireless communication unit 210b (a reception-side wireless communication unit), a storage unit 221, and a control unit 230b.

With respect to the configuration shown in FIG. 23, differences from the configuration shown in FIG. 4 will be described.

In the image reception apparatus 200b shown in FIG. 23, the wireless communication unit 210 in the image reception apparatus 200 shown in FIG. 4 is changed to the wireless communication unit 210b.

The wireless communication unit 210b includes a plurality of wireless circuits. That is, the wireless communication unit 210b includes a first wireless circuit 211 (RF1), a second wireless circuit 212 (RF2), and a third wireless circuit 213b (RF3). The wireless communication unit 210b includes a plurality of antennas. That is, the wireless communication unit 210b includes a first antenna 214, a second antenna 215, and a third antenna 216.

In the wireless communication unit 210b shown in FIG. 23, the third wireless circuit 213 in the wireless communication unit 210 shown in FIG. 4 is changed to the third wireless circuit 213b.

The third wireless circuit 213b performs wireless communication with the image transmission apparatus 100 via the third antenna 216. The third wireless circuit 113 and the third wireless circuit 213b perform wireless communication using one communication channel.

The third wireless circuit 213b includes a third radar detection unit 2130. The third radar detection unit 2130 executes a detection process on radio waves of radar in a communication channel that has a possibility of being used for image transmission. The third radar detection unit 2130 executes the detection process on the radio waves of the radar in the communication channel set in the third wireless circuit 213b. The first radar detection unit 2110, the second radar detection unit 2120, and the third radar detection unit 2130 can simultaneously execute the detection process on the radio waves of the radar.

In the image reception apparatus 200b shown in FIG. 23, the control unit 230 in the image reception apparatus 200 shown in FIG. 4 is changed to a control unit 230b. The control unit 230b includes a channel use confirmation unit 2300.

With respect to points other than the above, the configuration shown in FIG. 23 is similar to the configuration shown in FIG. 4.

The outline of an operation in the second embodiment will be described.

The channel use confirmation unit 2300 executes channel use confirmation for confirming whether or not the communication channel is usable by continuously executing the detection process by the radar detection unit for a predetermined time. When image data communication using the first communication channel is being performed, the channel use confirmation unit 2300 executes channel use confirmation using the third communication channel and channel use confirmation using a fourth communication channel. The fourth communication channel is a communication channel in which detection of the radar is necessary or that has a possibility of being used by the radar. The fourth communication channel is different from either of the first communication channel and the third communication channel.

If the channel use confirmation is completed on at least one of the third communication channel and the fourth communication channel at a point in time at which the radio waves of the radar have been detected, the wireless communication unit 110 and the wireless communication unit 210b starts image data communication using one communication channel on which the channel use confirmation is completed.

If the channel use confirmation is not completed on both the third communication channel and the fourth communication channel at a point in time at which the radio waves of the radar have been detected, the channel use confirmation unit 2300 suspends channel use confirmation on one of the third communication channel and the fourth communication channel. The wireless communication unit 110 and the wireless communication unit 210b change the communication channel set in the wireless communication unit 110 and the wireless communication unit 210b from the communication channel on which the channel use confirmation is suspended to the second communication channel and start image data communication using the second communication channel.

Figure 24:
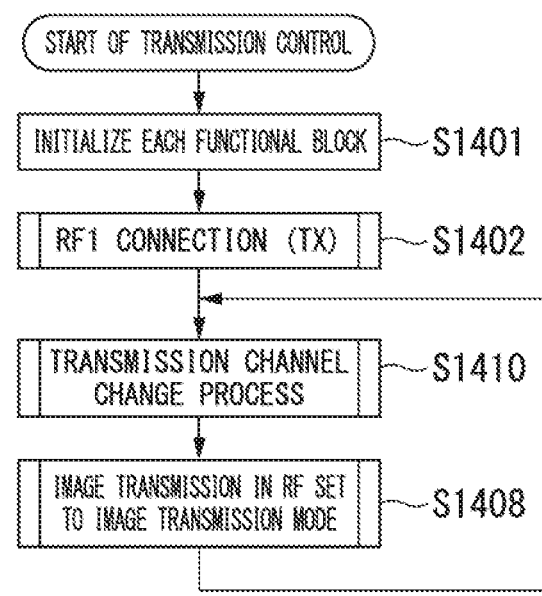
FIG. 24 is a flowchart showing a procedure of an operation of an image transmission apparatus according to the second embodiment of the present invention.
Figure 25:
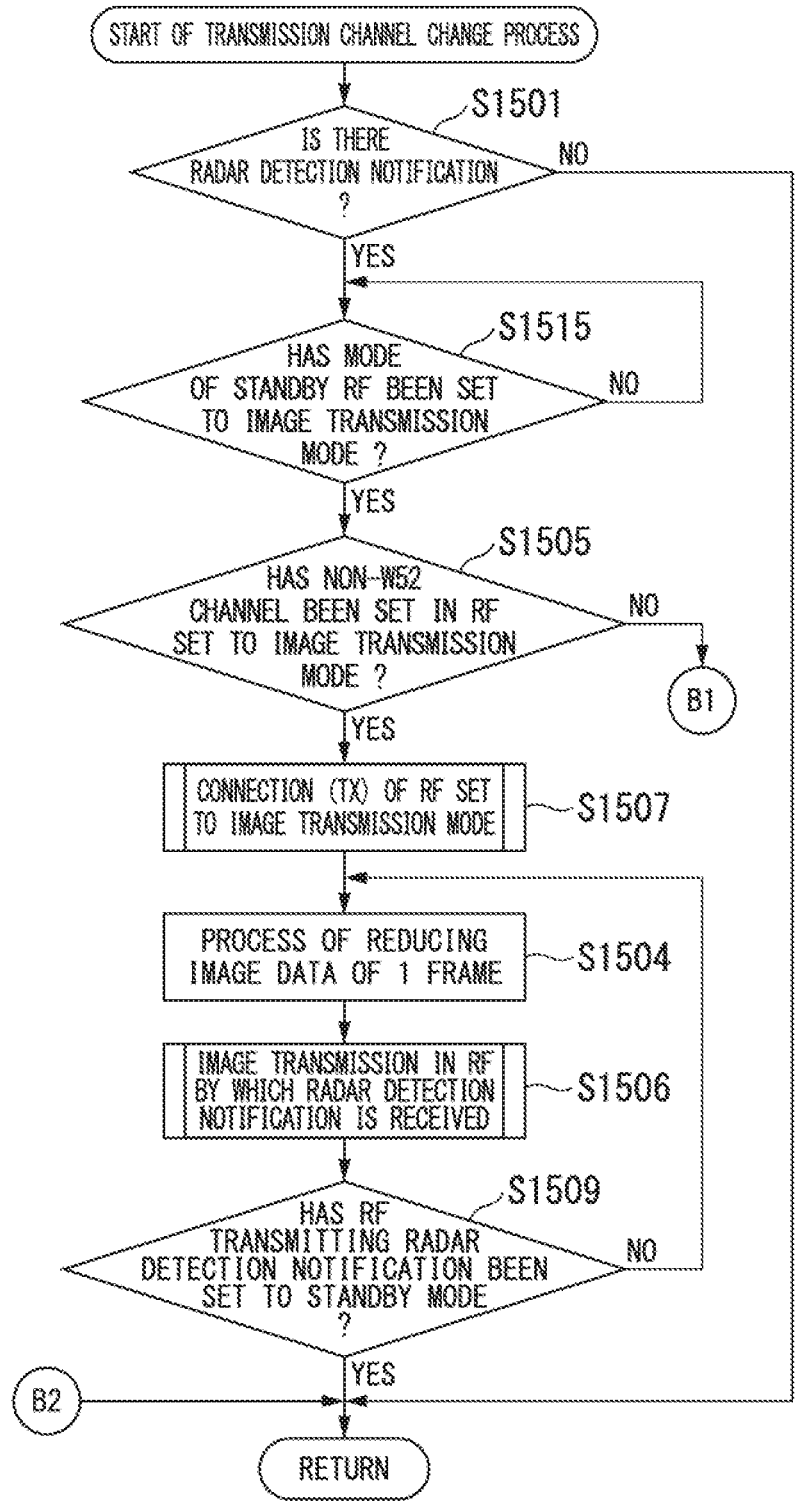
FIG. 25 is a flowchart showing a procedure of an operation of the image transmission apparatus according to the second embodiment of the present invention.
Figure 26:
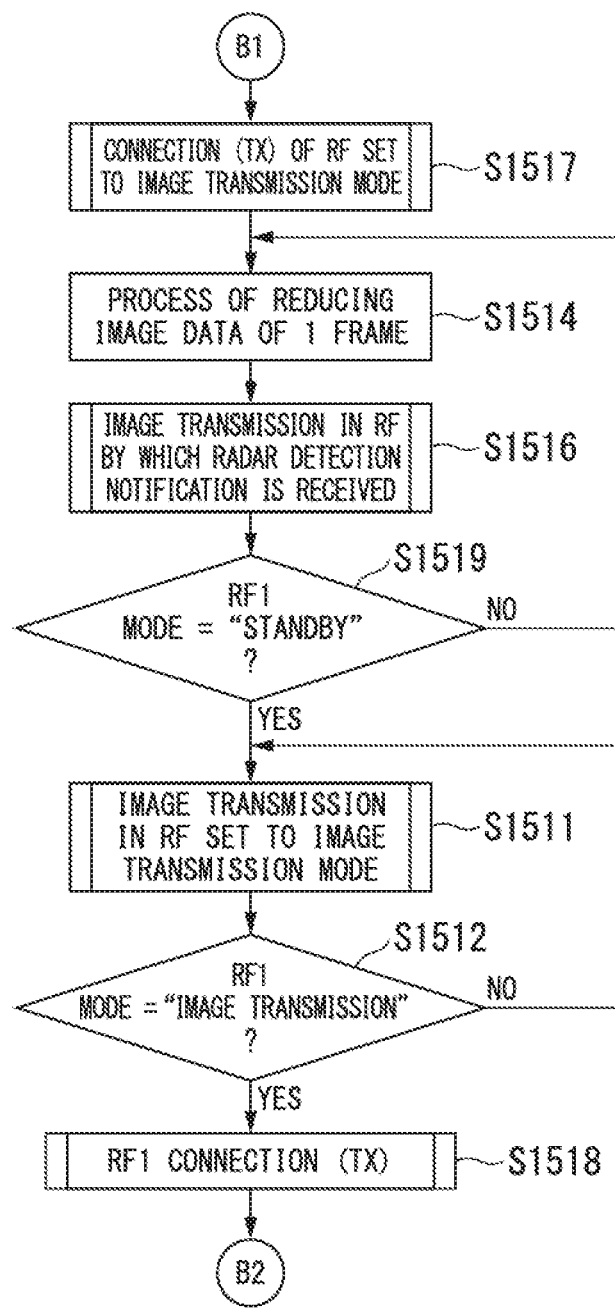
FIG. 26 is a flowchart showing a procedure of an operation of the image transmission apparatus according to the second embodiment of the present invention.

Details of an operation in the second embodiment will be described. An operation of the image transmission apparatus 100 will be described. FIGS. 24 to 26 show a procedure of an operation of the image transmission apparatus 100. The operation shown in FIG. 6 is changed to the operation shown in FIG. 24. The operation shown in FIG. 8 is changed to the operation shown in FIGS. 25 and 26.

When the image transmission apparatus 100 is powered on, the processing in steps S1401 and S1402 is executed. The processing in steps S1401 and S1402 is similar to the processing in steps S501 and S502.

After the processing in step S1402 is executed, a transmission channel change process is executed (step S1410). In the transmission channel change process, processing related to a change in the communication channel to be used for image data communication is executed. In step S1410, the process shown in FIGS. 25 and 26 is executed. Details of the process shown in FIGS. 25 and 26 will be described below.

After the processing in step S1410 is executed, the control unit 130 performs control for transmitting image data by radio waves using the wireless circuit of the wireless communication unit 110 set in the image transmission mode (step S1408). Thereby, the wireless circuit of the wireless communication unit 110 set in the image transmission mode transmits the image data by radio waves. In step S1408, image data of one frame in which the amount of data is not reduced is transmitted. In step S1408, the process shown in FIG. 9 is executed. After the processing in step S1408 is executed, the processing in step S1410 is executed.

FIGS. 25 and 26 show a procedure of an operation of the image transmission apparatus 100 when the transmission channel change process is performed.

The control unit 130 monitors the wireless circuit in the image transmission mode, and determines whether or not the radar detection notification has been received by any one wireless circuit (step S1501). In the wireless communication unit 110, the wireless circuit in the image transmission mode receives the radar detection notification transmitted from the image reception apparatus 200b by radio waves.

If the radar detection notification has not been received in step S1501, the transmission channel change process ends. If the radar detection notification has been received in step S1501, the control unit 130 monitors the wireless circuit in an image transmission mode and determines whether or not the communication information has been received (step S1515). Communication information determined in step S1515 indicates that the mode of the wireless circuit in the standby mode in the image reception apparatus 200b is set to the image transmission mode.

If the communication information has not been received in step S1515, the determination in step S1515 is executed again. If the communication information has been received in step S1515, the control unit 130 makes a determination based on the received communication information (step S1505). In step S1505, the control unit 130 determines whether or not a communication channel belonging to a band other than W52 has been set in the wireless circuit set to the image transmission mode.

If it is determined that a communication channel belonging to a band other than W52 has been set in the wireless circuit set to the image transmission mode in step S1505, the control unit 130 performs control for performing a connection to the wireless communication unit 210b using the wireless communication unit 110 (step S1507). Thereby, the wireless communication unit 110 is connected to the wireless communication unit 210b. In step S1507, the control unit 130 uses the wireless circuit connected to the wireless circuit of the image reception apparatus 200b set to the image transmission mode indicated by the communication information. In step S1507, the process shown in FIG. 7 is executed.

After the processing in step S1507 is executed, the control unit 130 outputs a data reduction instruction to the data amount reduction unit 1020 (step S1504). Thereby, the data amount reduction unit 1020 reduces the amount of image data of one frame output from the imaging unit 101. The processing in step S1504 is similar to the processing in step S604.

After the processing in step S1504 is executed, the control unit 130 performs control for transmitting image data by radio waves using the wireless communication unit 110 (step S1506). Thereby, the wireless communication unit 110 transmits the image data by radio waves. In step S1506, the control unit 130 uses the wireless circuit by which the radar detection notification is received. In step S1506, image data of one frame in which the amount of data is reduced is transmitted. In step S1506, the process shown in FIG. 9 is executed. If the radio waves of the radar have been detected in the communication channel set in the wireless circuit in the image transmission mode, the transmission of the image data using the wireless circuit is continued in step S1506 until the channel switching time $T_1$ elapses.

After the processing in step S1506 is executed, the control unit 130 monitors the wireless circuit in the image transmission mode and determines whether or not communication information has been received (step S1509). The communication information determined in step S1509 indicates that the mode of the wireless circuit that has transmitted the radar detection notification in the image reception apparatus 200b is set to the standby mode.

If communication information has not been received in step S1509, the processing in step S1504 is executed. If the communication information has been received in step S1509, the transmission channel change process ends.

If it is determined that a communication channel belonging to a band other than W52 is not set in the wireless circuit set to the image transmission mode in step S1505, the control unit 130 performs control for performing a connection to a wireless communication unit 210b using the wireless communication unit 110 (step S1517). Thereby, the wireless communication unit 110 is connected to the wireless communication unit 210b. In step S1517, the control unit 130 uses the wireless circuit connected to the wireless circuit of the image reception apparatus 200b set to the image transmission mode indicated by the communication information. In step S1517, the process shown in FIG. 7 is executed.

After the processing in step S1517 is executed, the control unit 130 outputs a data reduction instruction to the data amount reduction unit 1020 (step S1514). Thereby, the data amount reduction unit 1020 reduces the amount of image data of one frame output from the imaging unit 101. The processing in step S1514 is similar to the processing in step S604.

After the processing in step S1514 is executed, the control unit 130 performs control for transmitting image data by radio waves using the wireless communication unit 110 (step S1516). Thereby, the wireless communication unit 110 transmits image data by radio waves. In step S1516, the control unit 130 uses the wireless circuit by which the radar detection notification is received. In step S1516, image data of one frame in which the amount of data is reduced is transmitted. In step S1516, the process shown in FIG. 9 is executed. If radio waves of the radar are detected in the communication channel set in the wireless circuit in the image transmission mode, the transmission of the image data using the wireless circuit is continued in step S1516.

After the processing in step S1516 is executed, the control unit 130 acquires the communication information of the first wireless circuit 211 from the first wireless circuit 111 and determines whether or not the RF1 mode is the standby mode (step S1519).

If the RF1 mode is not the standby mode in step S1519, the processing in step S1514 is executed. If the RF1 mode is the standby mode in step S1519, the control unit 130 performs control for transmitting image data by radio waves using the wireless communication unit 110 (step S511). Thereby, the wireless communication unit 110 transmits the image data by radio waves. In step S1511, the control unit 130 uses the wireless circuit connected to the wireless circuit of the image reception apparatus 200b set to the image transmission mode indicated by the communication information. In step S1511, image data of one frame in which the amount of data is not reduced is transmitted. In step S1511, the process shown in FIG. 9 is executed.

After the processing in step S1511 is executed, the control unit 130 acquires the communication information of the first wireless circuit 211 from the first wireless circuit 111 and determines whether or not the RF1 mode is the image transmission mode (step S1512).

If the RF1 mode is not the image transmission mode in step S1512, the processing in step S1511 is executed. If the RF1 mode is the image transmission mode in step S1512, the control unit 130 performs control for performing a connection to the wireless communication unit 210b (the first wireless circuit 211) using the wireless communication unit 110 (the first wireless circuit 111) (step S1518). Thereby, the wireless communication unit 110 (the first wireless circuit 111) is connected to the wireless communication unit 210b (the first wireless circuit 211). In step S1518, the process shown in FIG. 7 is executed. After the processing in step S1518 is executed, the transmission channel change process ends.

Figure 27:
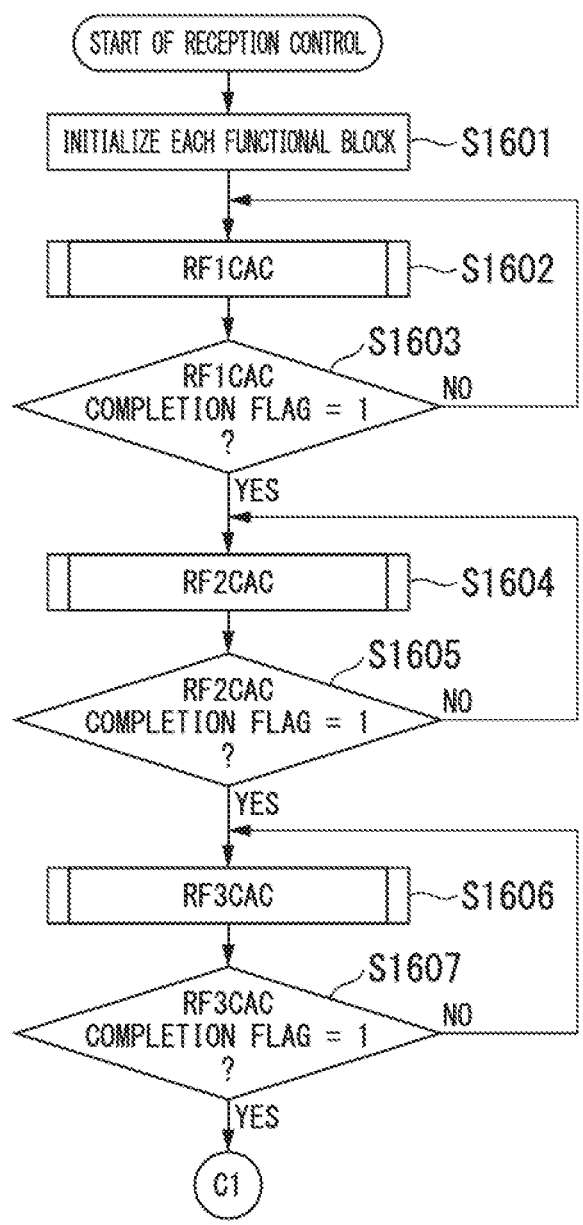
FIG. 27 is a flowchart showing a procedure of an operation of the image reception apparatus according to the second embodiment of the present invention.
Figure 28:
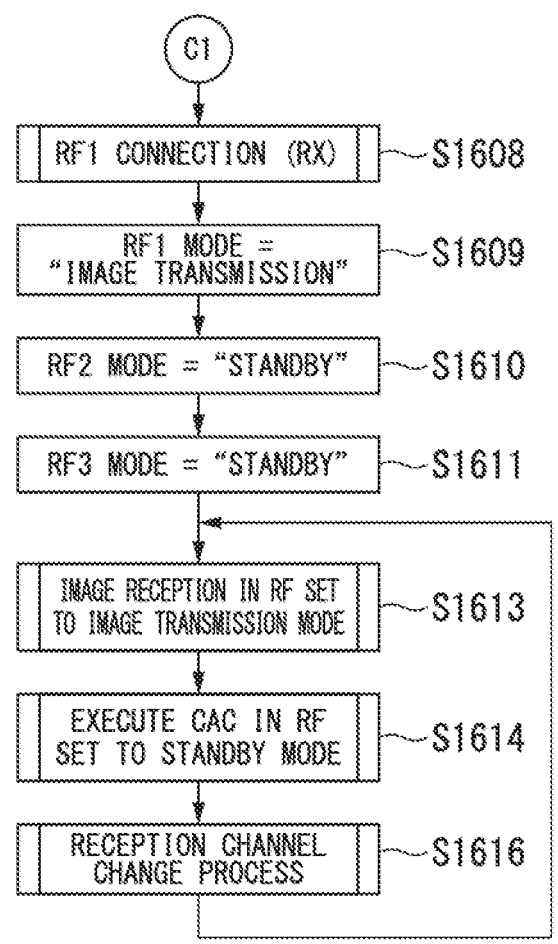
FIG. 28 is a flowchart showing a procedure of an operation of the image reception apparatus according to the second embodiment of the present invention.
Figure 29:
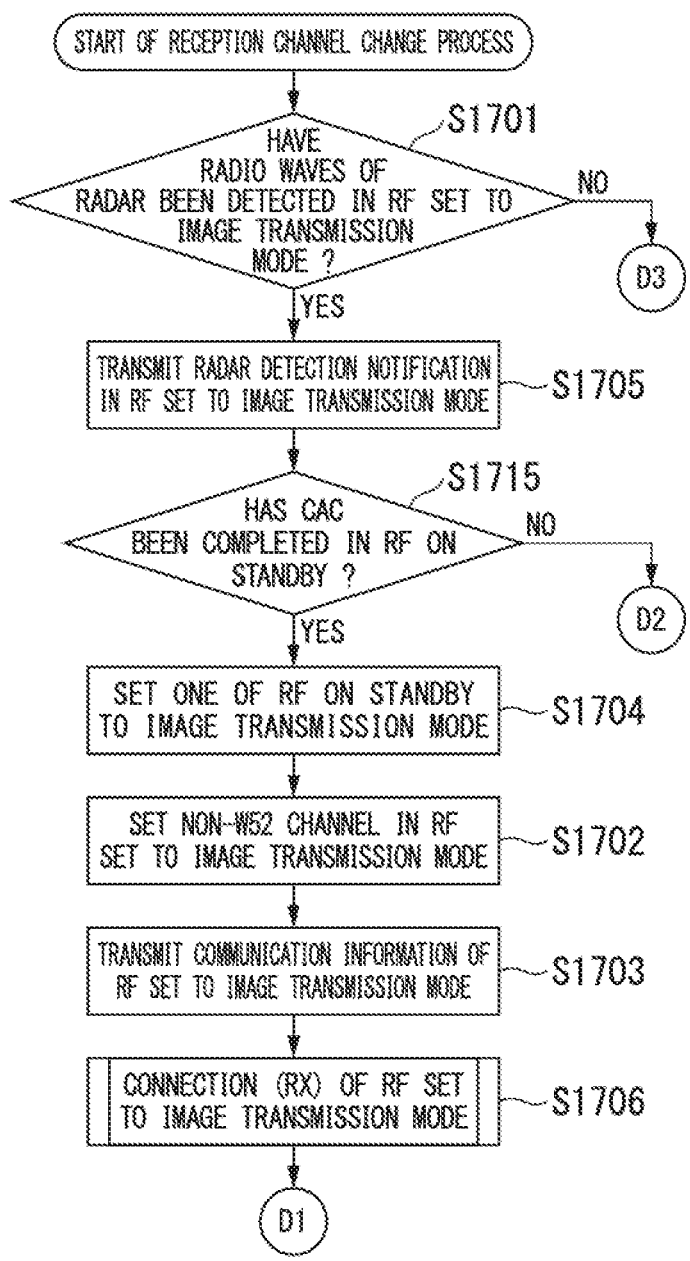
FIG. 29 is a flowchart showing a procedure of an operation of the image reception apparatus according to the second embodiment of the present invention.
Figure 30:
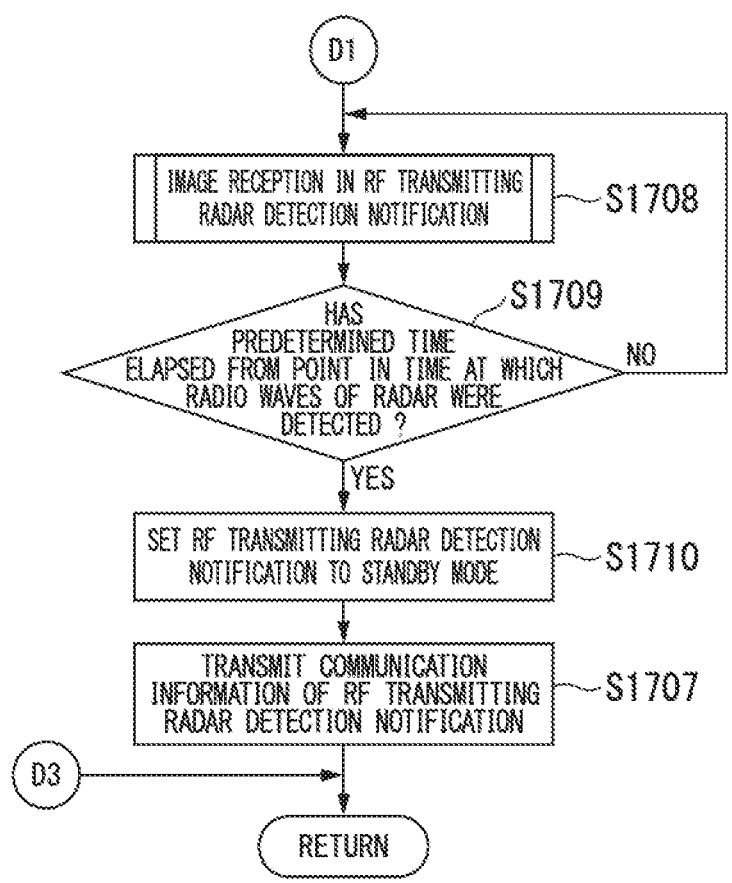
FIG. 30 is a flowchart showing a procedure of an operation of the image reception apparatus according to the second embodiment of the present invention.
Figure 31:
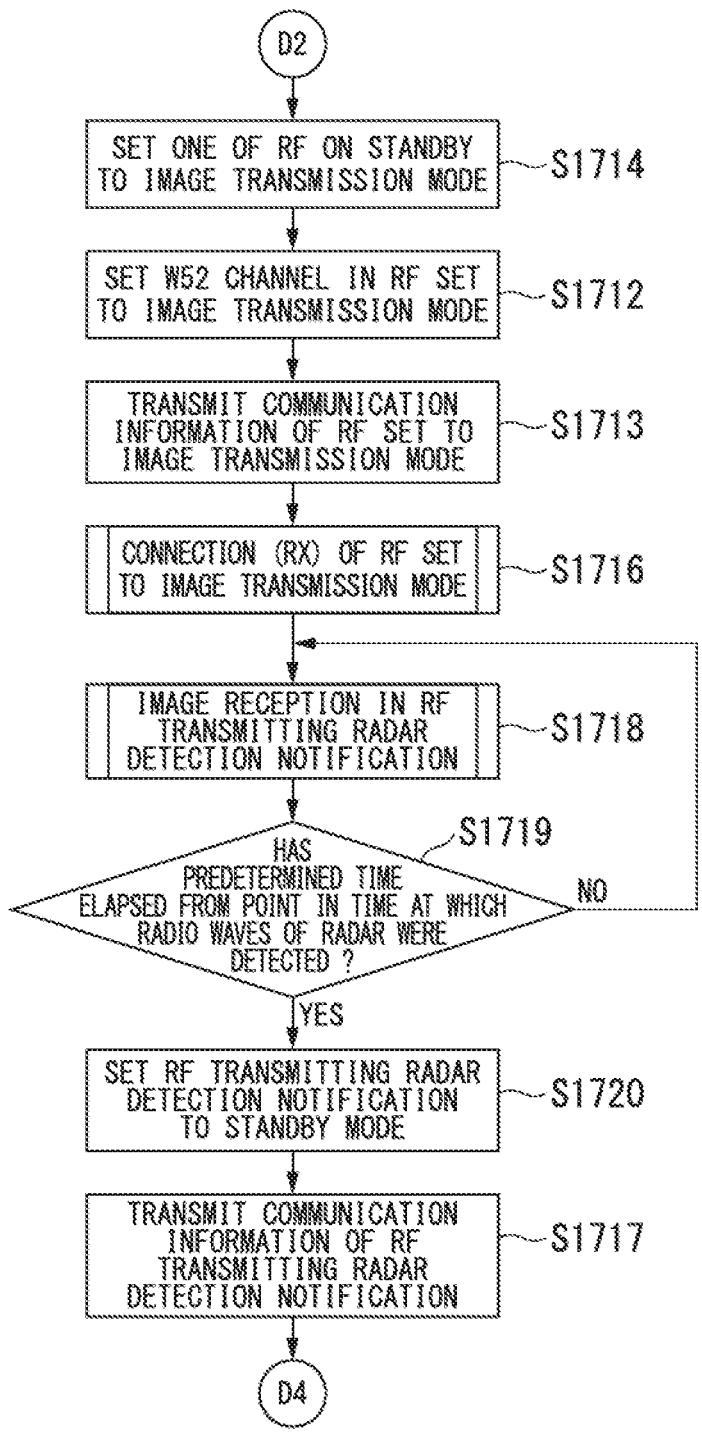
FIG. 31 is a flowchart showing a procedure of an operation of the image reception apparatus according to the second embodiment of the present invention.
Figure 32:
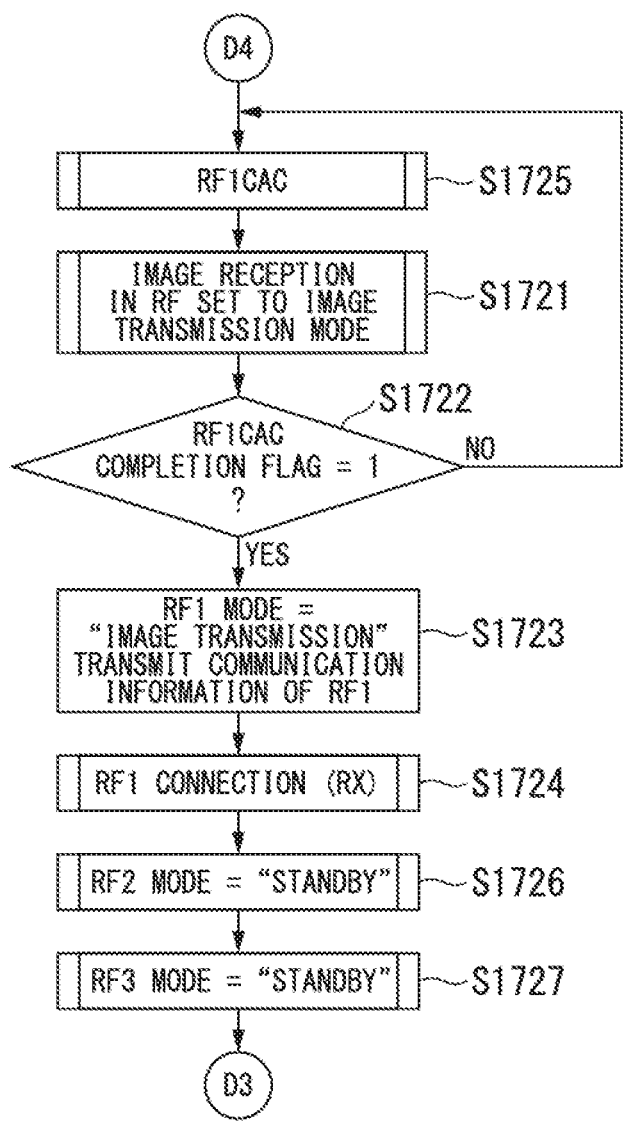
FIG. 32 is a flowchart showing a procedure of an operation of the image reception apparatus according to the second embodiment of the present invention.

An operation of the image reception apparatus 200b will be described. FIGS. 27 to 32 show a procedure of the operation of the image reception apparatus 200b. FIGS. 27 and 28 show a procedure of reception control.

When the image reception apparatus 200b is powered on, the processing in steps S1601 to S1605 is executed. The processing in steps S1601 to S1605 is similar to the processing in steps S301 to S305.

If the RF2CAC completion flag is 1 in step S1605, the channel use confirmation unit 2300 executes CAC using the communication channel set in the third wireless circuit 213b (step S1606). In step S1606, the process shown in FIG. 11 is executed.

After the processing in step S1606 is executed, the control unit 230b determines whether or not the RF3CAC completion flag is 1 (step S1607). The RF3CAC completion flag indicates whether or not CAC using the communication channel set in the third wireless circuit 213b has been completed. If the RF3CAC completion flag is not 1 in step S1607, CAC using the communication channel set in the third wireless circuit 213b is not completed. Thus, the processing in step S1606 is executed again.

If the RF3CAC completion flag is 1 in step S1607, the processing in steps S1608 to S1610 is executed. The processing in steps S1608 to S1610 is similar to the processing in steps S308 to S310. After the processing in step S1610 is executed, the control unit 230b sets the RF3 mode to the standby mode (step S1611).

After the processing in step S1611 is executed, the control unit 230b performs control for receiving image data by radio waves using the wireless communication unit 210b (step S1613). Thereby, the wireless communication unit 210b receives the image data by radio waves. In step S1613, the control unit 230*b* uses the wireless circuit set to the image transmission mode. In step S1613, image data of one frame in which the amount of data is not reduced is received. In step S1613, the process shown in FIG. 13 is executed.

After the processing in step S1613 is executed, the channel use confirmation unit 2300 executes CAC using the communication channel set in the wireless circuit set to the standby mode (step S1614). In step S1614, the process shown in FIG. 11 is executed.

After the processing in step S1614 is executed, the reception channel change process is executed (step S1616). In the reception channel change process, processing related to a change in a communication channel used for image data communication is executed. In step S1616, the process shown in FIGS. 29, 30, 31, and 32 is executed. After the processing in step S1616 is executed, the processing in step S1613 is executed.

FIGS. 29, 30, 31, and 32 show a procedure of an operation of the image reception apparatus 200*b* when the reception channel change process is performed.

The channel use confirmation unit 2300 confirms whether or not a radar detection notification has been acquired from the radar detection unit of the wireless circuit set to the image transmission mode. Thereby, the channel use confirmation unit 2300 determines whether or not radio waves of the radar have been detected in the communication channel set in the wireless circuit set to the image transmission mode (step S1701).

If the radio waves of the radar have not been detected in step S1701, the reception channel change process ends. If the radio waves of the radar have been detected in step S1701, the control unit 230*b* performs control for transmitting the radar detection notification using the wireless communication unit 210*b* by radio waves (step S1705). Thereby, the wireless communication unit 210*b* transmits the radar detection notification by radio waves. In step S1705, the control unit 230*b* uses the wireless circuit set to the image transmission mode.

After the processing in step S1705 is executed, the control unit 230*b* determines whether or not CAC has been completed in at least one of the wireless circuits in the standby mode (step S1715).

If CAC has been completed in at least one of the wireless circuits in the standby mode in step S1715, the control unit 230*b* sets a mode of one of the wireless circuits in the standby mode to the image transmission mode (step S1704). In step S1704, the control unit 230*b* sets the mode of the wireless circuit in which CAC has been completed earliest among the wireless circuits in the standby mode to the image transmission mode.

After the processing in step S1704 is executed, the control unit 230*b* sets a communication channel belonging to a band other than W52 in the wireless circuit set to the image transmission mode in step S1704 (step S1702). In step S1702, the communication channel set when CAC in the wireless circuit set to the image transmission mode is completed is used.

After the processing in step S1702 is executed, the control unit 230*b* performs control for transmitting the communication information of the wireless circuit set to the image transmission mode in the step S1704 by radio waves using the wireless communication unit 210*b* (step S1703). Thereby, the wireless communication unit 210*b* transmits the communication information of the wireless circuit set to the image transmission mode in step S1704 by radio waves.

In step S1703, the control unit 230*b* uses the wireless circuit that has transmitted the radar detection notification in step S1705.

After the processing in step S1703 is executed, the control unit 230*b* performs control for performing a connection to the wireless communication unit 110 using the wireless communication unit 210*b* (step S1706). Thereby, the wireless communication unit 210*b* is connected to the wireless communication unit 110. In step S1706, the control unit 230*b* uses the wireless circuit set to the image transmission mode in step S1704. In step S1706, the process shown in FIG. 12 is executed.

After the processing in step S1706 is executed, the control unit 230*b* performs control for receiving image data by radio waves using the wireless communication unit 210*b* (step S1708). Thereby, the wireless communication unit 210*b* receives the image data by radio waves. In step S1708, the control unit 230*b* uses the wireless circuit that has transmitted the radar detection notification in step S1705. In step S1708, image data of one frame in which the amount of data is reduced is received. In step S1708, the process shown in FIG. 13 is executed.

After the processing in step S1708 is executed, the control unit 230*b* determines whether or not a predetermined time has elapsed from a point in time at which the radio waves of the radar were detected (step S1709). The predetermined time is a time that is longer than the image transmission switching time $T_2$ and shorter than the channel switching time $T_1$.

If the predetermined time has not elapsed in step S1709, the processing in step S1708 is executed. If the radio waves of the radar have been detected in the communication channel set in the wireless circuit set to the image transmission mode, reception of image data is continued in step S1709 until a predetermined time elapses.

If the predetermined time has elapsed in step S1709, the control unit 230*b* sets the mode of the wireless circuit that has transmitted the radar detection notification in step S1705 to the standby mode (step S1710).

After the processing in step S1710 is executed, the control unit 230*b* performs control for transmitting the communication information of the wireless circuit that has transmitted the radar detection notification in step S1705 by radio waves using the wireless communication unit 210*b* (step S1707). Thereby, the wireless communication unit 210*b* transmits the communication information of the wireless circuit that has transmitted the radar detection notification in step S1705 by radio waves. In step S1707, the control unit 230*b* uses the wireless circuit set to the image transmission mode. After the processing in step S1707 is executed, the reception channel change process ends.

If CAC is not completed in all the wireless circuits in the standby mode in step S1715, the control unit 230*b* sets the mode of one of the wireless circuit in the standby mode to the image transmission mode (step S1714). In step S1714, the control unit 230*b* sets the mode of the wireless circuit that has started the CAC earliest among the wireless circuits in the standby mode to the image transmission mode.

After the processing in step S1714 is executed, the control unit 230*b* sets a communication channel belonging to W52 in the wireless circuit set to the image transmission mode in step S1714 (step S1712).

After the processing in step S1712 is executed, the processing in steps S1713, S1716, S1718, S1719, S1720, and S1717 is executed. The processing in steps S1713, S1716, S1718, S1719, S1720 and S1717 is similar to the processing in steps S1703, S1706, S1708, S1709, S1710, and S1707.

After the processing in step S1717 is executed, the channel use confirmation unit 2300 executes CAC using the communication channel set in the first wireless circuit 211 (step S1725). In step S1725, the channel use confirmation unit 2300 uses a communication channel which belongs to a band other than W52 and has not been immediately previously used by each wireless circuit. In step S1725, the process shown in FIG. 11 is executed.

After the processing in step S1725 is executed, the control unit 230b performs control for receiving image data by radio waves using the wireless communication unit 210b (step S1721). Thereby, the wireless communication unit 210b receives the image data by radio waves. In step S1721, the control unit 230b uses the wireless circuit set to the image transmission mode in step S1714. In step S1721, image data of one frame in which the amount of data is reduced is received. In step S1721, the process shown in FIG. 13 is executed.

After the processing in step S1721 is executed, the control unit 230b determines whether or not the RF1CAC completion flag is 1 (step S1722). If the RF1CAC completion flag is not 1 in step S1722, CAC using the communication channel set in the first wireless circuit 211 is not completed. Thus, the processing in step S1725 is executed again.

If the RF1CAC completion flag is 1 in step S1722, the control unit 230b sets the RF1 mode to the image transmission mode. Further, the control unit 230b performs control for transmitting communication information of the first wireless circuit 211 by radio waves using the wireless communication unit 210b (step S1723). Thereby, the wireless communication unit 210b transmits the communication information of the first wireless circuit 211 by radio waves. In step S1723, the control unit 230b uses the wireless circuit set to the image transmission mode in step S1714.

After the processing in step S1723 is executed, the control unit 230 performs control for performing a connection to the wireless communication unit 110 (the first wireless circuit 111) using the wireless communication unit 210b (the first wireless circuit 211) (step S1724). Thereby, the wireless communication unit 210b (the first wireless circuit 211) is connected to the wireless communication unit 110 (the first wireless circuit 111). In step S1724, the communication channel set when CAC is completed in step S1725 is used. In step S1724, the process shown in FIG. 12 is executed.

After the processing in step S1724 is executed, the control unit 230b sets the RF2 mode and the RF3 mode to the standby mode (steps S1726 and S1727). After the processing in step S1727 is executed, the reception channel change process ends.

In steps S1704 and S1714, the user may be able to select the wireless circuit set to the image transmission mode.

The control unit 130 may control the first wireless circuit 111 and the second wireless circuit 112 without controlling the third wireless circuit 113, thereby executing the transmission channel change process. In this case, the control unit 230b controls the first wireless circuit 211 and the second wireless circuit 212 without controlling the third wireless circuit 213b. In this case, in the transmission channel change process and the reception channel change process, the control unit 130 and the control unit 230b perform the following process. If radio waves of the radar are detected in the communication channel set in the first wireless circuit 211 that is performing image data communication, a process is performed according to whether or not CAC using the communication channel set in the second wireless circuit 212 has been completed.

If CAC using the communication channel set in the second wireless circuit 212 has been completed, the control unit 130 and the control unit 230b perform image data communication using the second wireless circuit 112 and the second wireless circuit 212 in which a communication channel belonging to a band other than W52 is set.

If CAC using the communication channel set in the second wireless circuit 212 has not been completed, CAC is suspended and a communication channel belonging to W52 is set in the second wireless circuit 112 and the second wireless circuit 212. The control unit 130 and the control unit 230b perform image data communication using the second wireless circuit 112 and the second wireless circuit 212 in which the communication channel belonging to W52 is set. After the radio waves of the radar are detected, CAC using the communication channel set in the first wireless circuit 211 is executed. After CAC is completed, the control unit 130 and the control unit 230b perform image data communication using the first wireless circuit 111 and the first wireless circuit 211 in which a communication channel belonging to a band other than W52 is set.

As described above, when image data communication using the first communication channel is being performed, the channel use confirmation unit 2300 executes channel use confirmation using the third communication channel and channel use confirmation using the fourth communication channel (corresponding to step S1614). If the channel use confirmation is completed on at least one of the third communication channel and the fourth communication channel at a point in time at which the radio waves of the radar have been detected, the wireless communication unit 110 and the wireless communication unit 210b start image data communication using one communication channel on which the channel use confirmation is completed (corresponding to steps S1408 and S1613).

If the channel use confirmation is not completed on both the third communication channel and the fourth communication channel at a point in time at which the radio waves of the radar have been detected, the channel use confirmation unit 2300 suspends channel use confirmation of one of the third communication channel and the fourth communication channel (corresponding to step S1714). The wireless communication unit 110 and the wireless communication unit 210b change the communication channel set in the wireless communication unit 110 and the wireless communication unit 210b from the communication channel on which the channel use confirmation is suspended to the second communication channel (corresponding to steps S1517 and S1712), and starts image data communication using the second communication channel (corresponding to steps S1511 and S1721).

Figure 33:
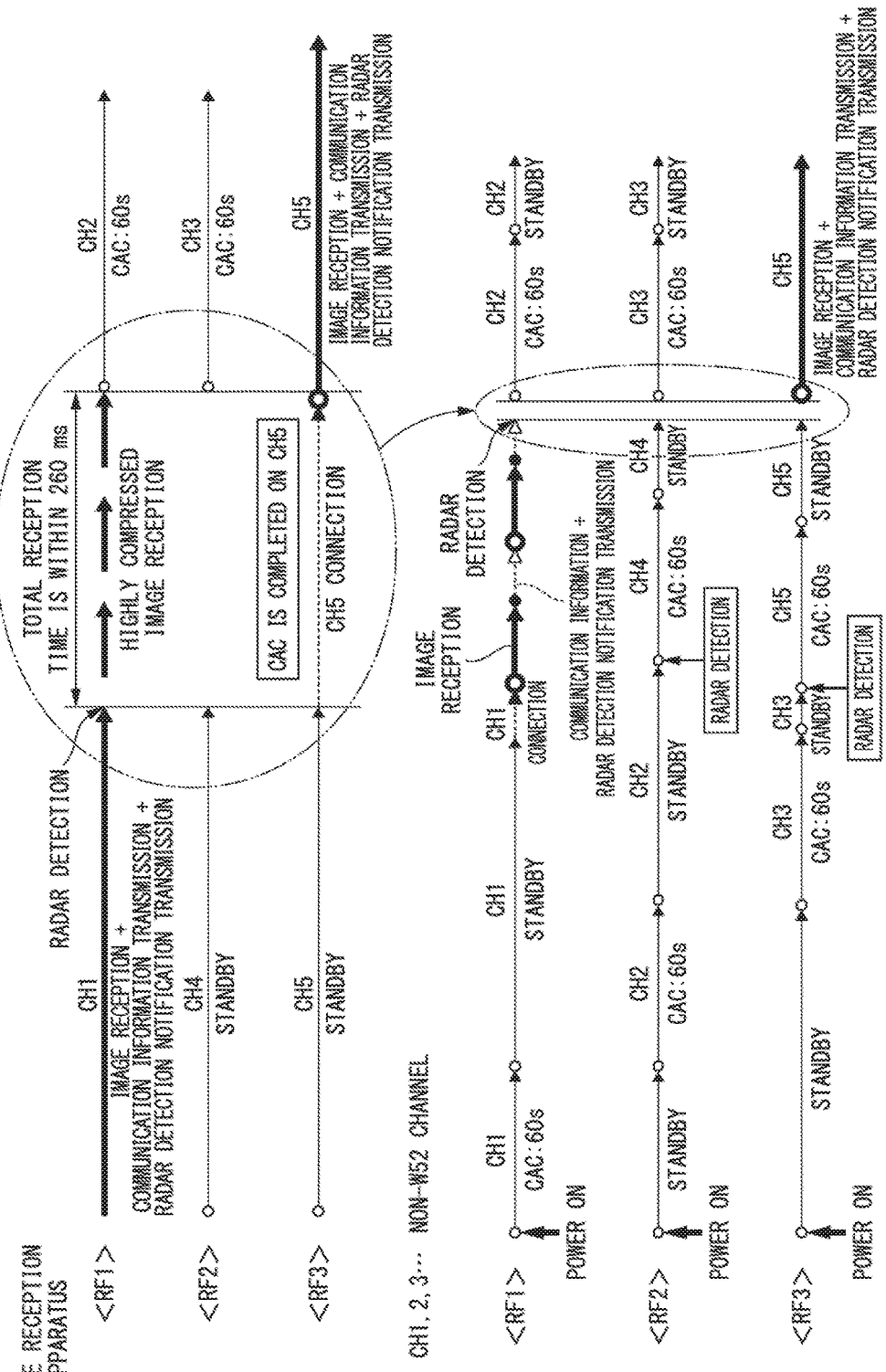
FIG. 33 is a sequence diagram showing an operation of each wireless circuit included in the image reception apparatus according to the second embodiment of the present invention.
Figure 34:
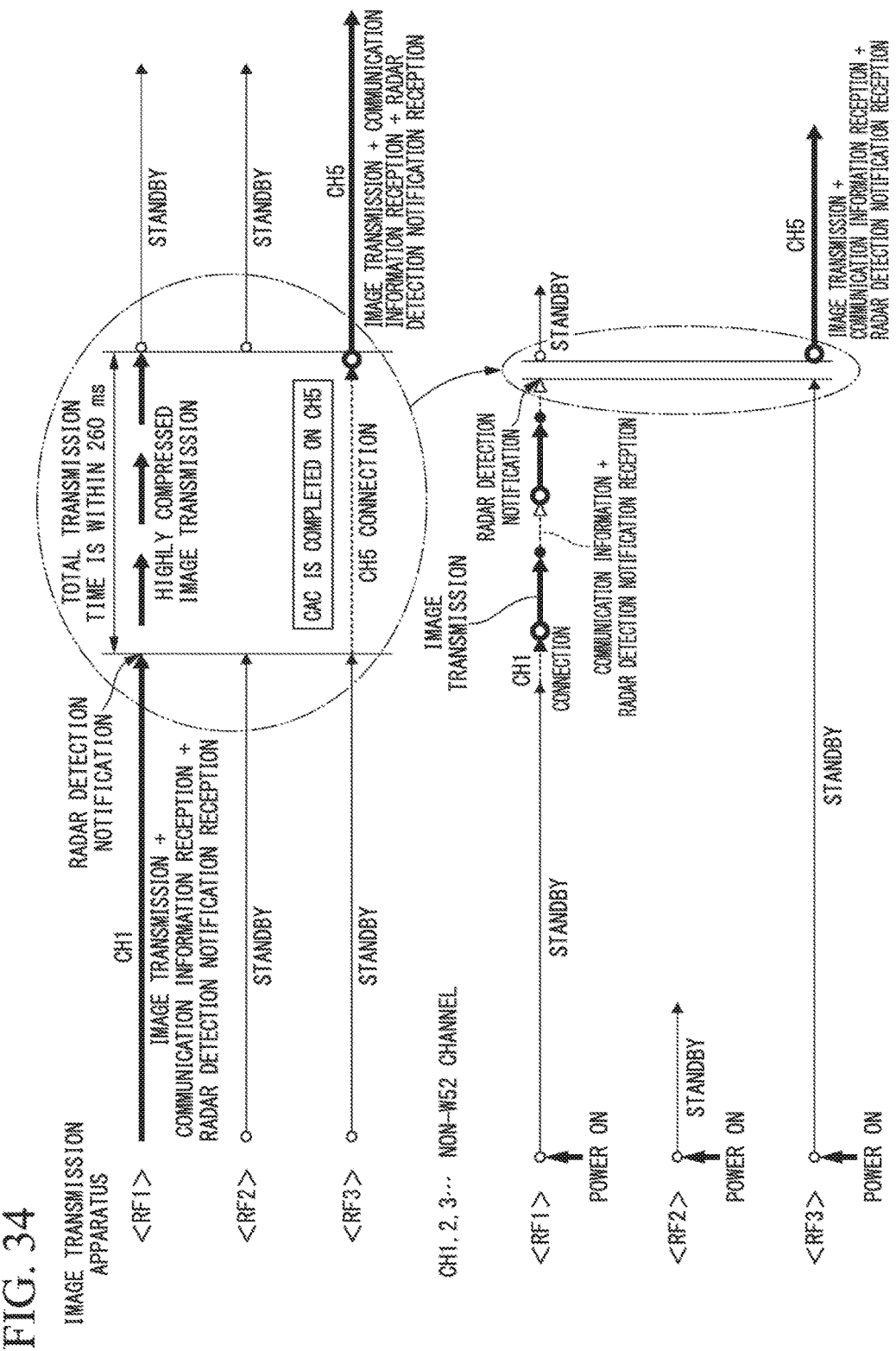
FIG. 34 is a sequence diagram showing an operation of each wireless circuit included in the image transmission apparatus according to the second embodiment of the present invention.

FIGS. 33 and 34 show an operation when the communication channel used for image transmission is changed from a communication channel belonging to a band other than W52 to another communication channel belonging to a band other than W52. FIG. 33 shows an operation of each wireless circuit included in the image reception apparatus 200b. FIG. 34 shows an operation of each wireless circuit included in the image transmission apparatus 100.

After the image reception apparatus 200b is powered on, CAC using the communication channel CH1 belonging to a band other than W52 is executed in the first wireless circuit 211 (corresponding to step S1602). After CAC is completed, the first wireless circuit 211 is connected to the first wireless circuit 111 using the communication channel CH1 (corresponding to step S1608). After the connection is completed, the first wireless circuit 211 receives the image data using the communication channel CH1 (the first communication channel) (corresponding to step S1613). When the image data is being received, the first wireless circuit 211 executes a detection process on radio waves of the radar by ISM (corresponding to step S1701). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

After the image reception apparatus 200b is powered on, CAC using the communication channel CH2 belonging to a band other than W52 is executed in the second wireless circuit 212 (corresponding to step S1604). After CAC is completed, the second wireless circuit 212 executes the detection process on the radio waves of the radar by ISM (corresponding to step S801 within step S1614). If radio waves of the radar are detected by the second wireless circuit 212, the communication channel is changed to the communication channel CH4 and CAC using the communication channel CH4 is executed (corresponding to step S1614).

After the image reception apparatus 200b is powered on, CAC using the communication channel CH3 belonging to a band other than W52 is executed in the third wireless circuit 213b (corresponding to step S1606). After CAC is completed, the third wireless circuit 213b executes the detection process on the radio waves of the radar by ISM (corresponding to step S801 within the step S1614). If radio waves of the radar are detected by the third wireless circuit 213b, the communication channel is changed to a communication channel CH5 and CAC using the communication channel CH5 is executed (corresponding to step S1614).

When the first wireless circuit 211 is receiving image data, the radio waves of the radar are detected (corresponding to step S1701). At this point in time, CAC using a communication channel CH4 set in the second wireless circuit 212 and CAC using the communication channel CH5 set in the third wireless circuit 213b are completed. Before CAC using the communication channel CH4 is completed, CAC using the communication channel CH5 is completed. Thus, the communication channel CH5 is set in the third wireless circuit 213b (corresponding to step S1702). Thereby, the communication channel to be used for image transmission is switched from the first communication channel to the communication channel CH5. The first wireless circuit 211 receives image data whose amount is reduced (corresponding to step S1708). A total transmission time of the image data whose amount is reduced is within the image transmission switching time $T_2$. For example, the image transmission switching time $T_2$ is 260 milliseconds.

The first wireless circuit 211 is set in the standby mode and hence the first wireless circuit 211 stops receiving the image data (corresponding to step S1710). Thereafter, the third wireless circuit 213b receives the image data using the communication channel CH5 (the third communication channel) belonging to a band other than W52 (corresponding to step S1613). The third wireless circuit 213b transmits communication information to the third wireless circuit 113 in a blanking period other than a period during which the image data is received. Also, if radio waves of the radar are detected, the third wireless circuit 213b transmits a radar detection notification to the third wireless circuit 113 during the blanking period. Switching of the communication channel is performed within the channel switching time $T_1$ from a point in time at which the radio waves of the radar were detected.

After receiving of the image data is stopped, CAC using the communication channel CH2 different from the communication channel CH1 used for receiving the image data is executed in the first wireless circuit 211 (corresponding to step S1614).

After the image transmission apparatus 100 is powered on, the first wireless circuit 111 is connected to the first wireless circuit 211 using the communication channel CH1 belonging to a band other than W52 (corresponding to step S1402). After the connection is completed, the first wireless circuit 111 transmits the image data using the communication channel CH1 (the first communication channel) (corresponding to step S1408). The first wireless circuit 111 receives communication information from the first wireless circuit 211 during a blanking period other than a period during which image data is received. Also, if radio waves of the radar are detected in the image reception apparatus 200b, the first wireless circuit 111 receives a radar detection notification from the first wireless circuit 211 during the blanking period.

After the image transmission apparatus 100 is powered on, the second wireless circuit 112 and the third wireless circuit 113 are on standby.

When the first wireless circuit 111 is transmitting the image data, the radio waves of the radar are detected by the image reception apparatus 200b. Thus, the communication channel to be used for image transmission is switched from the first communication channel to the communication channel CH5 set in the third wireless circuit 213b (corresponding to step S1507). The first wireless circuit 111 transmits image data whose amount is reduced by the data amount reduction unit 1020 (corresponding to step S1506). A total transmission time of the image data whose amount is reduced is within the image transmission switching time $T_2$. For example, the image transmission switching time $T_2$ is 260 milliseconds.

After receiving notification information indicating that the first wireless circuit 211 is in the standby mode, the first wireless circuit 111 stops transmitting the image data (corresponding to step S1509). Thereafter, the third wireless circuit 113 transmits the image data using the communication channel CH5 (the third communication channel) belonging to a band other than W52 (corresponding to step S1408). Switching of the communication channel is performed within the channel switching time $T_1$ from a point in time at which the radio waves of the radar were detected.

Figure 35:
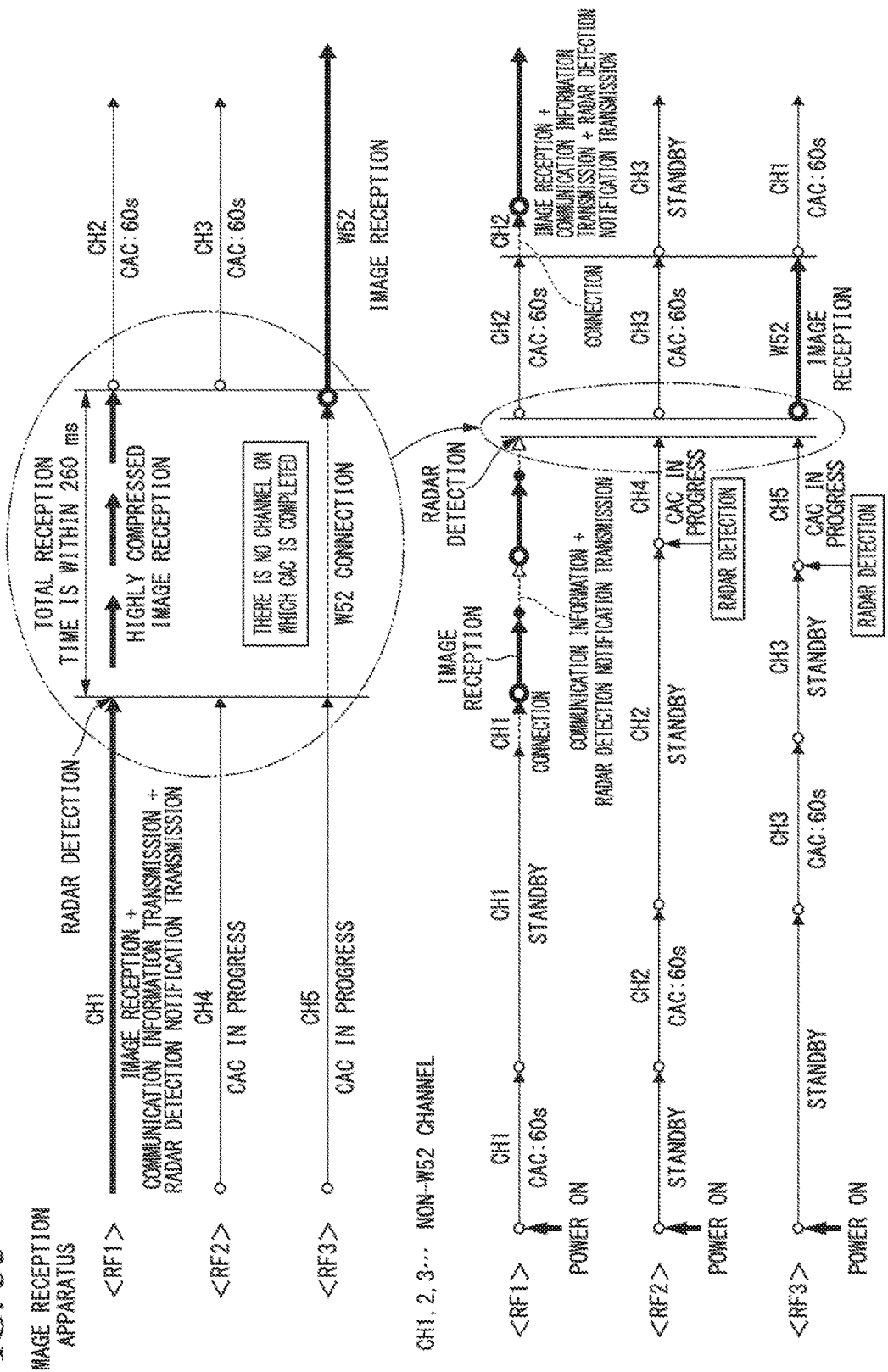
FIG. 35 is a sequence diagram showing an operation of each wireless circuit included in the image reception apparatus according to the second embodiment of the present invention.
Figure 36:
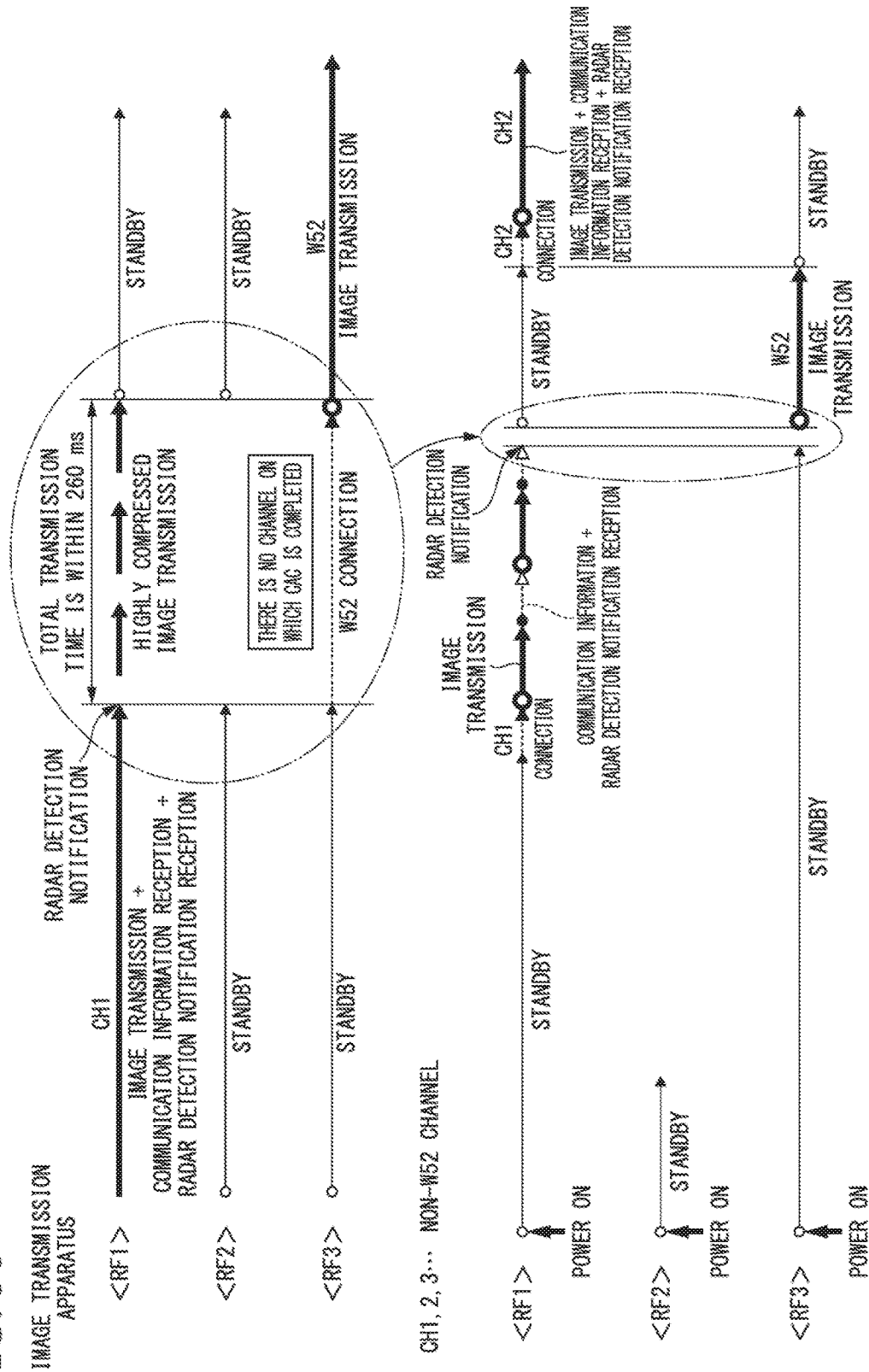
FIG. 36 is a sequence diagram showing an operation of each wireless circuit included in the image transmission apparatus according to the second embodiment of the present invention.

FIGS. 35 and 36 show an operation when the communication channel to be used for image transmission is changed from a communication channel belonging to a band other than W52 to a communication channel belonging to W52. FIG. 35 shows an operation of each wireless circuit included in the image reception apparatus 200b. FIG. 36 shows an operation of each wireless circuit included in the image transmission apparatus 100.

In FIG. 35, an operation before radio waves of the radar are detected in the communication channel set in the first wireless circuit 211 is similar to the operation shown in FIG. 33. When the first wireless circuit 211 is receiving image data, the radio waves of the radar are detected (corresponding to step S1701). At this point in time, CAC using the communication channel CH4 set in the second wireless circuit 212 and CAC using the communication channel CH5 set in the third wireless circuit 213b are not completed. Before CAC using the communication channel CH4 is started, CAC using the communication channel CH5 is started. Thus, the communication channel belonging to W52 is set in the third wireless circuit 213b (corresponding to step S1712). Thereby, the communication channel to be used for image transmission is switched from the first communication channel to the communication channel set in the third wireless circuit 213b. The first wireless circuit 211 receives image data whose amount is reduced (corresponding to step S1718). A total transmission time of the image data whose amount is reduced is within the image transmission switching time $T_2$. For example, the image transmission switching time $T_2$ is 260 milliseconds.

The first wireless circuit 211 is set in the standby mode and hence the first wireless circuit 211 stops receiving the image data (corresponding to step S1720). Thereafter, the third wireless circuit 213b receives image data using the communication channel (the second communication channel) belonging to W52 (corresponding to step S1721). Switching of the communication channel is performed within the channel switching time $T_1$ from a point in time at which the radio waves of the radar were detected.

After receiving of the image data is stopped, CAC using the communication channel CH2 different from the communication channel CH1 used for receiving the image data is executed in the first wireless circuit 211 (corresponding to step S1725). After CAC is completed, the first wireless circuit 211 is connected to the first wireless circuit 111 using the communication channel CH2 (corresponding to step S1724). After the connection is completed, the first wireless circuit 211 receives the image data using the communication channel CH2 (corresponding to step S1613). When the image data is being received, the first wireless circuit 211 executes a detection process on radio waves of the radar by ISM (corresponding to step S1701). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

When CAC is completed in the first wireless circuit 211 after the third wireless circuit 213b starts receiving image data, the third wireless circuit 213b stops receiving the image data (corresponding to step S1727). Thereafter, in the third wireless circuit 213, CAC using the communication channel CH1 belonging to a band other than W52 is executed (corresponding to step S1614).

In FIG. 36, an operation before the radio waves of the radar are detected in the communication channel set in the first wireless circuit 211 is similar to the operation shown in FIG. 34. When the first wireless circuit 111 is transmitting the image data, the radio waves of the radar are detected by the image reception apparatus 200b. Thus, the communication channel to be used for image transmission is switched from the first communication channel to a communication channel belonging to W52 set in the third wireless circuit 213b (corresponding to step S1517). The first wireless circuit 111 transmits image data whose amount is reduced by the data amount reduction unit 1020 (corresponding to step S1516). A total transmission time of the image data whose amount is reduced is within the image transmission switching time $T_2$. For example, the image transmission switching time $T_2$ is 260 milliseconds.

After receiving notification information indicating that the first wireless circuit 211 is in the standby mode, the first wireless circuit 111 stops transmitting the image data (corresponding to step S1519). Thereafter, the third wireless circuit 113 transmits the image data using the communication channel (the second communication channel) belonging to W52 (corresponding to step S1408). Switching of the communication channel is performed within the channel switching time $T_1$ from a point in time at which the radio waves of the radar were detected.

The image transmission apparatus 100 may include a radar detection unit and a channel use confirmation unit 1300. The image transmission apparatus 100 may perform the above-described control related to switching of communication channels.

It is only necessary for at least one of the image transmission apparatus 100 and the image reception apparatus 200b to include a radar detection unit. Therefore, only one of the image transmission apparatus 100 and the image reception apparatus 200b may include the radar detection unit. Alternatively, the image transmission apparatus 100 and the image reception apparatus 200b may include the radar detection unit.

It is only necessary for at least one of the image transmission apparatus 100 and the image reception apparatus 200b to include a channel use confirmation unit. Therefore, only one of the image transmission apparatus 100 and the image reception apparatus 200b may include the channel use confirmation unit. Alternatively, the image transmission apparatus 100 and the image reception apparatus 200b may include the channel use confirmation unit.

In the second embodiment, the wireless communication unit 110 and the wireless communication unit 210b perform the image data communication in which the amount of data is reduced using the first communication channel from the first point in time to the second point in time. The first point in time is a point in time at which radio waves of the radar are detected in the first communication channel while image data communication using the first communication channel is performed. The second point in time is a point in time at which the image data communication using the first communication channel is stopped. Thus, image transmission can be continued if radio waves of the radar are detected in the communication channel used for image transmission.

In the second embodiment, CAC using a communication channel set in two wireless circuits that are not used for image data communication is executed. If CAC using the communication channel set in at least one wireless circuit is completed at a point in time at which the radio waves of the radar has been detected, image data communication using the communication channel on which CAC is completed is performed. Thus, good image transmission can be continued. If CAC using the communication channel set in the two wireless circuits is not completed at a point in time at which the radio waves of the radar have been detected, a communication channel belonging to W52 is set in one of the two wireless circuits. Further, image data communication using the communication channel belonging to W52 is performed. Thus, good image transmission can be continued.

Third Embodiment

In the third embodiment of the present invention, the image transmission apparatus 100 and the image reception apparatus 200 of the first embodiment are used.

The outline of the operation in the third embodiment will be described. In the following description, the radar detection unit corresponds to the first radar detection unit 2110 and the second radar detection unit 2120.

The channel use confirmation unit 2300 executes channel use confirmation for confirming whether or not the communication channel is usable by continuously executing the detection process by the radar detection unit for a predetermined time. The channel use confirmation unit 2300 executes the channel use confirmation using the third communication channel. The third communication channel is a communication channel in which detection of the radar is necessary or that has a possibility of being used by the radar. The third communication channel is different from the first communication channel. When the channel use confirmation using the third communication channel is not completed at the first point in time, the wireless communication unit 110 and the wireless communication unit 210 start image data communication using the second communication channel within the first time from the first point in time. If the channel use confirmation using the third communication channel is completed at the first point in time, the wireless communication unit 110 and the wireless communication unit 210 start image data communication using the third communication channel within the first time from the first point in time.

The above-described first point in time is a point in time at which radio waves of the radar are detected in the first communication channel while image data communication using the first communication channel is performed. The first time is the channel switching time $T_1$. The above-described second time is the image transmission switching time $T_2$.

Details of an operation of the third embodiment will be described. An operation of the image transmission apparatus 100 is similar to the operation of the image transmission apparatus 100 according to the second embodiment.

Figure 37:
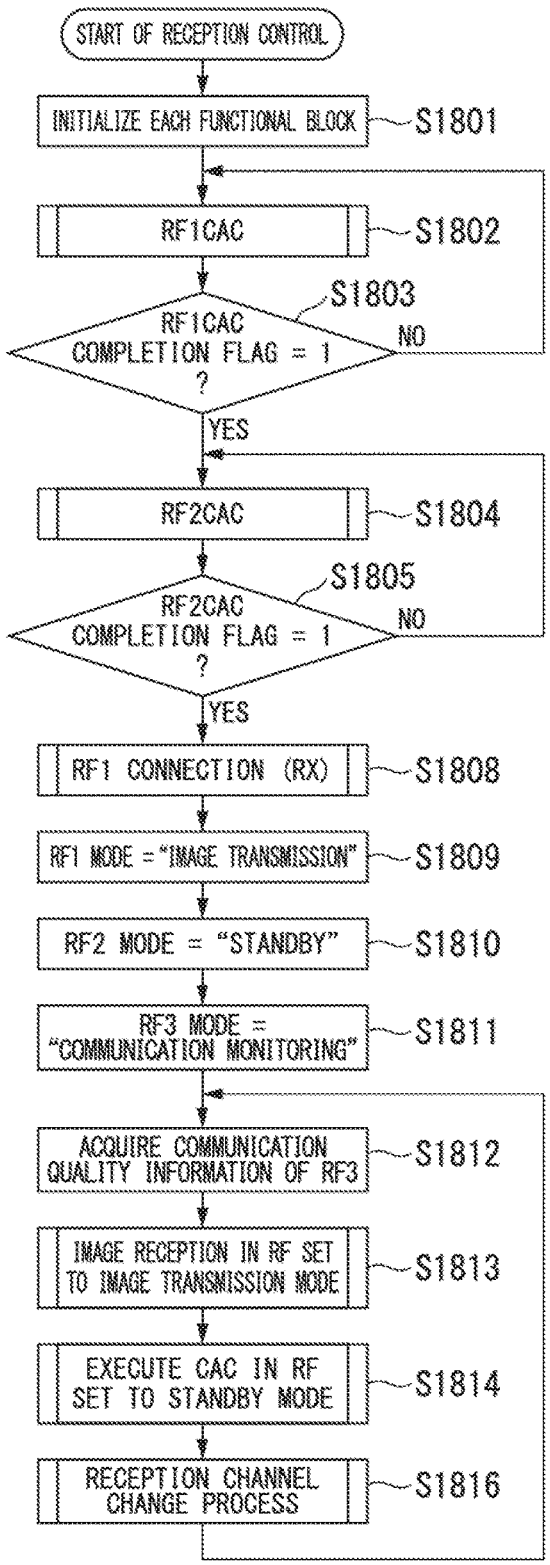
FIG. 37 is a flowchart showing a procedure of an operation of an image reception apparatus according to a third embodiment of the present invention.
Figure 38:
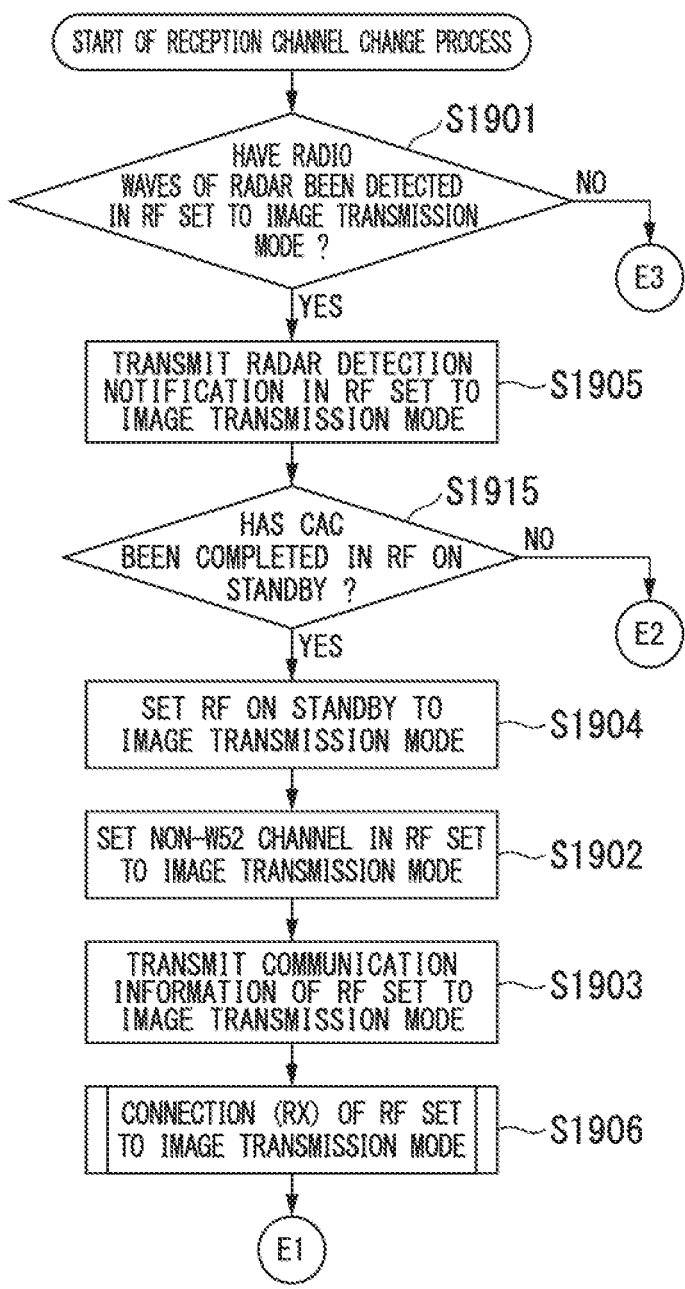
FIG. 38 is a flowchart showing a procedure of an operation of the image reception apparatus according to the third embodiment of the present invention.
Figure 39:
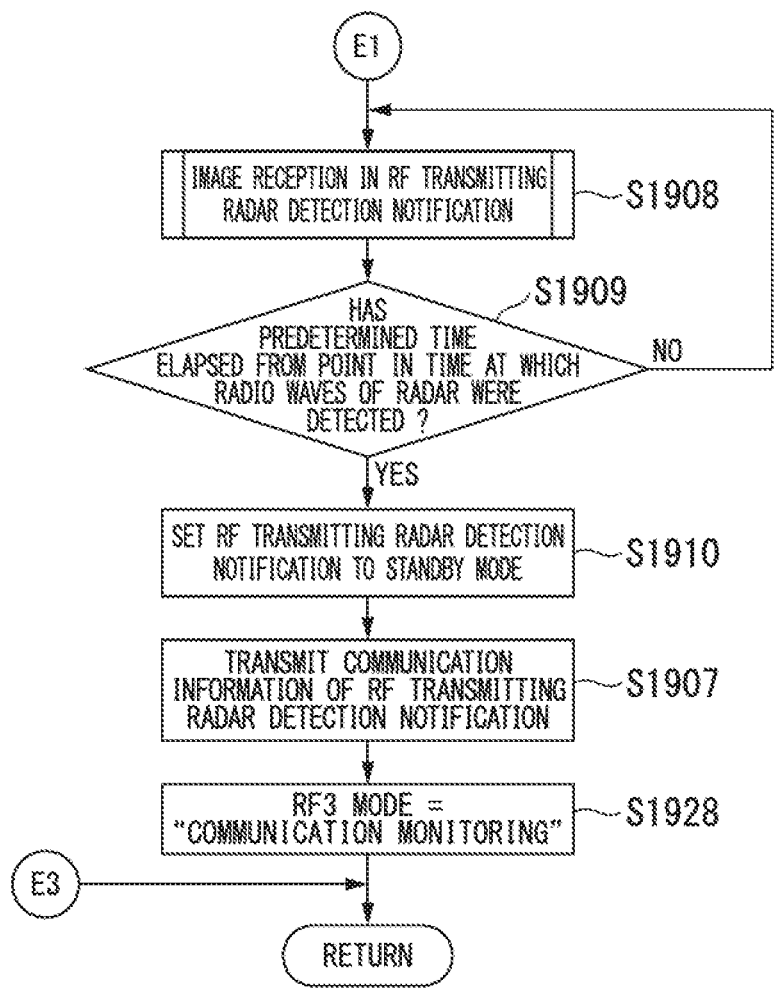
FIG. 39 is a flowchart showing a procedure of an operation of the image reception apparatus according to the third embodiment of the present invention.
Figure 40:
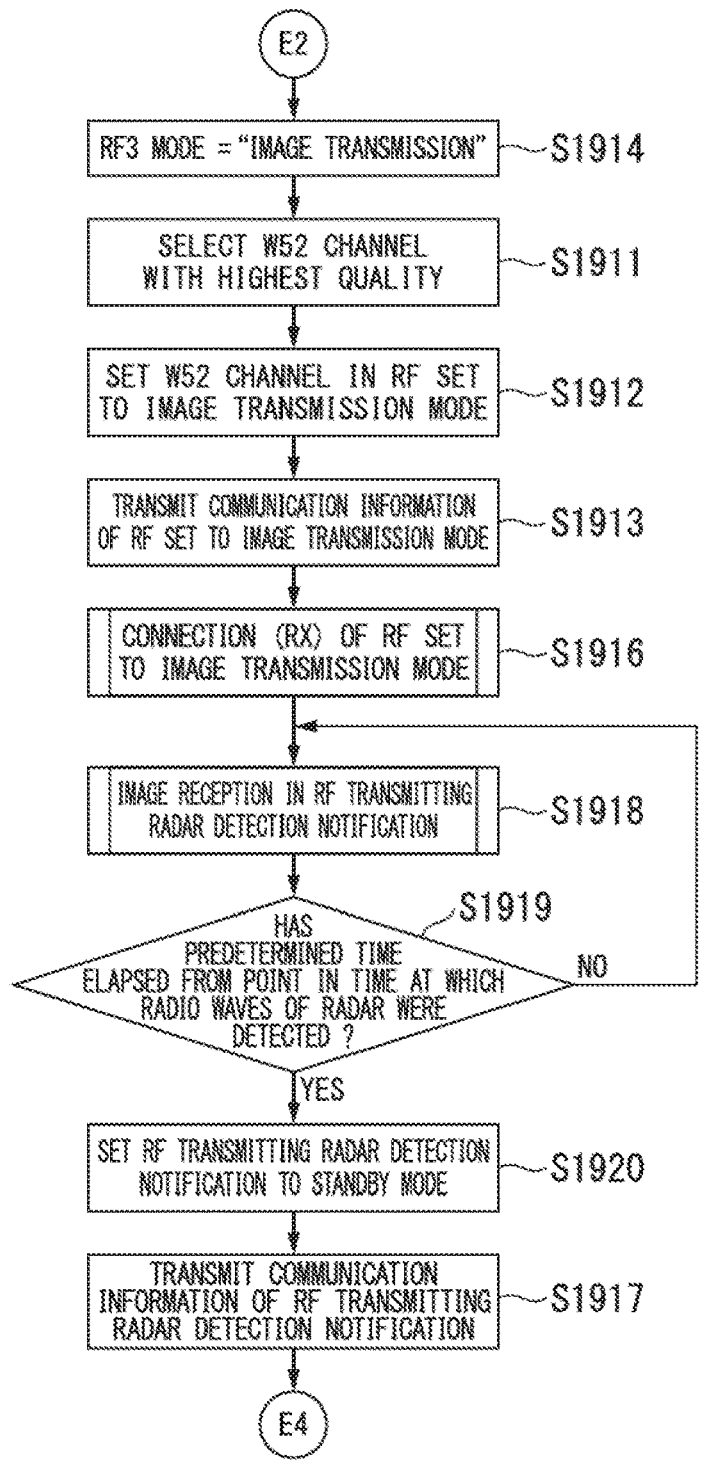
FIG. 40 is a flowchart showing a procedure of an operation of the image reception apparatus according to the third embodiment of the present invention.
Figure 41:
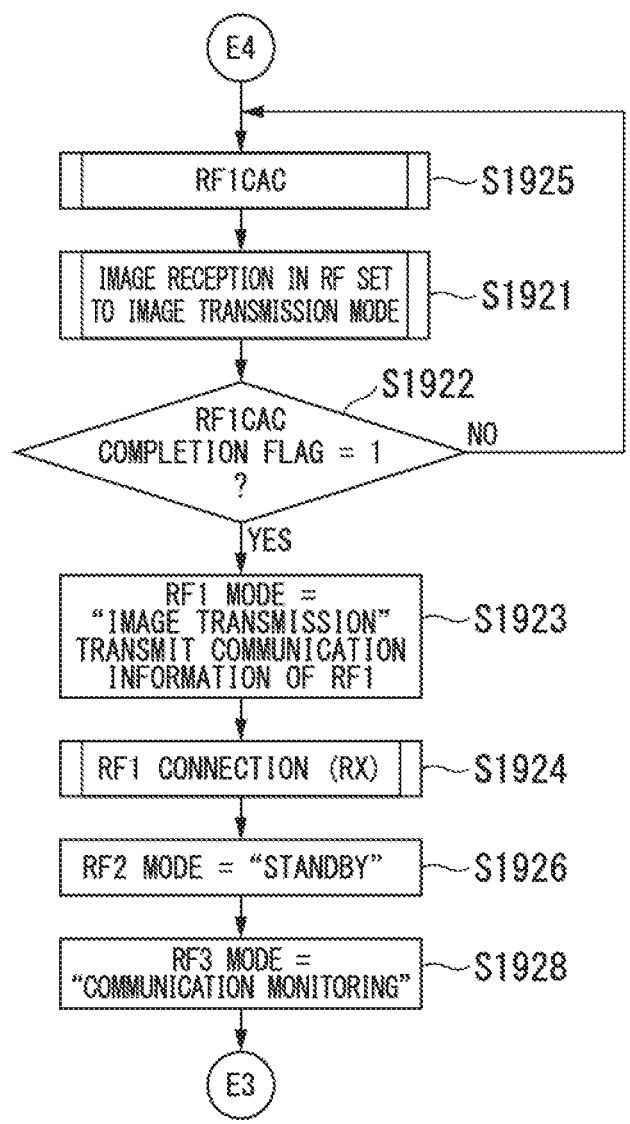
FIG. 41 is a flowchart showing a procedure of an operation of the image reception apparatus according to the third embodiment of the present invention.

An operation of the image reception apparatus 200 will be described. FIGS. 37 to 41 show a procedure of the operation of the image reception apparatus 200. FIG. 37 shows a procedure of reception control.

When the image reception apparatus 200 is powered on, the processing in steps S1801 to S1812 is executed. The processing in steps S1801 to S1812 is similar to the processing in steps S301 to S312.

After the processing in step S1812 is executed, the processing in steps S1813 and S1814 is executed. The processing in steps S1813 and S1814 is similar to the processing in steps S1613 and S1614.

After the processing in step S1814 is executed, the reception channel change process is executed (step S1816). In the reception channel change process, processing related to a change in a communication channel to be used for image data communication is executed. In step S1816, the process shown in FIGS. 38, 39, 40, and 41 is executed. After the processing in step S1816 is executed, the processing in step S1812 is executed.

FIGS. 38, 39, 40, and 41 show a procedure of an operation of the image reception apparatus 200 when the reception channel change process is performed.

If the reception channel change process is started, the processing in steps S1901 and S1905 is executed. The processing in steps S1901 and S1905 is similar to the processing in steps S1701 and S1705.

After the processing in step S1905 is executed, the control unit 230 determines whether or not CAC has been completed on the wireless circuit in the standby mode (step S1915). In the second embodiment, it is possible to execute CAC using the communication channels set in the two wireless circuits at the same time. In the third embodiment, CAC using a communication channel set in one wireless circuit is executed at one point in time.

When CAC is completed in the wireless circuit in the standby mode in step S1915, the control unit 230 sets the mode of the wireless circuit in the standby mode to the image transmission mode (step S1904).

After the processing in step S1904 is executed, the processing in steps S1902, S1903, S1906, S1908, S1909, S1910, and S1907 is executed. The processing in steps S1902, S1903, S1906, S1908, S1909, S1910 and S1907 is similar to the processing in steps S1702, S1703, S1706, S1708, S1709, S1710, and S1707.

After the processing in step S1907 is executed, the control unit 230 sets the RF3 mode to the communication monitoring mode (step S1928). In step S1928, the channel quality confirmation unit 2301 starts scanning using the third wireless circuit 213. After the processing in step S1928 is executed, the reception channel change process ends.

If the CAC is not completed in the wireless circuit in the standby mode in step S1915, the control unit 230 sets the RF3 mode to the image transmission mode (step S1914).

After the processing in step S1914 is executed, the channel quality confirmation unit 2301 reads a channel state table from the storage unit 221. The channel quality confirmation unit 2301 selects a communication channel on the basis of a channel usage rate recorded in the channel state table (step S1911). In step S1911, the channel quality confirmation unit 2301 selects a communication channel on which scanning is completed and which has highest quality from communication channels belonging to W52.

After the processing in step S1911 is executed, the processing in steps S1912, S1913, S1916, S1918, S1919, S1920, S1917, S1925, S1921, S1922, S1923, S1924, and S1926 is executed. The processing in steps S1912, S1913, S1916, S1918, S1919, S1920, S1917, S1925, S1921, S1922, S1923, S1924, and S1926 is similar to the processing in steps S1712, S1713, S1716, S1718, S1719, S1720, S1717, S1725, S1721, S1722, S1723, S1724, and S1726.

After the processing in step S1926 is executed, the control unit 230 sets the RF3 mode to the communication monitoring mode (step S1928). In step S1928, the channel quality confirmation unit 2301 starts scanning using the third wireless circuit 213. After the processing in step S1928 is executed, the reception channel change process ends.

In step S1914, the mode of one wireless circuit in the standby mode between the first wireless circuit 211 and the second wireless circuit 212 may be set to the image transmission mode.

The control unit 130 may control the first wireless circuit 111 and the second wireless circuit 112 without controlling the third wireless circuit 113, thereby executing the transmission channel change process. In this case, the control unit 230 controls the first wireless circuit 211 and the second wireless circuit 212 without controlling the third wireless circuit 213. In this case, in the transmission channel change process and the reception channel change process, the control unit 130 and the control unit 230 perform the following processing. If radio waves of the radar are detected in the communication channel set in the first wireless circuit 211 that performs image data communication, a process is performed according to whether or not CAC using the communication channel set in the second wireless circuit 212 has been completed.

If CAC using the communication channel set in the second wireless circuit 212 has been completed, the control unit 130 and the control unit 230 perform image data communication using the second wireless circuit 112 and the second wireless circuit 212 in which a communication channel belonging to a band other than W52 is set.

If CAC using the communication channel set in the second wireless circuit 212 has not been completed, CAC is suspended and the communication channel belonging to W52 is set in the second wireless circuit 112 and the second wireless circuit 212. The control unit 130 and the control unit 230 perform image data communication using the second wireless circuit 112 and the second wireless circuit 212 in which the communication channel belonging to W52 is set. After the radio waves of the radar are detected, CAC using the communication channel set in the first wireless circuit 211 is executed. After CAC is completed, the control unit 130 and the control unit 230 perform image data communication using the first wireless circuit 111 and the first wireless circuit 211 in which a communication channel belonging to a band other than W52 is set.

As described above, the channel use confirmation unit 2300 executes channel use confirmation using the third communication channel (corresponding to steps S1804 and S1814). If the channel use confirmation using the third communication channel is not completed at the first point in time, the wireless communication unit 110 and the wireless communication unit 210 start image data communication using the second communication channel within the first time from the first point in time (corresponding to steps S1511 and S1921). The first point in time is a point in time at which the radio waves of the radar are detected in the first communication channel while image data communication using the first communication channel is performed. The first time is the channel switching time $T_1$. If the channel use confirmation using the third communication channel is completed at the first point in time, the wireless communication unit 110 and the wireless communication unit 210 start image data communication using the third communication channel within the first time from the first point in time (corresponding to steps S1408 and S1918).

Figure 42:
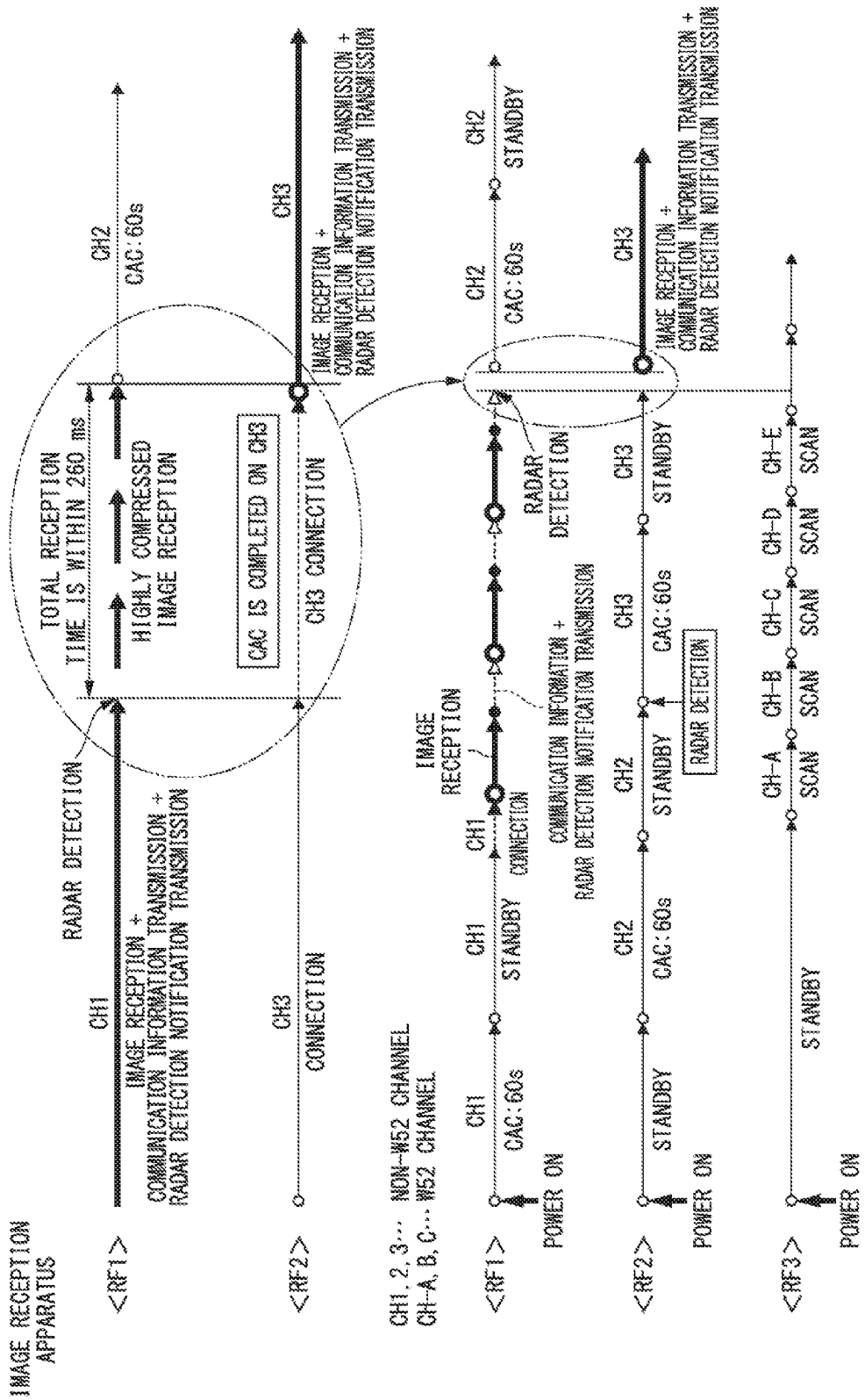
FIG. 42 is a sequence diagram showing an operation of each wireless circuit included in the image reception apparatus according to the third embodiment of the present invention.
Figure 43:
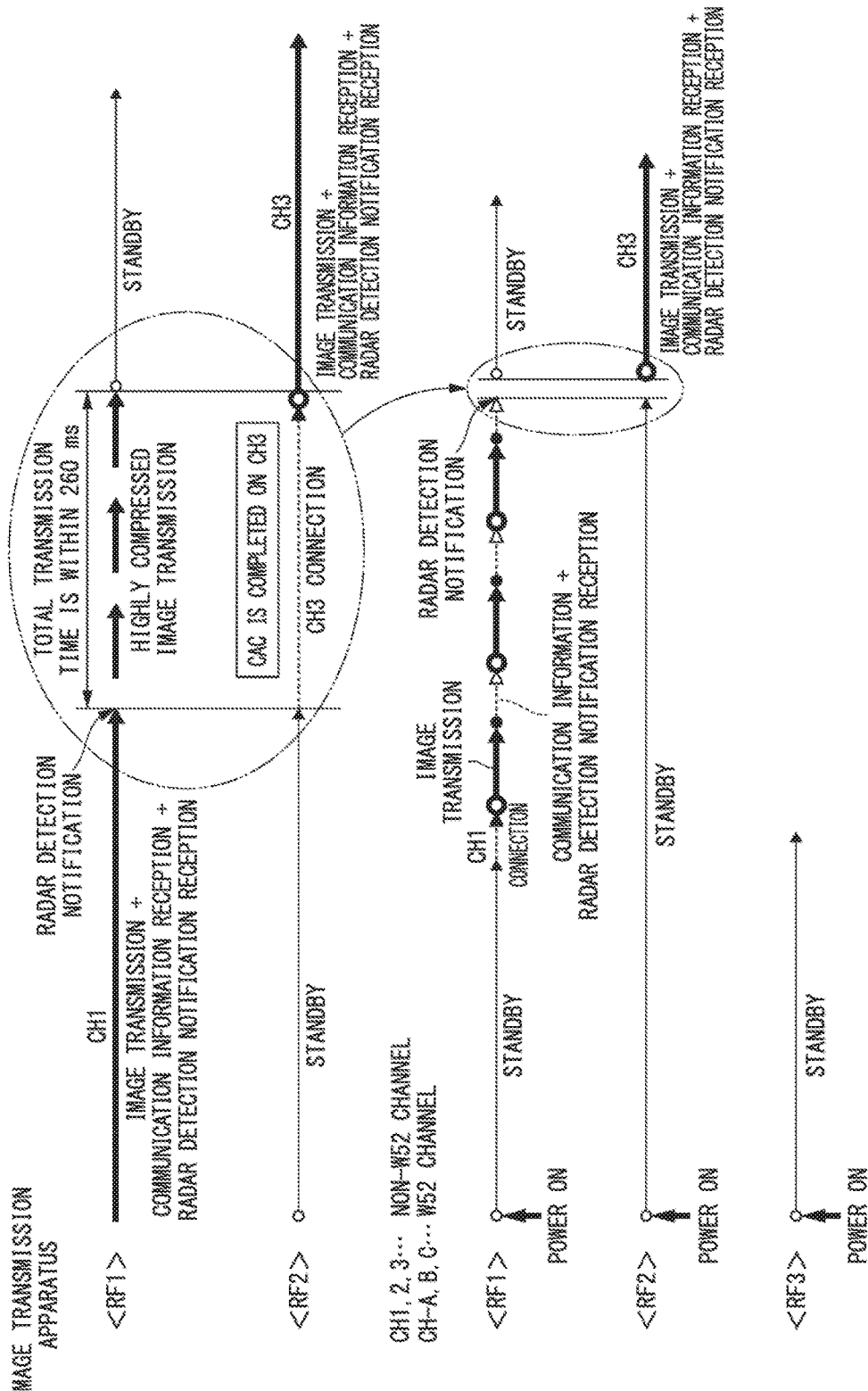
FIG. 43 is a sequence diagram showing an operation of each wireless circuit included in the image transmission apparatus according to the third embodiment of the present invention.

FIGS. 42 and 43 show an operation if the communication channel used for image transmission is changed from a communication channel belonging to a band other than W52 to another communication channel belonging to a band other than W52. FIG. 42 shows an operation of each wireless circuit included in the image reception apparatus 200. FIG. 43 shows an operation of each wireless circuit included in the image transmission apparatus 100.

After the image reception apparatus 200 is powered on, CAC using the communication channel CH1 belonging to a band other than W52 is executed on the first wireless circuit 211 (corresponding to step S1802). After CAC is completed, the first wireless circuit 211 is connected to the first wireless circuit 111 using the communication channel CH1 (corresponding to step S1808). After the connection is completed, the first wireless circuit 211 receives image data using the communication channel CH1 (the first communication channel) (corresponding to step S1813). When the image data is being received, the first wireless circuit 211 executes a detection process on radio waves of the radar by ISM (corresponding to step S1901). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

After the image reception apparatus 200 is powered on, CAC using the communication channel CH2 belonging to a band other than W52 is executed in the second wireless circuit 212 (corresponding to step S1804). After CAC is completed, the second wireless circuit 212 executes the detection process on the radio waves of the radar by ISM (corresponding to step S801 within step S1814). If radio waves of the radar are detected in the second wireless circuit 212, the communication channel is changed to the communication channel CH3 and CAC using the communication channel CH3 is executed (corresponding to step S1814).

After the image reception apparatus 200 is powered on, scanning is executed on the third wireless circuit 213 (corresponding to step S1812). Scanning is performed on the communication channel belonging to W52. If scanning on one communication channel is completed, the communication channel is changed and scanning is executed.

When the first wireless circuit 211 is receiving the image data, the radio waves of the radar are detected (corresponding to step S1901). At this point in time, CAC using the communication channel CH3 set in the second wireless circuit 212 is completed. Thus, the communication channel CH3 is set in the second wireless circuit 212 (corresponding to step S1902). Thereby, the communication channel to be used for image transmission is switched from the first communication channel to the communication channel CH3. The first wireless circuit 211 receives the image data whose amount is reduced (corresponding to step S1908). A total transmission time of the image data whose amount is reduced is within the image transmission switching time $T_2$. For example, the image transmission switching time $T_2$ is 260 milliseconds.

The first wireless circuit 211 is set in the standby mode and hence the first wireless circuit 211 stops receiving the image data (corresponding to step S1910). Thereafter, the second wireless circuit 212 receives the image data using the communication channel CH3 (the third communication channel) belonging to a band other than W52 (corresponding to step S1813). The second wireless circuit 212 transmits communication information to the second wireless circuit 112 during a blanking period other than a period during which the image data is received. Also, if radio waves of the radar are detected, the second wireless circuit 212 transmits a radar detection notification to the second wireless circuit 112 during the blanking period. Switching of the communication channel is performed within the channel switching time $T_1$ from a point in time at which the radio waves of the radar were detected.

After receiving of the image data is stopped. CAC using the communication channel CH2 different from the communication channel CH1 used for receiving the image data is executed in the first wireless circuit 211 (corresponding to step S1814).

After the image transmission apparatus 100 is powered on, the first wireless circuit 111 is connected to the first wireless circuit 211 using the communication channel CH1 belonging to a band other than W52 (corresponding to step S1402). After the connection is completed, the first wireless circuit 111 transmits the image data using the communication channel CH1 (the first communication channel) (corresponding to step S1408). The first wireless circuit 111 receives communication information from the first wireless circuit 211 during a blanking period other than a period during which image data is received. Also, if radio waves of the radar are detected in the image reception apparatus 200, the first wireless circuit 111 receives the radar detection notification from the first wireless circuit 211 during the blanking period.

After the image transmission apparatus 100 is powered on, the second wireless circuit 112 and the third wireless circuit 113 are on standby.

When the first wireless circuit 111 is transmitting image data, the radio waves of the radar are detected by the image reception apparatus 200. Thus, the communication channel to be used for image transmission is switched from the first communication channel to the communication channel CH3 set in the second wireless circuit 212 (corresponding to step S1507). The first wireless circuit 111 transmits the image data whose amount is reduced by the data amount reduction unit 1020 (corresponding to step S1506). A total transmission time of the image data whose amount is reduced is within the image transmission switching time $T_2$. For example, the image transmission switching time $T_2$ is 260 milliseconds.

After receiving notification information indicating that the first wireless circuit 211 is in the standby mode, the first wireless circuit 111 stops transmitting the image data (corresponding to step S1509). Thereafter, the second wireless circuit 112 transmits the image data using the communication channel CH3 (the third communication channel) belonging to a band other than W52 (corresponding to step S1408). Switching of the communication channel is performed within the channel switching time $T_1$ from a point in time at which the radio waves of the radar were detected.

Figure 44:
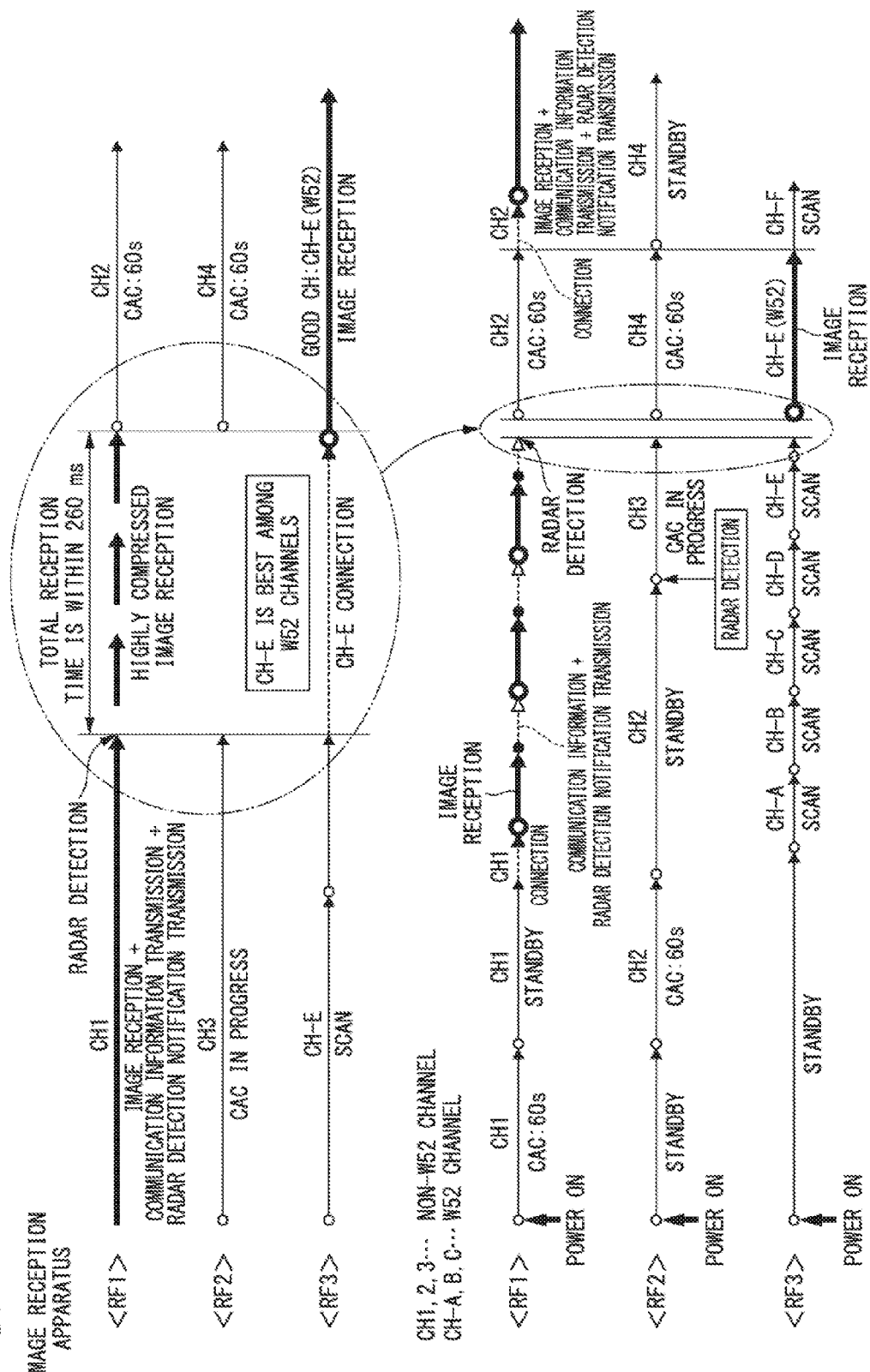
FIG. 44 is a sequence diagram showing an operation of each wireless circuit included in the image reception apparatus according to the third embodiment of the present invention.
Figure 45:
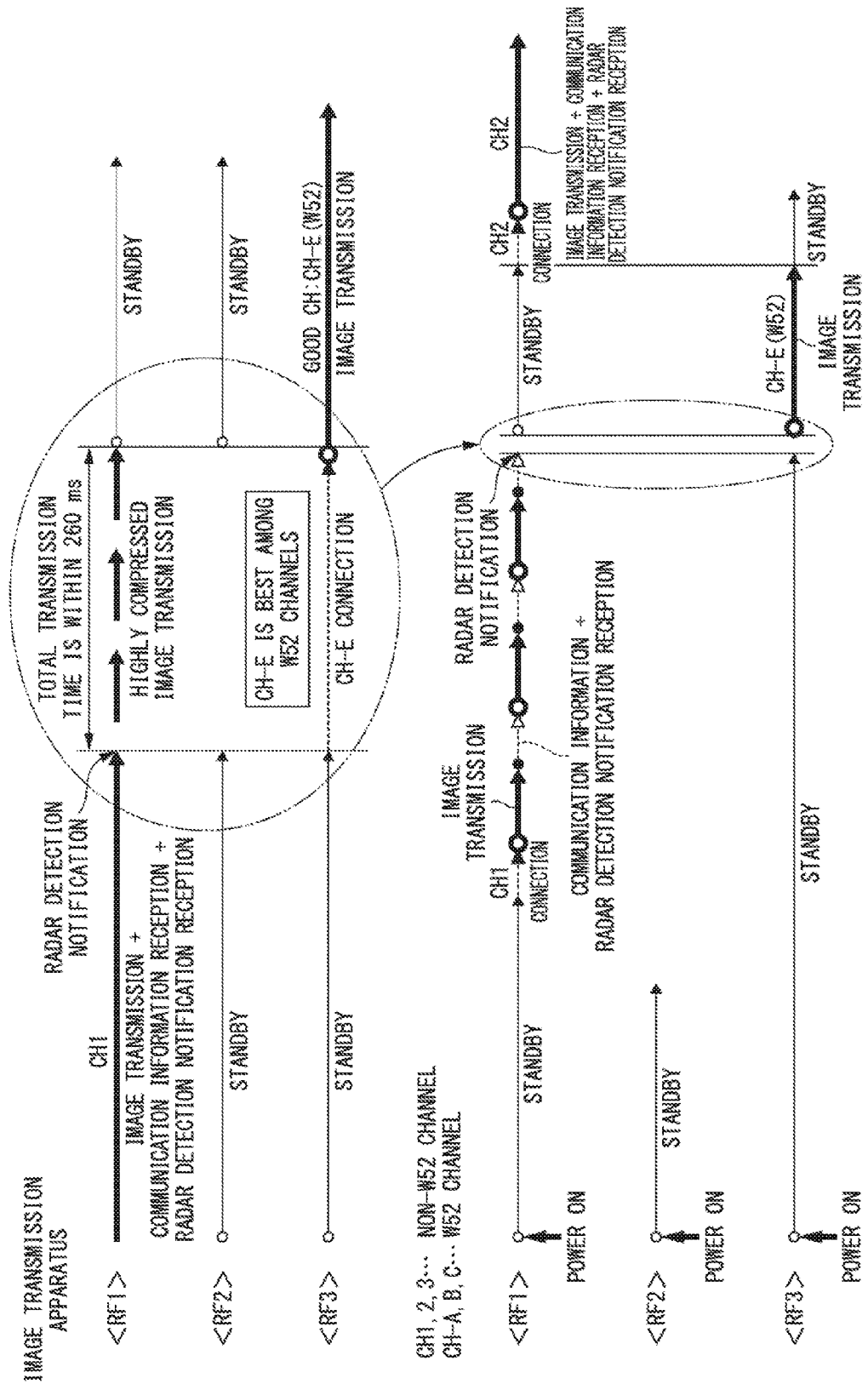
FIG. 45 is a sequence diagram showing an operation of each wireless circuit included in the image transmission apparatus according to the third embodiment of the present invention.

FIGS. 44 and 45 show an operation when the communication channel to be used for image transmission is changed from the communication channel belonging to the band other than W52 to the communication channel belonging to W52. FIG. 44 shows an operation of each wireless circuit included in the image reception apparatus 200. FIG. 45 shows an operation of each wireless circuit included in the image transmission apparatus 100.

In FIG. 44, an operation before detection of radio waves of the radar in the communication channel set in the first wireless circuit 211 is similar to the operation shown in FIG. 42. When the first wireless circuit 211 is receiving the image data, the radio waves of the radar are detected (corresponding to step S1901). At this point in time, CAC using the communication channel CH3 set in the second wireless circuit 212 is not completed. Thus, the communication channel CH-E belonging to W52 is set in the third wireless circuit 213 (corresponding to step S1912). Thereby, the communication channel to be used for image transmission is switched from the first communication channel to the communication channel CH-E. The first wireless circuit 211 receives the image data whose amount is reduced (corresponding to step S1918). A total transmission time of the image data whose amount is reduced is within the image transmission switching time $T_2$. For example, the image transmission switching time $T_2$ is 260 milliseconds.

The first wireless circuit 211 is set in the standby mode and hence the first wireless circuit 211 stops receiving the image data (corresponding to step S1920). Thereafter, the third wireless circuit 213 receives the image data using the communication channel (the second communication channel) belonging to W52 (corresponding to step S1921). Switching of the communication channel is performed within the channel switching time $T_1$ from a point in time at which the radio waves of the radar were detected.

After receiving of the image data is stopped, CAC using the communication channel CH2 different from the communication channel CH1 used for receiving the image data is executed in the first wireless circuit 211 (corresponding to step S1921). After CAC is completed, the first wireless circuit 211 is connected to the first wireless circuit 111 using the communication channel CH2 (corresponding to step S1924). After the connection is completed, the first wireless circuit 211 receives the image data using the communication channel CH2 (corresponding to step S1813). When the image data is being received, the first wireless circuit 211 executes a detection process on radio waves of the radar by ISM (corresponding to step S1901). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

When CAC is completed in the first wireless circuit 211 after the third wireless circuit 213 starts receiving image data, the third wireless circuit 213 stops receiving the image data (corresponding to step S1928). Thereafter, scanning is executed in the third wireless circuit 213 (corresponding to step S1812).

In FIG. 45, the operation before radio waves of the radar are detected in the communication channel set in the first wireless circuit 211 is similar to the operation shown in FIG. 43. When the first wireless circuit 111 is transmitting image data, the radio waves of the radar are detected by the image reception apparatus 200. Thus, the communication channel to be used for image transmission is switched from the first communication channel to the communication channel CH-E set in the third wireless circuit 213 (corresponding to step S1517). The first wireless circuit 111 transmits image data whose amount is reduced by the data amount reduction unit 1020 (corresponding to step S516). A total transmission time of the image data whose amount is reduced is within the image transmission switching time $T_2$. For example, the image transmission switching time $T_2$ is 260 milliseconds.

After receiving notification information indicating that the first wireless circuit 211 is in the standby mode, the first wireless circuit 111 stops transmitting the image data (corresponding to step S1519). Thereafter the third wireless circuit 113 transmits the image data using the communication channel CH-E (the second communication channel) (corresponding to step S1408). Switching of the communication channel is performed within the channel switching time $T_1$ from a point in time at which the radio waves of the radar were detected.

It is only necessary for at least one of the image transmission apparatus 100 and the image reception apparatus 200 to include a radar detection unit. Therefore, only one of the image transmission apparatus 100 and the image reception apparatus 200 may include the radar detection unit. Alternatively, the image transmission apparatus 100 and the image reception apparatus 200 may include the radar detection unit.

It is only necessary for at least one of the image transmission apparatus 100 and the image reception apparatus 200 to include a channel use confirmation unit. Therefore, only one of the image transmission apparatus 100 and the image reception apparatus 200 may include the channel use confirmation unit. Alternatively, the image transmission apparatus 100 and the image reception apparatus 200 may include the channel use confirmation unit.

It is only necessary for at least one of the image transmission apparatus 100 and the image reception apparatus 200 to include a channel quality confirmation unit. Therefore, only one of the image transmission apparatus 100 and the image reception apparatus 200 may include the channel quality confirmation unit. Alternatively, the image transmission apparatus 100 and the image reception apparatus 200 may include the channel quality confirmation unit. If only the image transmission apparatus 100 includes the channel quality confirmation unit 1301 and the channel quality confirmation unit 1301 executes channel monitoring using the communication channel belonging to the band other than W52 by active scanning, the image transmission apparatus 100 includes the radar detection unit and a channel use confirmation unit 1300.

In the third embodiment, the wireless communication unit 110 and the wireless communication unit 210 perform the image data communication in which the amount of data is reduced using the first communication channel from the first point in time to the second point in time. The first point in time is a point in time at which the radio waves of the radar are detected in the first communication channel while image data communication using the first communication channel is performed. The second point in time is a point in time at which the image data communication using the first communication channel is stopped. Thus, image transmission can be continued if radio waves of the radar are detected in the communication channel used for image transmission.

In the third embodiment, CAC using a communication channel set in one wireless circuit that is not used for image data communication is executed. Also, scanning using a communication channel set in one wireless circuit that is not used for image data communication is executed. If CAC using the communication channel set in one wireless circuit is completed at a point in time at which the radio waves of the radar are detected, the image data communication using the communication channel on which CAC is completed is performed. Thus, good image transmission can be continued. If CAC using the communication channel set in one wireless circuit is not completed at a point in time at which the radio waves of the radar are detected, a communication channel belonging to W52 is set in the wireless circuit in which the scanning is performed. A communication channel with high quality is set on the basis of a result of the scanning. Further, image data communication using the communication channel belonging to W52 is performed. Thus, good image transmission can be continued.

Fourth Embodiment

Figure 46:
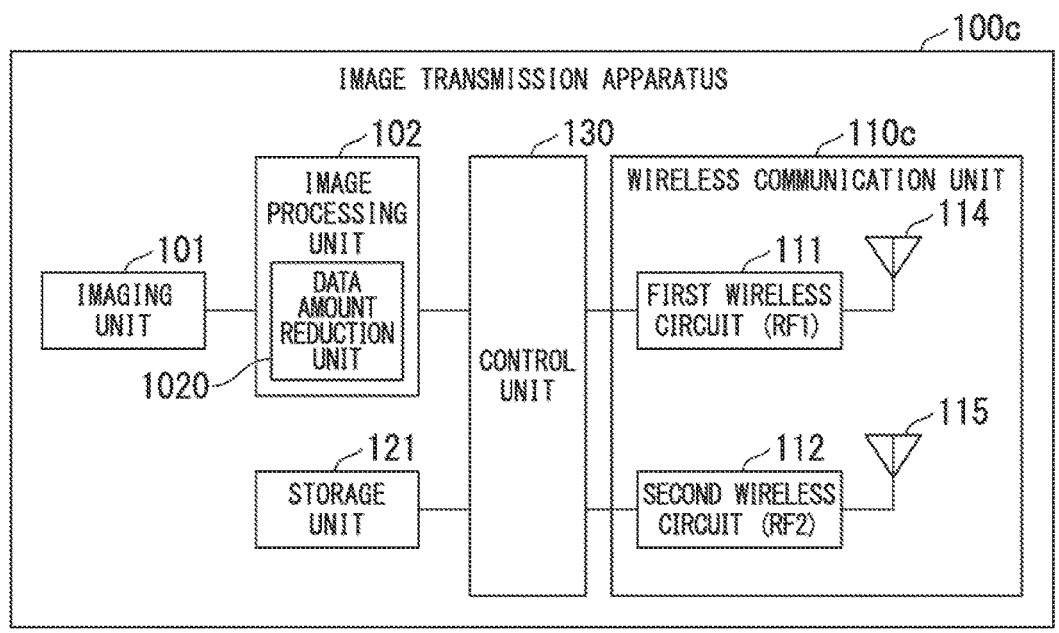
FIG. 46 is a block diagram showing a configuration of an image transmission apparatus according to a fourth embodiment of the present invention.

In the fourth embodiment of the present invention, the image transmission apparatus 100 shown in FIG. 3 is changed to an image transmission apparatus 100c shown in FIG. 46. Also, the image reception apparatus 200 shown in FIG. 4 is changed to an image reception apparatus 200c shown in FIG. 47.

FIG. 46 shows the configuration of the image transmission apparatus 100c. As shown in FIG. 46, the image transmission apparatus 100c includes an imaging unit 101, an image processing unit 102, a wireless communication unit 110c (a transmission-side wireless communication unit), a storage unit 121, and a control unit 130.

With respect to the configuration shown in FIG. 46, differences from the configuration shown in FIG. 3 will be described.

In the image transmission apparatus 100c shown in FIG. 46, the wireless communication unit 110 in the image transmission apparatus 100 shown in FIG. 3 is changed to the wireless communication unit 110c.

The wireless communication unit 110c includes a first wireless circuit 111, a second wireless circuit 112, a first antenna 114, and a second antenna 115. The wireless communication unit 110c may not include the third wireless circuit 113 and the third antenna 116 in the image transmission apparatus 100 shown in FIG. 3.

With respect to points other than the above, the configuration shown in FIG. 46 is similar to the configuration shown in FIG. 3.

Figure 47:
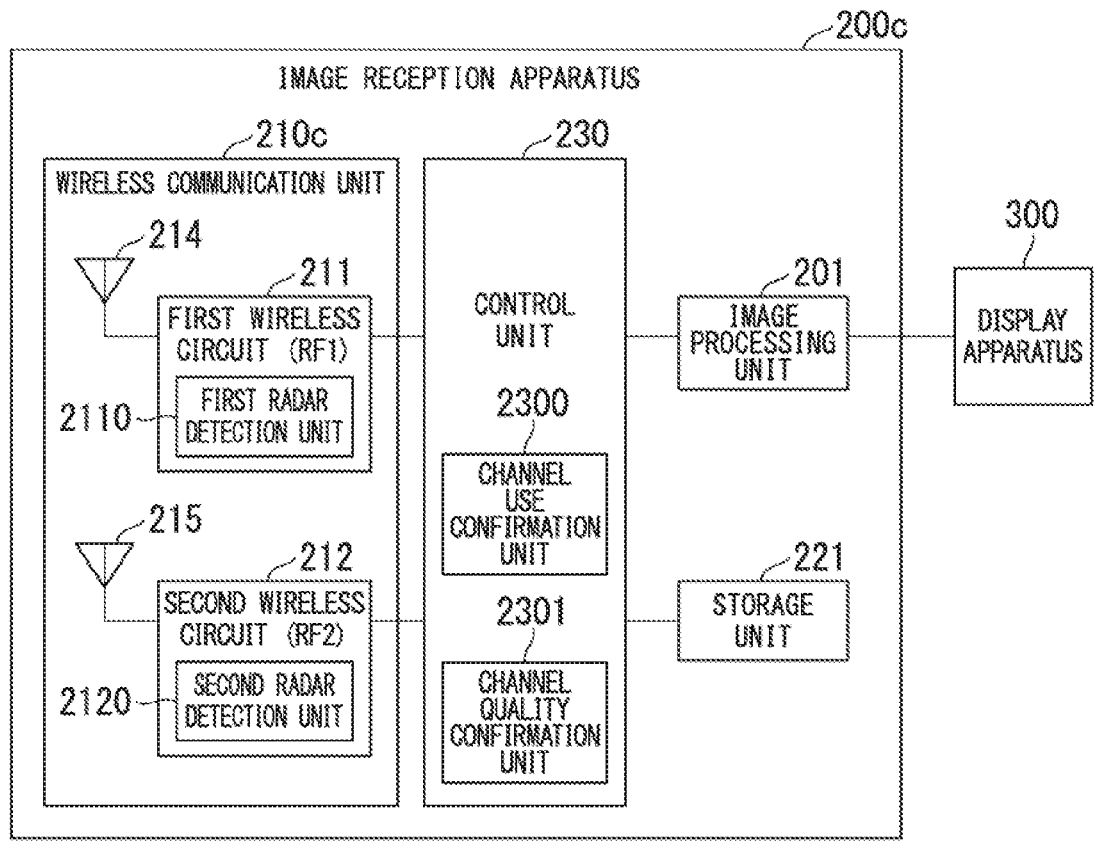
FIG. 47 is a block diagram showing a configuration of an image reception apparatus according to the fourth embodiment of the present invention.

FIG. 47 shows the configuration of the image reception apparatus 200c. As shown in FIG. 47, the image reception apparatus 200c includes an image processing unit 201, a wireless communication unit 210c (a reception-side wireless communication unit), a storage unit 221, and a control unit 230.

With respect to the configuration shown in FIG. 47, differences from the configuration shown in FIG. 4 will be described.

In the image reception apparatus 200c shown in FIG. 47, the wireless communication unit 210 in the image reception apparatus 200 shown in FIG. 4 is changed to the wireless communication unit 210c.

The wireless communication unit 210c includes a first wireless circuit 211, a second wireless circuit 212, a first antenna 214, and a second antenna 215. The wireless communication unit 210c may not include the third wireless circuit 213 and the third antenna 216 in the image reception apparatus 200 shown in FIG. 4.

The channel quality confirmation unit 2301 outputs a communication quality confirmation instruction to the second wireless circuit 212. The channel quality confirmation unit 2301 acquires communication quality information from the second wireless circuit 212 that has acquired the communication quality confirmation instruction.

With respect to points other than the above, the configuration shown in FIG. 47 is similar to the configuration shown in FIG. 4.

Figure 48:
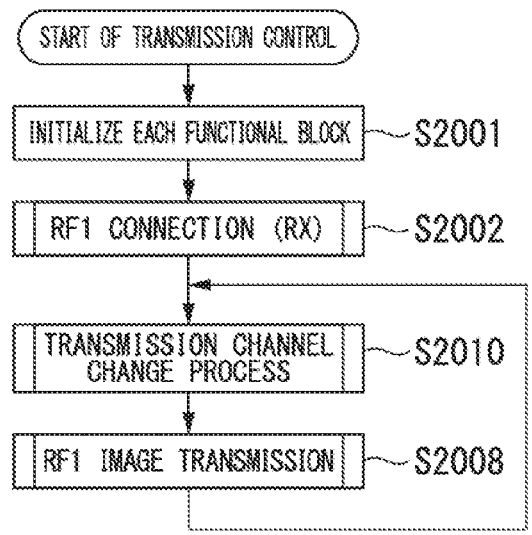
FIG. 48 is a flowchart showing a procedure of an operation of the image transmission apparatus according to the fourth embodiment of the present invention.
Figure 49:
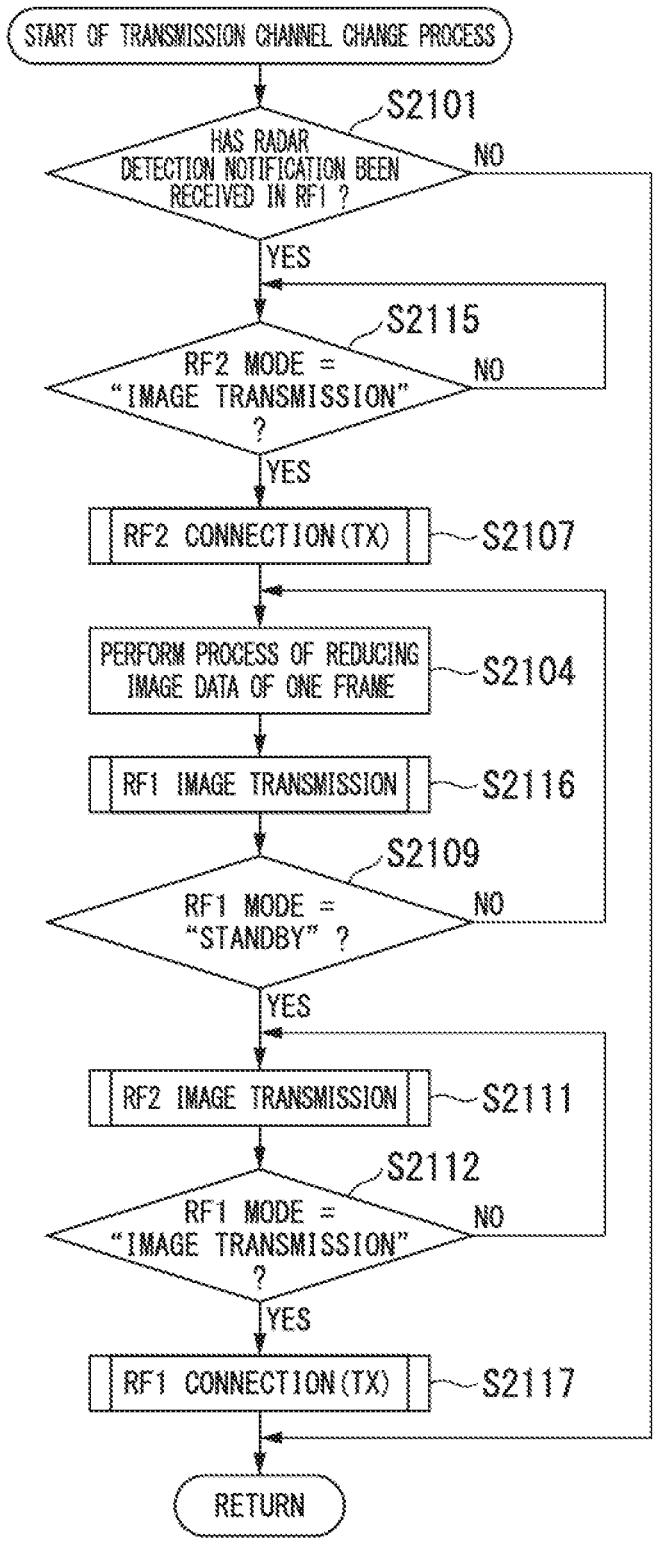
FIG. 49 is a flowchart showing a procedure of an operation of the image transmission apparatus according to the fourth embodiment of the present invention.

Details of the operation in the fourth embodiment will be described. The operation of the image transmission apparatus 100c will be described. FIGS. 48 and 49 show a procedure of the operation of the image transmission apparatus 100c. The operation shown in FIG. 6 is changed to an operation shown in FIG. 48. The operation shown in FIG. 8 is changed to an operation shown in FIG. 49.

When the image transmission apparatus 100c is powered on, the processing in steps S2001 and S2002 is executed. The processing in steps S2001 and S2002 is similar to the processing in steps S501 and S502.

After the processing in step S2002 is executed, a transmission channel change process is executed (step S2010). In the transmission channel change process, processing related to a change in the communication channel used for image data communication is executed. In step S2010, the process shown in FIG. 49 is executed. Details of the process shown in FIG. 49 will be described below.

After the processing in step S2010 is executed, the control unit 130 performs control for transmitting image data by radio waves using the wireless communication unit 110c (the first wireless circuit 111) (step S2008). Thereby, the wireless communication unit 110c (the first wireless circuit 111) transmits the image data by radio waves. In step S2008, image data of one frame in which the amount of data is not reduced is transmitted. In step S2008, the process shown in FIG. 9 is executed. After the processing in step S2008 is executed, the processing in step S2010 is executed.

FIG. 49 shows a procedure of an operation of the image transmission apparatus 100c when the transmission channel change process is performed.

When the transmission channel change process is started, the processing in steps S2101, S2115, S2107, S2104, S2116, S2109, S2111, S2112, and S2117 is executed. The processing in steps S2101, S2115, S2107, S2104, S2116, S2109, S2111, S2112 and S2117 is similar to the processing in steps S601, S615, S607, S604, S616, S609, S611, S612, and S617, except for the following points.

If the RF2 mode is not the image transmission mode in step S2115, the determination in step S2115 is executed again.

Figure 50:
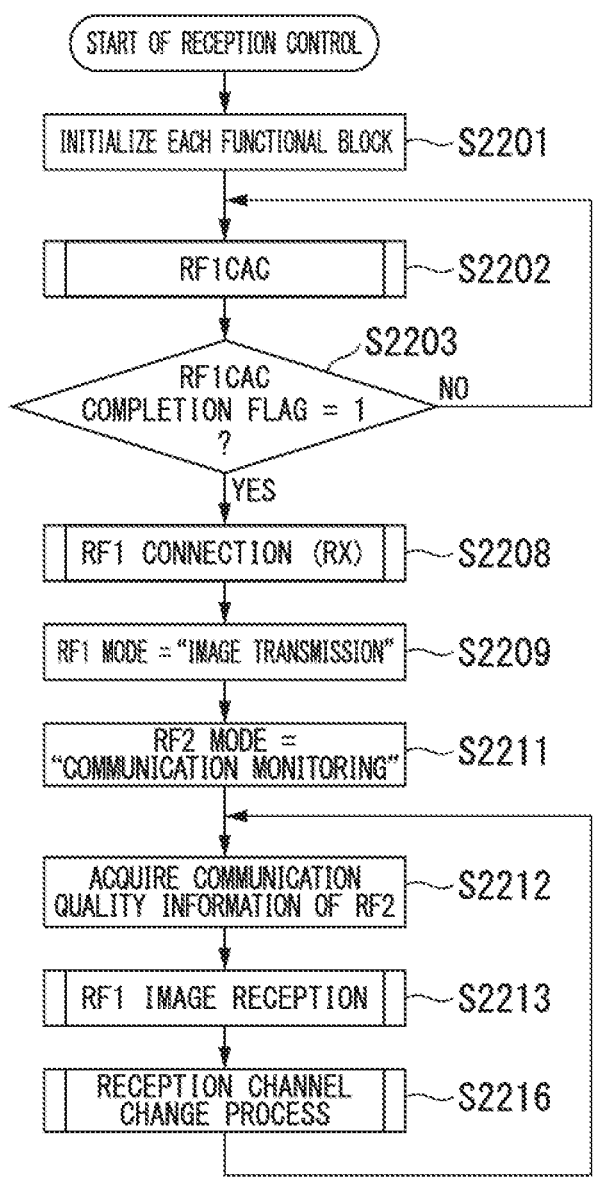
FIG. 50 is a flowchart showing a procedure of an operation of the image reception apparatus according to the fourth embodiment of the present invention.
Figure 51:
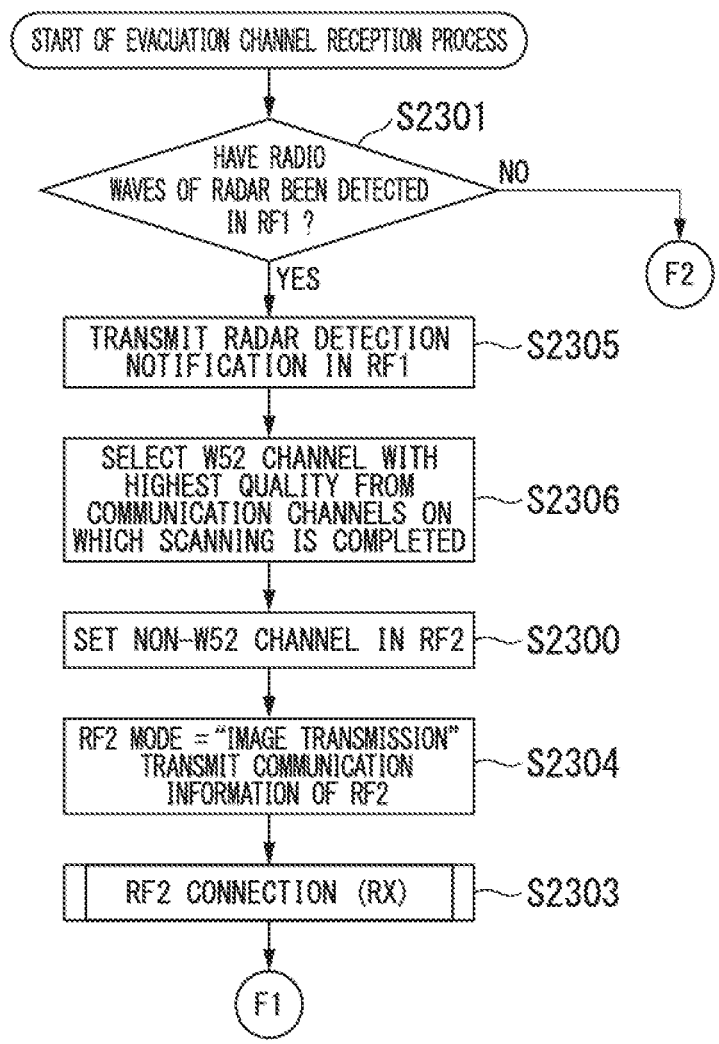
FIG. 51 is a flowchart showing a procedure of an operation of the image reception apparatus according to the fourth embodiment of the present invention.
Figure 52:
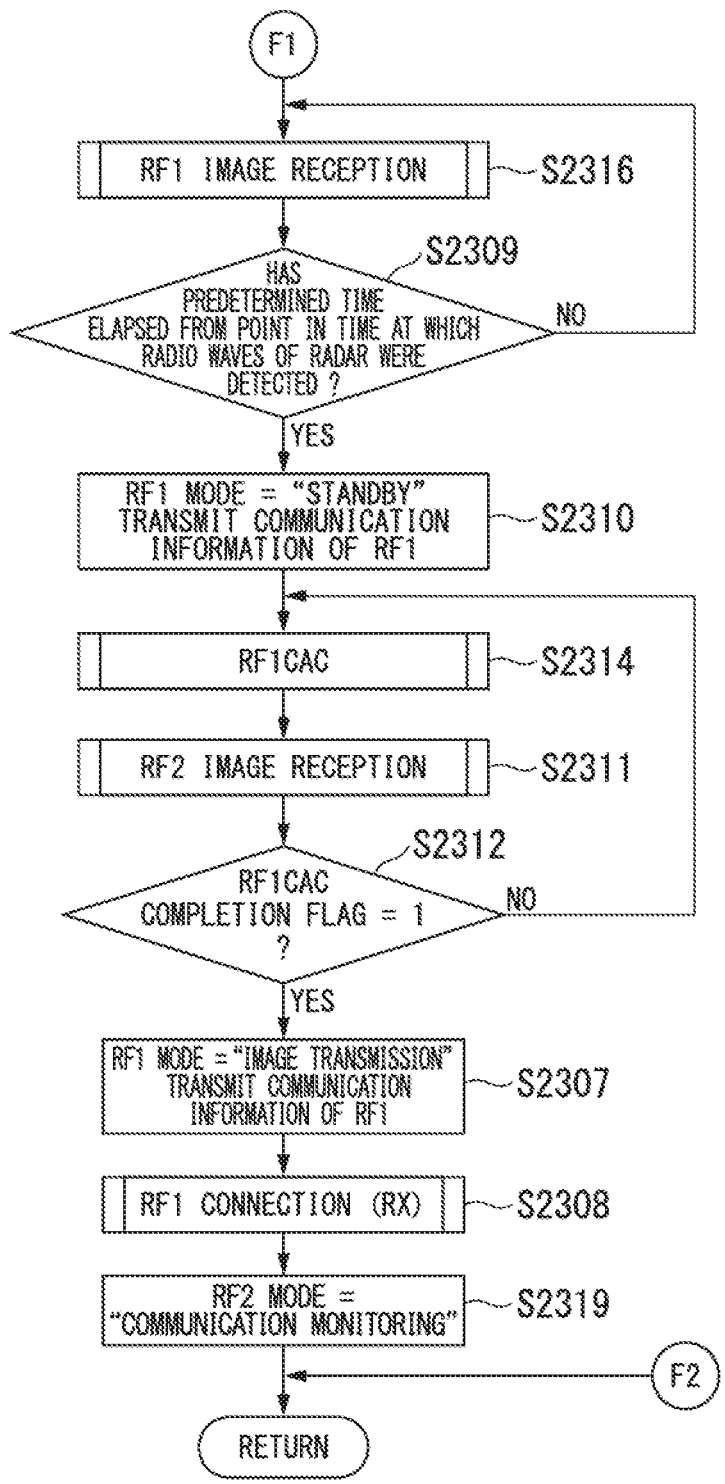
FIG. 52 is a flowchart showing a procedure of an operation of the image reception apparatus according to the fourth embodiment of the present invention.

An operation of the image reception apparatus 200c will be described. FIGS. 50, 51, and 52 show a procedure of the operation of the image reception apparatus 200c. FIG. 50 shows a procedure of reception control.

When the image reception apparatus 200c is powered on, the processing in steps S2201, S2202, S2203, S2208, and S2209 is executed. The processing in steps S2201, S2202, S2203, S2208 and S2209 is similar to the processing in steps S301, S302, S308, and S309.

After the processing in step S2209 is executed, the control unit 230b sets the RF2 mode to the communication monitoring mode (step S2211). In step S2211, the channel quality confirmation unit 2301 starts scanning using the second wireless circuit 212.

After the processing in step S2211 is executed, the channel quality confirmation unit 2301 outputs a communication quality confirmation instruction to the second wireless circuit 212. The channel quality confirmation unit 2301 acquires communication quality information from the second wireless circuit 212 (step S2212). The channel quality confirmation unit 2301 calculates a channel usage rate on the basis of the communication quality information acquired in step S2212. The calculated channel usage rate is recorded in the channel state table. If scanning of the communication channel set in the second wireless circuit 212 is completed in step S2212, the channel quality confirmation unit 2301 changes the communication channel set in the second wireless circuit 212.

After the processing in step S2212 is executed, the control unit 230 performs control for receiving image data by radio waves using the wireless communication unit 210c (the first wireless circuit 211) (step S2213). Thereby, the wireless communication unit 210c (the first wireless circuit 211) receives the image data by radio waves. In step S2213, image data of one frame in which the amount of data is not reduced is received. In step S2213, the process shown in FIG. 13 is executed.

After the processing in step S2213 is executed, the reception channel change process is executed (step S2216). In the reception channel change process, processing related to a change in a communication channel to be used for image data communication is executed. In step S2216, the process shown in FIGS. 51 and 52 is executed. After the processing in step S2216 is executed, the processing in step S2212 is executed.

FIGS. 51 and 52 show a procedure of an operation of the image reception apparatus 200c when the reception channel change process is performed.

When the reception channel change process is started, the processing in steps S2301, S2305, S2306, S2300 S2304, S2303, S2316, S2309, S2310, S2314, S2311, S2312, S2307, and S2308 is executed. The processing in step S2301, S2305, S2306, S2300, S2304, S2303, S2316, S2309, S2310, S2314, S2311, S2312, S2307, and S2308 is similar to the processing in steps S1101, S1105, S1106, S1100, S1104, S1103, S1116, S1109, S1110, S1114, S1111, S1112, S1107, and S1108. In step S2303, the communication channel selected in step S2306 is set in the second wireless circuit 212.

After the processing in step S2308 is executed, the control unit 230b sets the RF2 mode to the communication monitoring mode (step S2319). In step S2319, the channel quality confirmation unit 2301 starts scanning using the second wireless circuit 212.

After the processing in step S2319 is executed, the reception channel change process ends.

Figure 53:
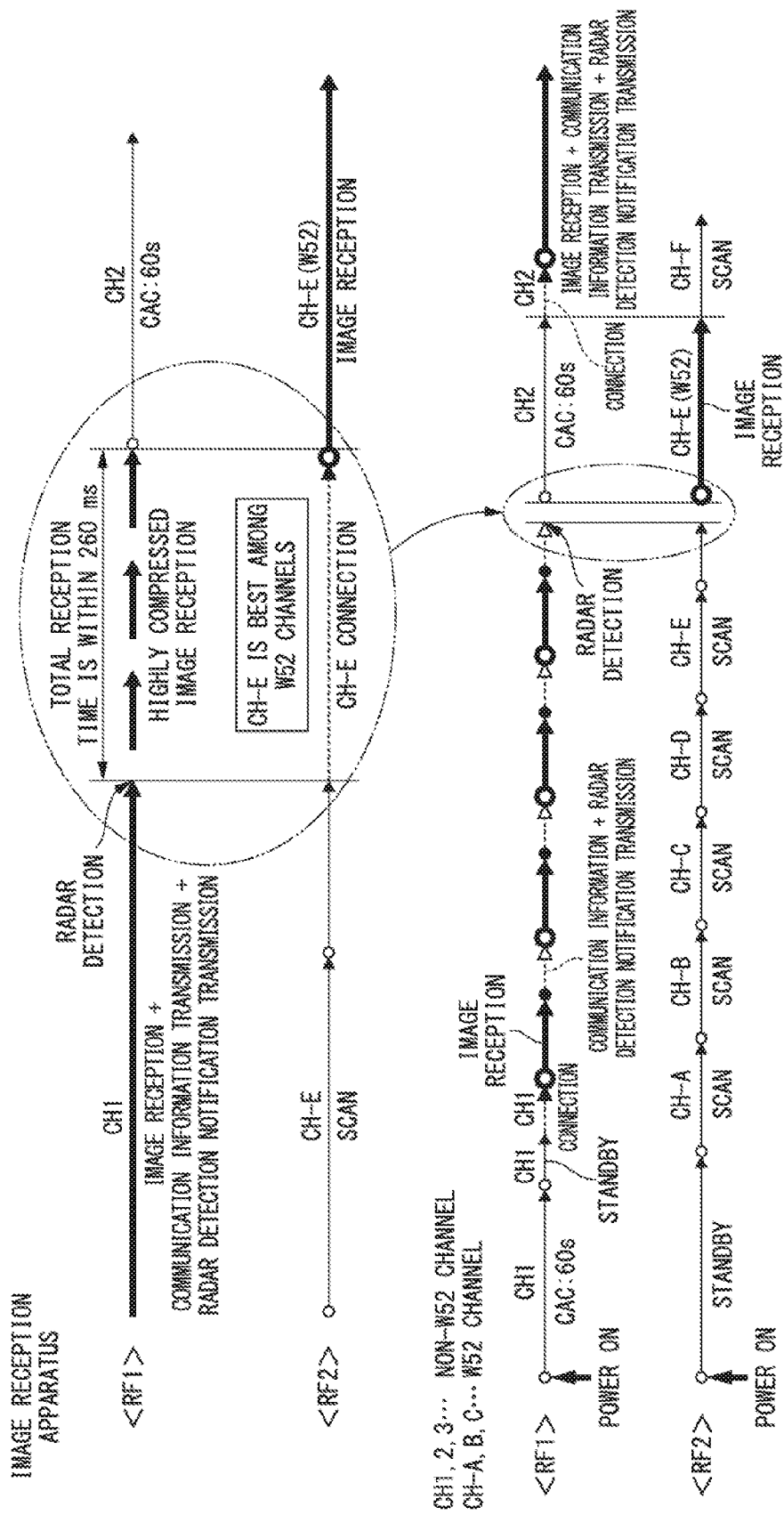
FIG. 53 is a sequence diagram showing an operation of each wireless circuit included in the image reception apparatus according to the fourth embodiment of the present invention.
Figure 54:
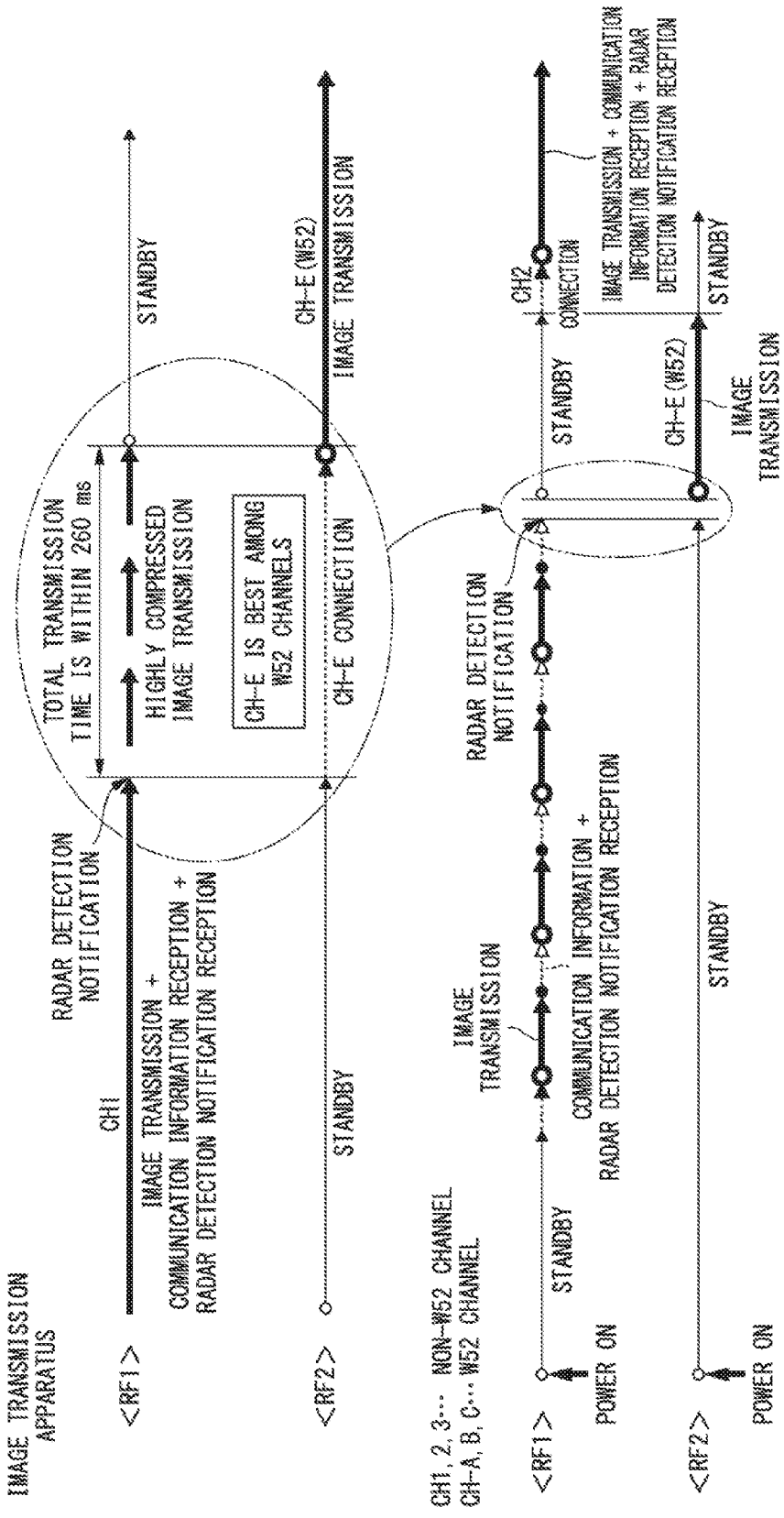
FIG. 54 is a sequence diagram showing an operation of each wireless circuit included in the image transmission apparatus according to the fourth embodiment of the present invention.
Figure 55:
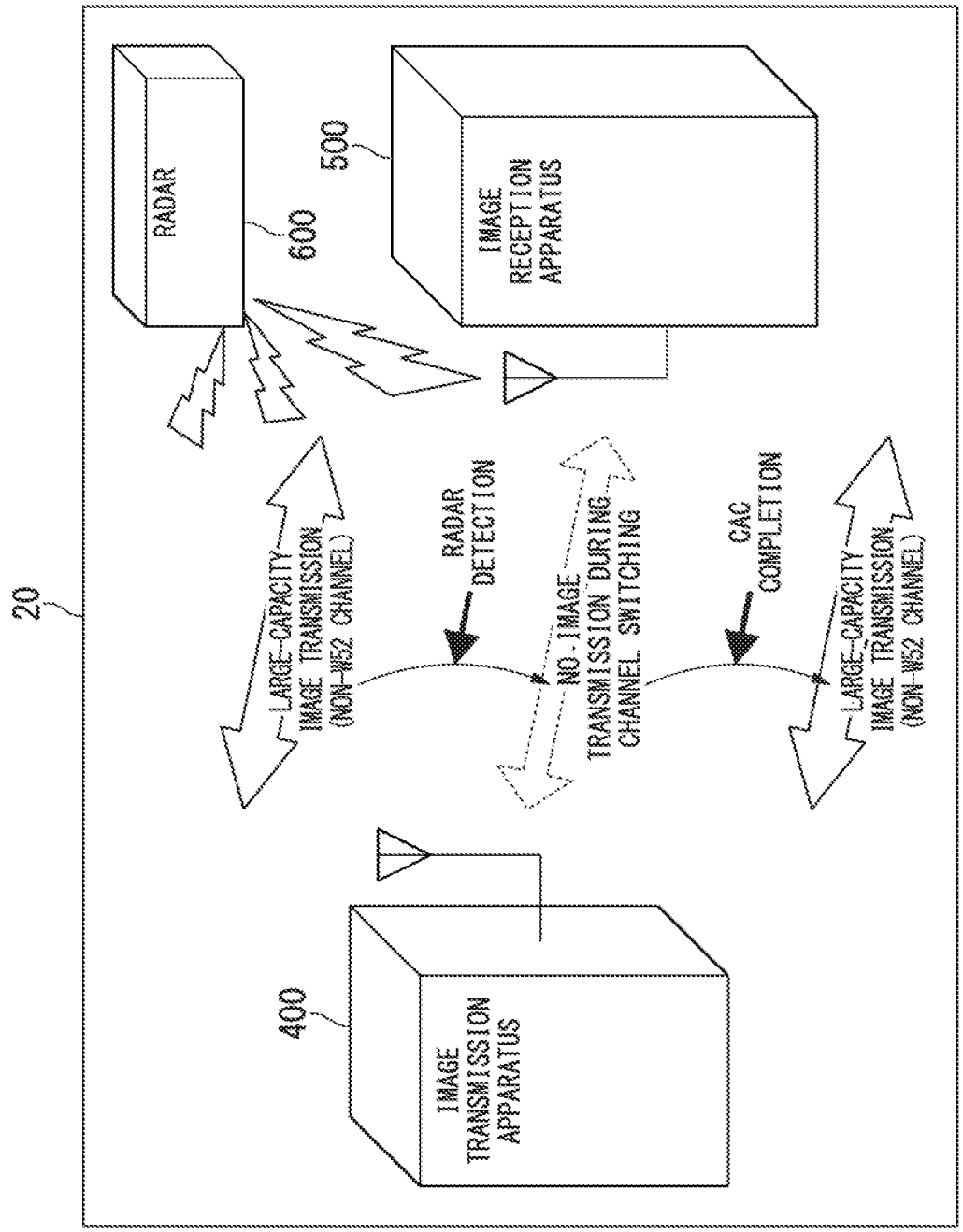
FIG. 55 is a schematic diagram showing a state of communication by an image communication system in conventional technology.

FIGS. 53 and 54 show an operation when a communication channel to be used for image transmission is switched from a communication channel set in the first wireless circuit 111 and the first wireless circuit 211 to a communication channel set in the second wireless circuit 112 and the second wireless circuit 212. FIG. 53 shows an operation of each wireless circuit included in the image reception apparatus 200c. FIG. 54 shows an operation of each wireless circuit included in the image transmission apparatus 100c.

After the image reception apparatus 200c is powered on, CAC using the communication channel CH1 belonging to a band other than W52 is executed in the first wireless circuit 211 (corresponding to step S2202). After CAC is completed, the first wireless circuit 211 is connected to the first wireless circuit 111 using the communication channel CH1 (corresponding to step S2208). After the connection is completed, the first wireless circuit 211 receives the image data using the communication channel CH1 (the first communication channel) (corresponding to step S2213). When the image data is being received, the first wireless circuit 211 executes the detection process on the radio waves of the radar by ISM (corresponding to step S2301). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

After the image reception apparatus 200c is powered on, scanning is executed in the second wireless circuit 212 (corresponding to step S2212). Scanning is performed on a communication channel belonging to W52. If scanning on one communication channel is completed, the communication channel is changed and scanning is executed.

When the first wireless circuit 211 is receiving image data, radio waves of the radar are detected (corresponding to step S2301). The quality of the communication channel CH-E is highest among the communication channels belonging to W52. Thus, the communication channel CH-E is set in the second wireless circuit 212 (corresponding to step S2300). Thereby, the communication channel to be used for image transmission is switched from the first communication channel to the communication channel CH-E. The first wireless circuit 211 receives the image data whose amount is reduced (corresponding to step S2316). A total transmission time of the image data whose amount is reduced is within the image transmission switching time $T_2$. For example, the image transmission switching time $T_2$ is 260 milliseconds.

The first wireless circuit 211 is set in the standby mode and hence the first wireless circuit 211 stops receiving the image data (corresponding to step S2310). Thereafter, the second wireless circuit 212 receives the image data using the communication channel CH-E (the second communication channel) belonging to W52 (corresponding to step S2311). Switching of the communication channel is performed within the channel switching time $T_1$ from a point in time at which the radio waves of the radar were detected.

After receiving of the image data is stopped, CAC using the communication channel CH2 different from the communication channel CH1 used for receiving the image data is executed in the first wireless circuit 211 (corresponding to step S2314). After CAC is completed, the first wireless circuit 211 is connected to the first wireless circuit 111 using the communication channel CH2 (corresponding to step S2308). After the connection is completed, the first wireless circuit 211 receives the image data using the communication channel CH2 (corresponding to step S2213). When the image data is being received, the first wireless circuit 211 executes the detection process on the radio waves of the radar by ISM (corresponding to step S2301). The first wireless circuit 211 transmits communication information to the first wireless circuit 111 in a blanking period other than a period during which the image data is received. Also, if radio waves of the radar are detected, the first wireless circuit 211 transmits a radar detection notification to the first wireless circuit 111 during the blanking period.

If CAC is completed in the first wireless circuit 211 after the second wireless circuit 212 starts receiving image data, the second wireless circuit 212 stops receiving the image data (corresponding to step S2319). Thereafter, scanning is executed in the second wireless circuit 212 (corresponding to step S2212).

After the image transmission apparatus 100c is powered on, the first wireless circuit 111 is connected to the first wireless circuit 211 using the communication channel CH1 belonging to a band other than W52 (corresponding to step S2002). After the connection is completed, the first wireless circuit 111 transmits the image data using the communication channel CH1 (the first communication channel) (corresponding to step S2008). The first wireless circuit 111 receives communication information from the first wireless circuit 211 during a blanking period other than a period during which image data is received. Also, when radio waves of the radar are detected in the image reception apparatus 200c, the first wireless circuit 111 receives a radar detection notification from the first wireless circuit 211 during the blanking period.

After the image transmission apparatus 100c is powered on, the second wireless circuit 112 is on standby.

When the first wireless circuit 111 is transmitting image data, the radio waves of the radar are detected by the image reception apparatus 200c. Thus, the communication channel to be used for image transmission is switched from the first communication channel to the communication channel CH-E set in the second wireless circuit 212 (corresponding to step S2107). The first wireless circuit 111 transmits the image data whose amount is reduced by the data amount reduction unit 1020 (corresponding to step S2116). A total transmission time of the image data whose amount is reduced is within the image transmission switching time $T_2$. For example, the image transmission switching time $T_2$ is 260 milliseconds.

After receiving notification information indicating that the first wireless circuit 211 is in the standby mode, the first wireless circuit 111 stops transmitting the image data (corresponding to step S2109). Thereafter, the second wireless circuit 112 transmits the image data using the communication channel CH-E (the second communication channel) belonging to W52 (corresponding to step S2111). Switching of the communication channel is performed within the channel switching time $T_1$ from a point in time at which the radio waves of the radar were detected.

After receiving notification information indicating that the first wireless circuit 211 is in the image transmission mode, the second wireless circuit 112 stops transmitting the image data (corresponding to step S2112). Thereafter, the first wireless circuit 111 transmits the image data using the communication channel CH2 belonging to a band other than W52 (corresponding to step S2008). The first wireless circuit 111 receives communication information from the first wireless circuit 211 during a blanking period other than a period during which image data is received. Also, if radio waves of the radar are detected in the image reception apparatus 200c, the first wireless circuit 111 receives the radar detection notification from the first wireless circuit 211 during the blanking period.

It is only necessary for at least one of the image transmission apparatus 100c and the image reception apparatus 200c to include a radar detection unit. Therefore, only one of the image transmission apparatus 100c and the image reception apparatus 200c may include the radar detection unit. Alternatively, the image transmission apparatus 100c and the image reception apparatus 200c may include the radar detection unit.

It is only necessary for at least one of the image transmission apparatus 100c and the image reception apparatus 200c to include a channel use confirmation unit. Therefore, only one of the image transmission apparatus 100c and the image reception apparatus 200c may include the channel use confirmation unit. Alternatively, the image transmission apparatus 100c and the image reception apparatus 200c may include the channel use confirmation unit.

It is only necessary for at least one of the image transmission apparatus 100c and the image reception apparatus 200c to include a channel quality confirmation unit. Therefore, only one of the image transmission apparatus 100c and the image reception apparatus 200c may include the channel quality confirmation unit. Alternatively, the image transmission apparatus 100c and the image reception apparatus 200c may include the channel quality confirmation unit. If only the image transmission apparatus 100c includes the channel quality confirmation unit 1301 and the channel quality confirmation unit 1301 executes channel monitoring using the communication channel belonging to a band other than W52 by active scanning, the image transmission apparatus 100c includes the radar detection unit and a channel use confirmation unit 1300.

In the fourth embodiment, the wireless communication unit 110c and the wireless communication unit 210c perform the image data communication in which the amount of data is reduced using the first communication channel from the first point in time to the second point in time. The first point in time is a point in time at which radio waves of the radar are detected in the first communication channel while image data communication using the first communication channel is performed. The second point in time is a point in time at which the image data communication using the first communication channel is stopped. Thus, image transmission can be continued when radio waves of the radar are detected in the communication channel used for image transmission.

In the fourth embodiment, scanning using the communication channel set in the second wireless circuit 212 that is not used for image data communication is executed. If radio waves of the radar are detected, a communication channel belonging to W52 is set in the second wireless circuit 212 in which scanning is executed. A communication channel with high quality is set on the basis of a result of the scanning. Further, image data communication using the communication channel belonging to W52 is performed. Thus, good image transmission can be continued.

Although embodiments of the present invention have been described above with reference to the drawings, specific configurations are not limited to the embodiments, and a design change, etc. may also be included without departing from the scope of the present invention.

What is claimed is:

1. An image communication system, comprising:
an image transmission apparatus; and
an image reception apparatus,
wherein the image transmission apparatus includes a transmission-side wireless communication unit configured to transmit image data by radio waves, the image data being generated in synchronization with an imaging clock and transmitted in the order in which the image data is generated,
wherein the image reception apparatus includes a reception-side wireless communication unit configured to receive the image data transmitted by the transmission-side wireless communication unit by radio waves,
wherein at least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit,
wherein at least one of the image transmission apparatus and the image reception apparatus includes a data amount reduction unit configured to reduce the amount of image data,
wherein the transmission-side wireless communication unit and the reception-side wireless communication unit stop image data communication using a first communication channel within a first time from a first point in time at which the radar detection unit detects the radio waves of the radar in the first communication channel while the image data communication using the first communication channel is performed, the first communication channel being a communication channel in which detection of the radar is necessary,
wherein the transmission-side wireless communication unit and the reception-side wireless communication unit start image data communication using a second communication channel within the first time from the first point in time, the second communication channel being a communication channel in which detection of the radar is not necessary,
wherein the data amount reduction unit reduces the amount of image data so that a total communication time of the image data to be communicated by the transmission-side wireless communication unit and the reception-side wireless communication unit from the first point in time to a second point in time at which the image data communication using the first communication channel is stopped falls within a second time, and
wherein the transmission-side wireless communication unit and the reception-side wireless communication unit perform the image data communication in which the amount of data is reduced by the data amount reduction unit using the first communication channel from the first point in time to the second point in time.

2. The image communication system according to claim 1,
wherein the image transmission apparatus further includes a storage unit configured to store the first time, the second time, and a frame rate, and
wherein the data amount reduction unit determines the reduced amount of data on the basis of the first time, the second time, and the frame rate stored in the storage unit.

3. The image communication system according to claim 1,
wherein at least one of the image transmission apparatus and the image reception apparatus further includes a channel quality confirmation unit configured to confirm qualities of a plurality of communication channels different from the first communication channel when the image data communication using the first communication channel is being performed, and
wherein a communication channel with relatively high quality among a plurality of communication channels whose qualities have been confirmed by the channel quality confirmation unit is set as the second communication channel.

4. The image communication system according to claim 1,
wherein at least one of the image transmission apparatus and the image reception apparatus further includes a channel use confirmation unit configured to execute channel use confirmation for confirming that the communication channel is usable by continuously monitoring the detection process by the radar detection unit for a predetermined time,
wherein the channel use confirmation unit executes the channel use confirmation of a third communication channel, the third communication channel being a communication channel in which detection of the radar is necessary, the third communication channel being different from the first communication channel,
wherein, if the channel use confirmation of the third communication channel is not completed at the first point in time, the transmission-side wireless communication unit and the reception-side wireless communication unit start the image data communication using the second communication channel within the first time from the first point in time, and
wherein, if the channel use confirmation of the third communication channel is completed at the first point in time, the transmission-side wireless communication unit and the reception-side wireless communication unit start the image data communication using the third communication channel within the first time from the first point in time.

5. An image transmission apparatus, comprising:
a transmission-side wireless communication unit configured to transmit image data by radio waves, the image data being generated in synchronization with an imaging clock and transmitted in the order in which the image data is generated,
a radar detection unit configured to execute a detection process on radio waves of radar in a communication channel that has a possibility of being used for image data communication by the transmission-side wireless communication unit; and
a data amount reduction unit configured to reduce the amount of image data,
wherein the transmission-side wireless communication unit stops image data communication using a first communication channel within a first time from a first point in time at which the radar detection unit detects the radio waves of the radar in the first communication channel while the image data communication using the first communication channel is performed, the first communication channel being a communication channel in which detection of the radar is necessary,
wherein the transmission-side wireless communication unit starts image data communication using a second communication channel within the first time from the first point in time, the second communication channel being a communication channel in which detection of the radar is not necessary, wherein the data amount reduction unit reduces the amount of image data so that a total communication time of the image data to be communicated by the transmission-side wireless communication unit from the first point in time to a second point in time at which the image data communication using the first communication channel is stopped falls within a second time, and wherein the transmission-side wireless communication unit performs the image data communication in which the amount of data is reduced by the data amount reduction unit using the first communication channel from the first point in time to the second point in time.

6. An image transmission method, comprising:

a first step of transmitting image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of stopping image data communication using a first communication channel within a first time from a first point in time at which the radio waves of the radar are detected in the first communication channel in the second step while the image data communication using the first communication channel is performed, the first communication channel being a communication channel in which detection of the radar is necessary;

a fourth step of starting image data communication using a second communication channel within the first time from the first point in time, the second communication channel being a communication channel in which detection of the radar is not necessary;

a fifth step of reducing the amount of image data so that a total communication time of the image data to be communicated from the first point in time to a second point in time at which the image data communication using the first communication channel is stopped falls within a second time; and a sixth step of performing the image data communication in which the amount of data is reduced in the fifth step using the first communication channel from the first point in time to the second point in time.

7. A non-transitory recording medium saving a program for causing a computer of an image transmission apparatus to execute:

a first step of transmitting image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of stopping image data communication using a first communication channel within a first time from a first point in time at which the radio waves of the radar are detected in the first communication channel in the second step while the image data communication using the first communication channel is performed, the first communication channel being a communication channel in which detection of the radar is necessary;

a fourth step of starting image data communication using a second communication channel within the first time from the first point in time, the second communication channel being a communication channel in which detection of the radar is not necessary;

a fifth step of reducing the amount of image data so that a total communication time of the image data to be communicated from the first point in time to a second point in time at which the image data communication using the first communication channel is stopped falls within a second time; and a sixth step of performing the image data communication in which the amount of data is reduced in the fifth step using the first communication channel from the first point in time to the second point in time.

* * * * *